United States Patent [19]

Boyd, Jr. et al.

[11] Patent Number: 4,642,536
[45] Date of Patent: Feb. 10, 1987

[54] CONTROL SYSTEM FOR AN ELECTRONICALLY COMMUTATED MOTOR, METHOD OF CONTROLLING SUCH, METHOD OF CONTROLLING AN ELECTRONICALLY COMMUTATED MOTOR AND LAUNDRY APPARATUS

[75] Inventors: John H. Boyd, Jr.; Alexander Muller, both of Holland, Mich.

[73] Assignee: General Electric Company, Fort Wayne, Ind.

[21] Appl. No.: 710,900

[22] Filed: Mar. 12, 1985

Related U.S. Application Data

[62] Division of Ser. No. 602,163, Apr. 19, 1984, Pat. No. 4,540,921.

[51] Int. Cl.$^4$ .............................................. H02P 6/02
[52] U.S. Cl. ................................. 318/254; 318/138; 318/439; 68/12 R
[58] Field of Search .................. 318/138, 254 A, 254, 318/439, 258, 261, 268, 269; 68/12 R; 210/143

[56] References Cited

U.S. PATENT DOCUMENTS

| | | | |
|---|---|---|---|
| 3,369,381 | 2/1968 | Crane et al. | 68/12 |
| 3,599,062 | 8/1971 | Crane et al. | 318/128 |
| 3,628,110 | 12/1971 | Casaday | 318/138 |
| 3,764,869 | 10/1973 | Woodbury | 318/138 |
| 3,783,359 | 1/1974 | Malkiel | 318/254 |
| 4,005,347 | 1/1977 | Erdman | 318/254 |
| 4,027,215 | 5/1977 | Knight et al. | 318/341 |
| 4,047,081 | 9/1977 | Liska | 318/138 |
| 4,051,417 | 9/1977 | Fujinawa et al. | 318/138 |
| 4,162,435 | 7/1979 | Wright | 318/138 |
| 4,167,692 | 9/1979 | Sekiya et al. | 318/138 |
| 4,167,693 | 9/1979 | Liska et al. | 318/138 |
| 4,169,990 | 10/1979 | Erdman | 318/138 |
| 4,234,838 | 11/1980 | Langley et al. | 318/696 |
| 4,238,717 | 12/1980 | Knight et al. | 318/341 |
| 4,250,435 | 2/1981 | Alley et al. | 318/254 X |
| 4,250,544 | 2/1981 | Alley | 318/254 X |
| 4,263,535 | 4/1981 | Jones | 318/254 X |
| 4,270,074 | 5/1981 | Duckworth et al. | 318/254 |
| 4,282,471 | 8/1981 | Budniak et al. | 318/685 |

List Continued on next page.

FOREIGN PATENT DOCUMENTS

| | | |
|---|---|---|
| 0071941 | 2/1983 | European Pat. Off. . |
| 57-68697 | 4/1982 | Japan .................................. 318/254 |
| 57-71258 | 5/1982 | Japan . |
| 57-160385 | 10/1982 | Japan . |
| 57-193993 | 11/1982 | Japan .................................. 318/254 |
| 58-25038 | 5/1983 | Japan . |
| 83/00781 | 3/1983 | PCT Int'l Appl. .................. 318/254 |
| 2119185 | 11/1983 | United Kingdom . |

OTHER PUBLICATIONS

"MCS-48 ® Family of Single Chip Microcomputers User's Manual", Intel Corp., Santa Clara, Calif., 1981, FIG. 2-1, p. 4-5.

Primary Examiner—William M. Shoop, Jr.
Assistant Examiner—Bentsu Ro
Attorney, Agent, or Firm—Ralph E. Krisher, Jr.

[57] ABSTRACT

Control system for an electronically commutated motor (ECM). The ECM includes a stationary assembly having a plurality of winding stages adapted to be selectively commutated, and rotatable means associated with the stationary assembly in selective magnetic coupling relation with the winding stages. A circuit commutates the winding stages by selectively supplying power thereto in response to a pattern of control signals leaving at least one of the winding stages unpowered at any one time while the other winding stages are powered. The control system includes a circuit coupled to the winding stages for simultaneously converting the voltages across the winding stages to digital form thereby to digitize the voltages, and a circuit for producing successive patterns of digital signals in at least one preselected sequence, for selecting the digitized voltage across the at least one unpowered winding stage depending on the digital signal pattern produced, and for producing a following pattern in sequence after at least one predetermined logic level of the selected digitized voltage has occurred. Another circuit responds to the successive patterns of the digital signals for generating the successive patterns of the control signals for the commutating circuit.

101 Claims, 24 Drawing Figures

U.S. PATENT DOCUMENTS

| | | | |
|---|---|---|---|
| 4,292,573 | 9/1981 | Ebert et al. | 318/254 X |
| 4,317,072 | 2/1982 | Goof et al. | 318/254 X |
| 4,346,434 | 8/1982 | Morinaga | 364/183 |
| 4,368,411 | 1/1983 | Kidd | 318/254 |
| 4,390,826 | 6/1983 | Erdman et al. | 318/439 |
| 4,403,177 | 9/1983 | Weber et al. | 318/254 |
| 4,409,526 | 10/1983 | Yamauchi et al. | 318/138 X |
| 4,415,844 | 11/1983 | Mendenhall et al. | 318/254 X |
| 4,429,262 | 1/1984 | Utenick | 318/254 |
| 4,446,406 | 5/1984 | Uzuka | 318/254 |
| 4,449,079 | 5/1984 | Erdman | 318/138 |
| 4,454,458 | 6/1984 | Holland | 318/254 |
| 4,459,519 | 7/1984 | Erdman | 318/254 |
| 4,492,903 | 1/1985 | Knight et al. | 318/254 X |
| 4,494,051 | 1/1985 | Bailey | 318/439 X |
| 4,494,052 | 1/1985 | Kelleher et al. | 318/138 X |
| 4,495,450 | 1/1985 | Tokizaki et al. | 318/138 |
| 4,525,658 | 6/1985 | Yanagida | 318/254 X |
| 4,528,485 | 7/1985 | Boyd, Jr. | 318/254 X |
| 4,528,486 | 7/1985 | Flaig | 318/254 |
| 4,591,774 | 5/1986 | Ferris et al. | 318/254 |

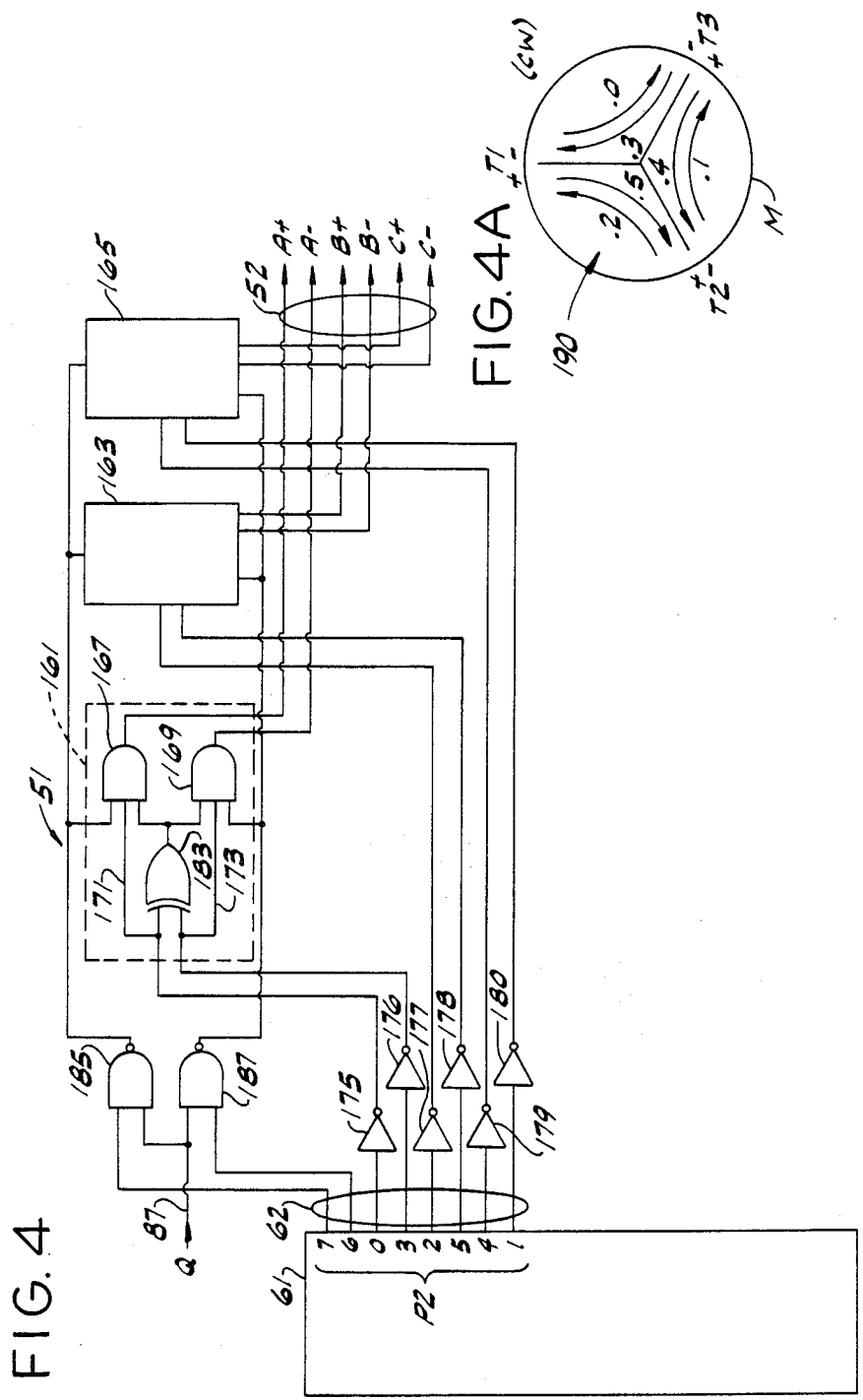

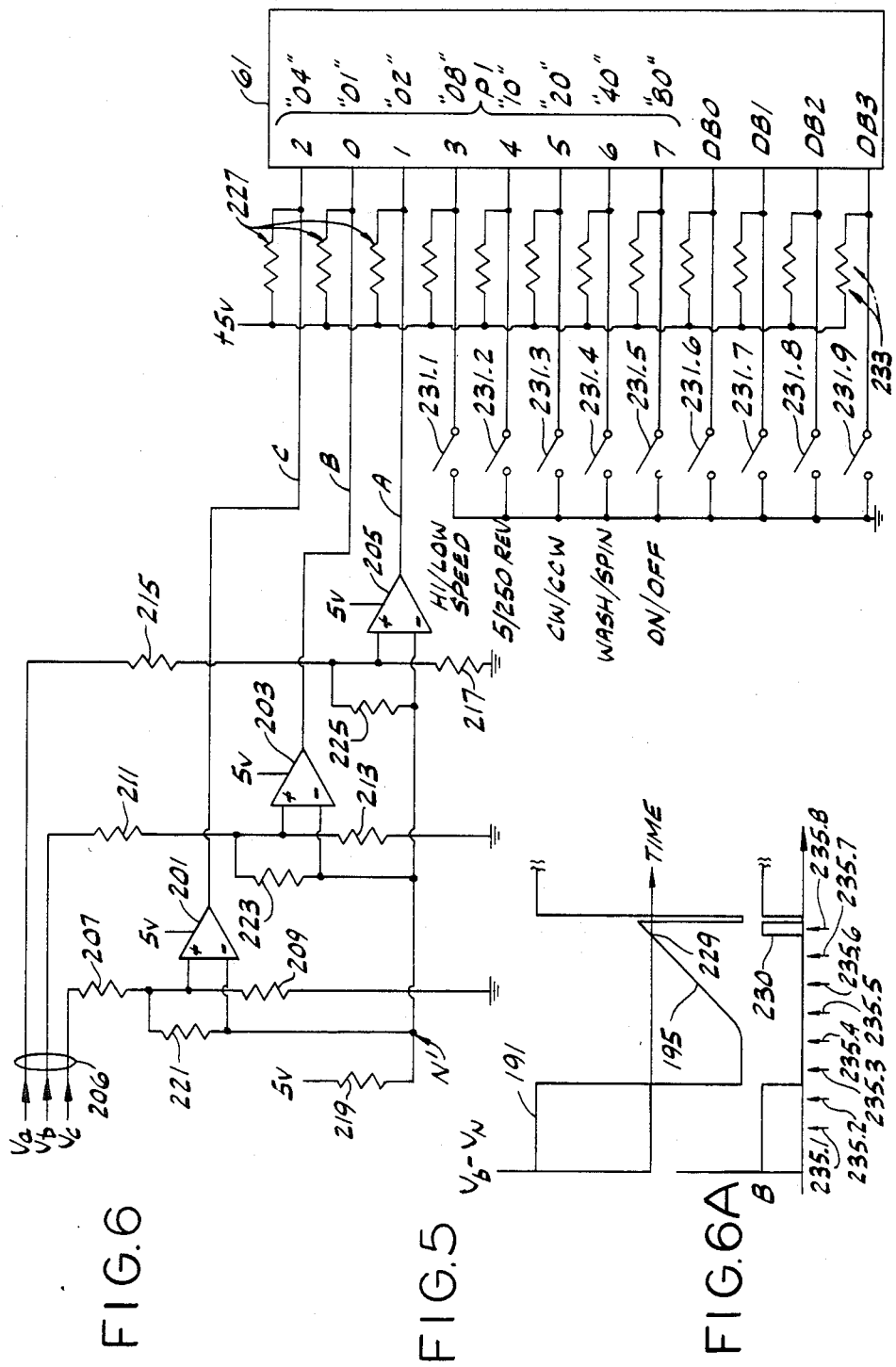

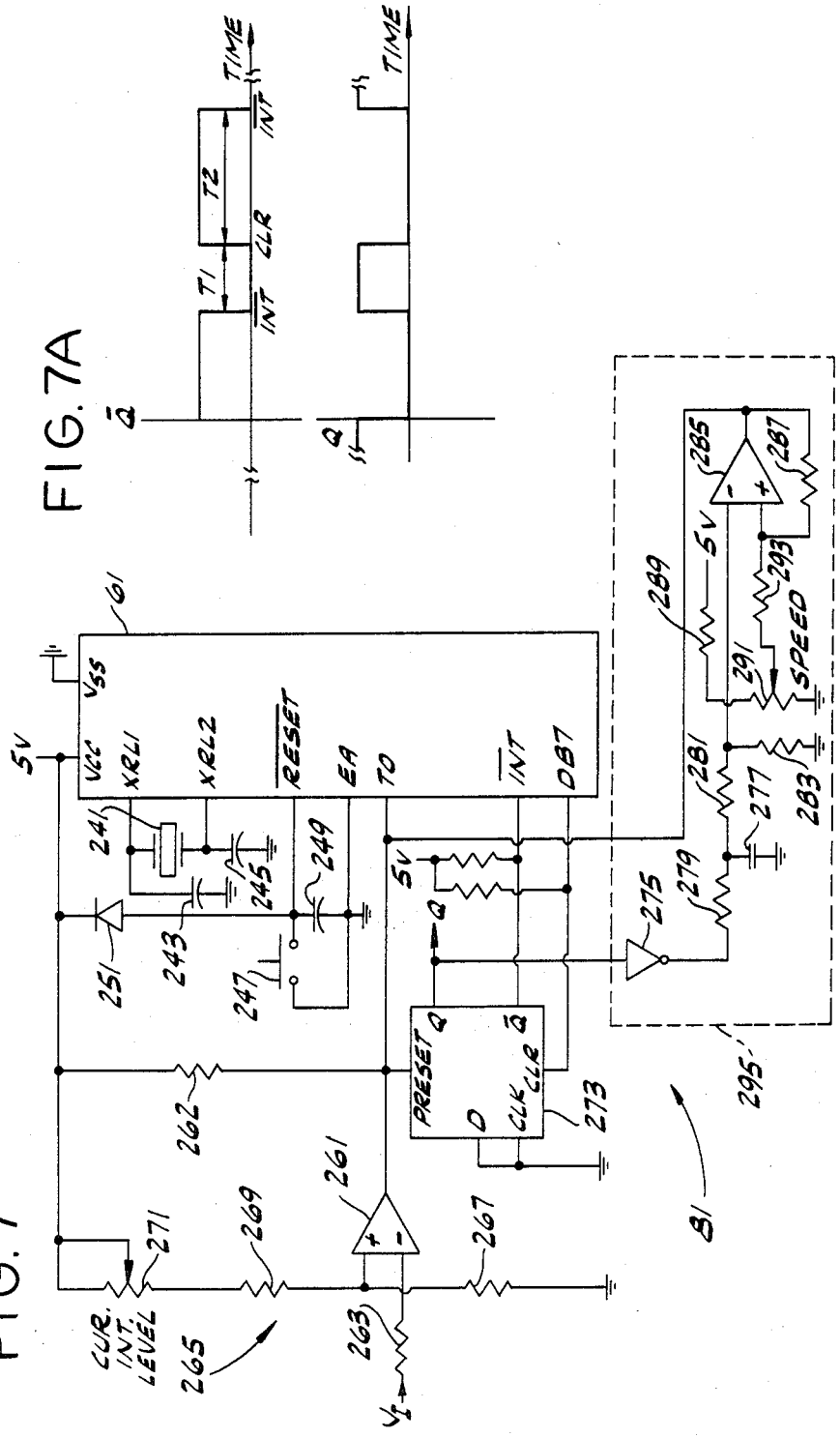

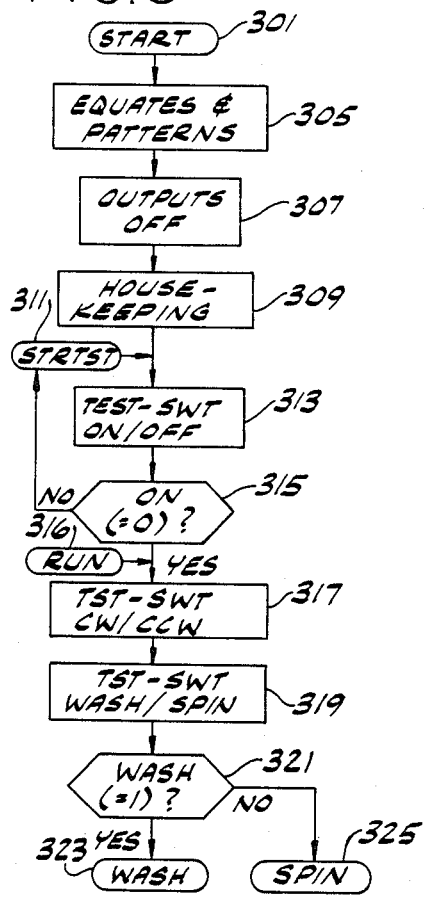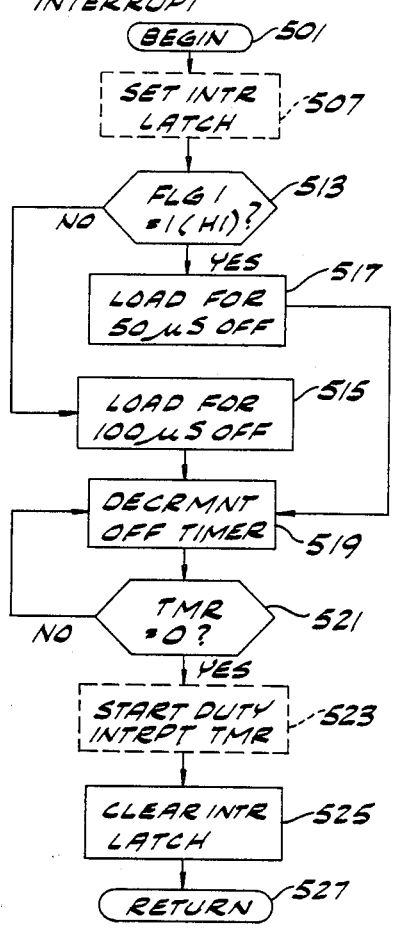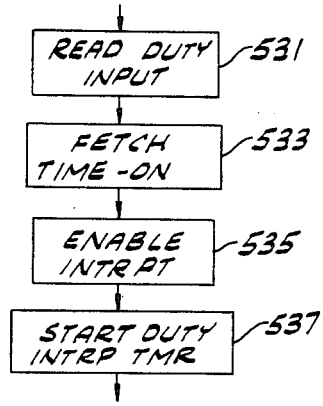

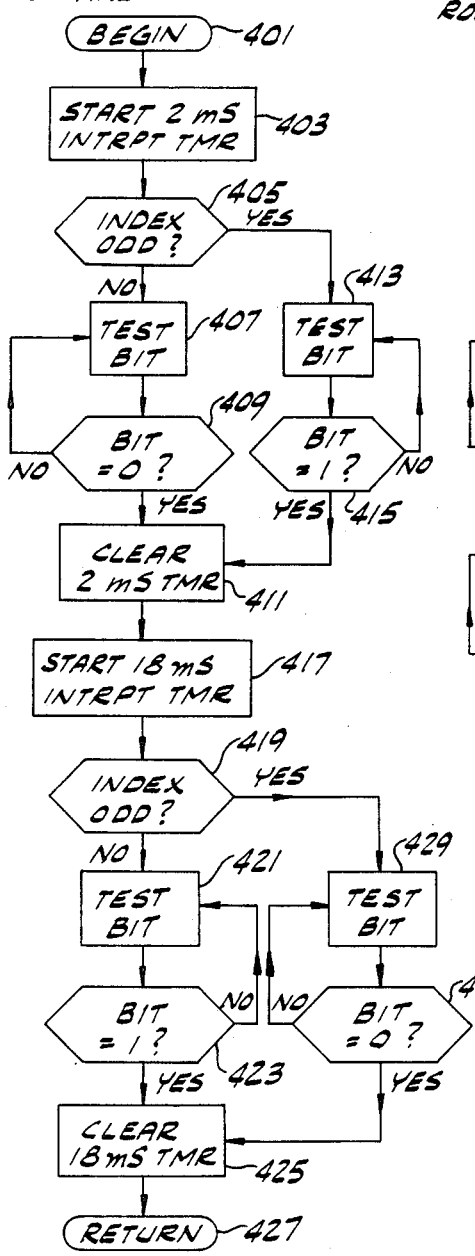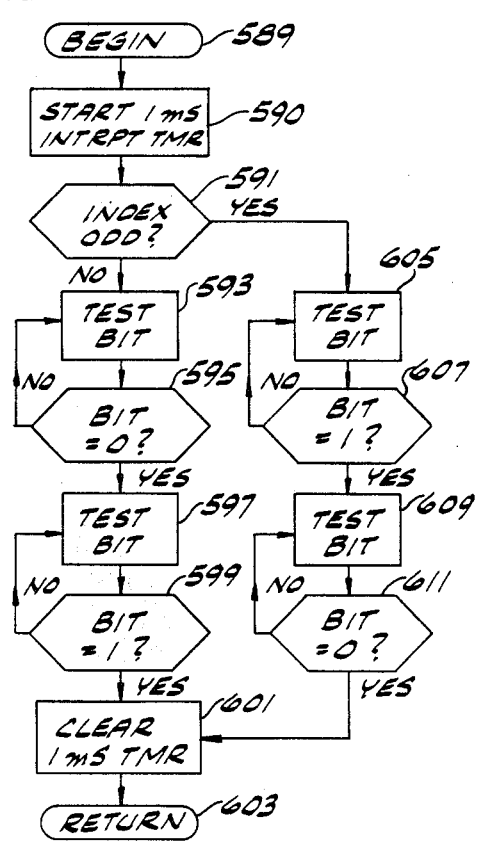

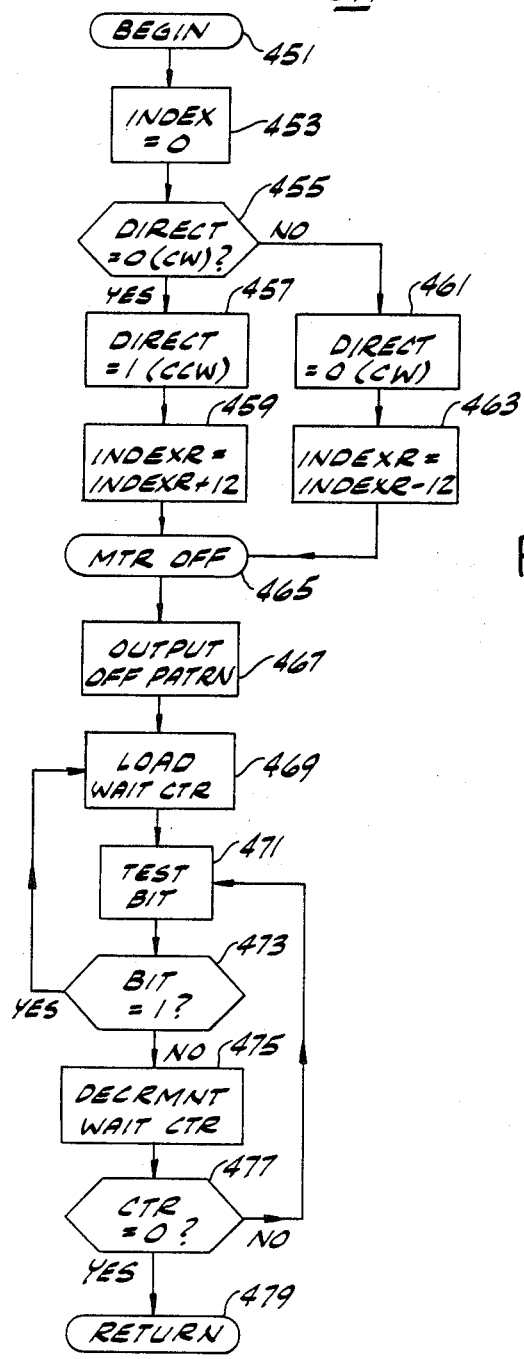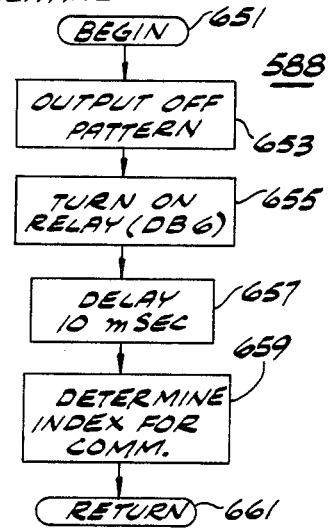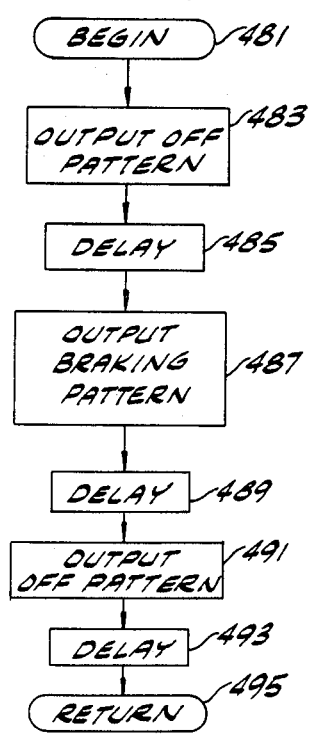

CONTROL SYSTEM FOR AN ELECTRONICALLY COMMUTATED MOTOR, METHOD OF CONTROLLING SUCH, METHOD OF CONTROLLING AN ELECTRONICALLY COMMUTATED MOTOR AND LAUNDRY APPARATUS

CROSS-REFERENCE TO RELATED APPLICATIONS

This application is a division of the commonly assigned copending parent application Ser. No. 602,163 filed Apr. 19, 1984, now U.S. Pat. No. 4,540,421, and is related to the commonly assigned copending John H. Boyd, Jr. and Alexander Muller application Ser. No. 710,899 filed Mar. 12, 1985 concurrently herewith entitled "Control System For An Electronically Commutated Motor", and each of such parent and related applications is incorporated herein by reference.

FIELD OF THE INVENTION

This invention relates in general to dynamoelectric machines and domestic appliances and more particularly to control systems with special applicability to electronically commutated motors, electronically commutated motor systems, laundry apparatus and other appliances, and methods for operating them.

BACKGROUND OF THE INVENTION

While conventional brush-commutated DC motors may have numerous advantageous characteristics such as convenience of changing operational speeds and direction of rotation, it is believed that there may be disadvantages, such as brush wear, electrical noise, and radio frequency interference caused by sparking between the brushes and the segmented commutator, that may limit the applicability of such brush-commutated DC motors in some fields such as the domestic appliance field including the laundry apparatus field. Electronically commutated motors, such as brushless DC motors and permanent magnet motors with electronic commutation, have now been developed and generally are believed to have the above-discussed advantageous characteristics of the brush-commutated DC motors without many of the disadvantages thereof while also having other important advantages. Such electronically commutated motors are disclosed in the David M. Erdman U.S. Pat. Nos. 4,005,347 and 4,169,990 and Floyd H. Wright U.S. Pat. No. 4,162,435, all of which are commonly assigned with the present application and are hereby incorporated by reference. These electronically commutated motors may be advantageously employed in many different fields or motor applications among which are domestic appliances, e.g., automatic washing or laundry machines such as disclosed in commonly assigned, co-pending U.S. patent application Ser. No. 412,421 filed Aug. 27, 1982, now U.S. Pat. No. 4,449,079; Ser. No. 367,951 filed Apr. 13, 1982, now U.S. Pat. No. 4,528,485; Ser. No. 400,319 filed July 21, 1982, now U.S. Pat. No. 4,532,459; Ser. No. 191,056 filed Sept. 25, 1980, now U.S. Pat. No. 4,459,519; Ser. No. 141,268 filed Apr. 17, 1980, now U.S. Pat. No. 4,390,826; Ser. No. 077,784 filed Sept. 21, 1979, now U.S. Pat. No. 4,327,302; and Ser. No. 463,147 filed Feb. 2, 1983.

Laundry machines as disclosed in the above patent applications are believed to have many significant advantages over the prior art laundry machines which employ various types of transmissions and mechanisms to convert rotary motion into oscillatory motion to selectively actuate the machine in its agitation washing mode and in its spin extraction mode. Such prior art laundry machines are believed to be more costly and more complicated to manufacture, consume more energy, and require more servicing. Laundry machines with electronically commutated motors require no mechanical means, other than mere speed reducing means, to effect oscillatory action of the agitator or tumbler, and in some applications, it is believed that the spin basket might be directly driven by such a motor. While the past control systems, such as those disclosed in the aforementioned coassigned applications for instance, undoubtedly illustrated many features, it is believed that the control systems for electronically commutated motors in general, and for such motors utilized in laundry machines, could be improved, as well as the methods of control utilized therein.

In some of the known control systems, the position of the rotatable assembly (i.e., the rotor) of the electronically commutated motor was located by sensing the back emf of one of the winding stages on the stationary assembly (i.e., the stator) thereof. More particularly the back emf of an unenergized winding stage was sensed and integrated to determine rotor position during any one commutation period in a sequence of commutation. With the advent of inexpensive microprocessor chips, controlling an electronically commutated motor with a microprocessor and discrete element control system has been described. Coassigned U.S. Pat. No. 4,250,544, "Combination Microprocessor and Discrete Element Control System for a Clock Rate Controlled Electronically Commutated Motor" issued Feb. 10, 1981, to R. P. Alley discloses such an arrangement and is hereby incorporated by reference. It is believed that further improvements and other departures can be made in methods and systems for controlling electronically commutated motors and for domestic appliance applications including laundering apparatus applications.

SUMMARY OF THE INVENTION

Among the objects of the present invention are to provide an improved control system for an electronically commutated motor, an improved method of controlling such system and an improved method for controlling an electronically commutated motor which do not require position sensing by integration during a commutation period; to provide such improved control system and methods which can screen out unexpected or accidentally produced signals and transients from a microprocessor or digital computer to maintain proper operation of the system and the motor; to provide such improved control system and methods which can reliably start an electronically commutated motor and insure its operation in a selected direction of rotation; to provide such improved control system and methods which protect the motor from excessive current; to provide such improved control system and methods which control the speed of the motor adjustably; to provide such improved control system and methods which sense the rotor position from the back emfs of the winding stages when the rotor is coasting and there are no commutation periods; to provide such improved control system and methods which are resistant to error in determining the rotor position from the back emfs of the winding stages when the rotor is coasting and there are no commutation periods; to provide such improved control system and methods which can commutate an electronically commutated motor in a preselected sequence, discontinue the commutating, and then resume commutating at a proper point in the sequence to keep the motor running smoothly determined from the back emfs of the winding stages when the commutating was discontinued; to provide such improved control system and methods which accelerate the motor in a low speed connection arrangement of the winding stages, change from the low speed connection arrangement to a higher speed connection arrangement of the winding stages and sense the rotor position to smoothly resume accelerating the motor in the high speed connection arrangement; to provide such improved control system and methods which brake the motor; to provide such improved control system and methods which smoothly and rapidly reverse the motor; to provide such improved control system and methods which periodically reverse the motor; and to provide such improved control system and methods which power at least some of the winding stages and rotate the rotor, and then leave all the winding stages temporarily unpowered and provide a current path for the previously powered winding stages to facilitate rotor position monitoring and accomplish other purposes.

Other objects and features will be in part apparent and in part pointed out hereinafter.

In general and in one form of the invention, a control system is provided for an electronically commutated motor including a stationary assembly having a plurality of winding stages adapted to be selectively commutated and rotatable means associated with the stationary assembly in selective magnetic coupling relation with the winding stages, and means is provided for commutating the winding stages by selectively supplying power thereto in response to a pattern of control signals leaving at least one of the winding stages unpowered at any one time while the other winding stages are powered. The control system comprises means coupled to the winding stages for simultaneously converting the voltages across the winding stages to digital form thereby to digitize the voltages, and means for producing successive patterns of digital signals in at least one preselected sequence, for selecting the digitized voltage across the at least one unpowered winding stage depending on the digital signal pattern produced and for producing a following pattern in sequence after at least one predetermined logic level of the selected digitized voltage has occurred. Means is also responsive to the successive patterns of the digital signals for generating the successive patterns of the control signals for the commutating means.

In general, and in a method form of the invention, a method for controlling a system having an electronically commutated motor including a stationary assembly having a plurality of winding stages adapted to be selectively commutated, and rotatable means associated with the stationary assembly in selective magnetic coupling relation with the winding stages, and means for commutating the winding stages by selectively supplying power thereto in response to a pattern of control signals leaving at least one of the winding stages unpowered at any one time while the other winding stages are powered, comprises the steps of digitizing the voltages across the winding stages and generating successive patterns of the control signals for the commutating means in response to successive patterns of digital signals. Data is prestored representing at least one preselected sequence of the patterns of the digital signals. Data is also prestored corresponding to each pattern of the digital signals, identifying the respective digitized voltage for the at least one unpowered winding stage. One of the patterns of the digital signals is successively produced and only the identified digitized voltage corresponding to the one pattern is sensed. The following pattern in sequence is produced after at least one predetermined logic level of the identified digitized voltage has occurred.

Generally, and in another method form of the invention, a method for controlling a system having an electronically commutated motor including a stationary assembly having a plurality of winding stages adapted to be selectively commutated, and rotatable means associated with the stationary assembly in selective magnetic coupling relation with the winding stages, first and second conductors for supplying power, and means for commutating the winding stages and producing a current in the winding stages by selectively switching the winding stages to the supply conductors in response to a pattern of control signals, comprises the steps of producing successive patterns of digital signals in at least one preselected sequence and generating patterns of the control signals for the commutating means in response to the successive patterns of the digital signals. The current in the winding stages of the electronically commutated motor is compared with a predetermined level, and a preestablished pattern of the digital signals is produced for a predetermined period of time to reduce the current in the winding stages, whenever the predetermined level is exceeded. The current reducing pattern of the digital signals is periodically produced at an adjustable rate when the predetermined level is not exceeded.

Generally, and in a still further form of the invention, a control system for an electronically commutated motor including a stationary assembly having a plurality of winding stages adapted to be selectively commutated, and rotatable means associated with the stationary assembly in selective magnetic coupling relation with the winding stages, first and second conductors for supplying power, and a circuit for commutating the winding stages and producing a current in the winding stages by selectively switching the winding stages to the supply conductors in response to a pattern of control signals, comprises a circuit for generating patterns of the control signals for the commutating circuit in response to the successive patterns of the digital signals and a circuit for comparing the current in the winding stages of the electronically commutated motor with a predetermined level. A further circuit is provided for producing the successive patterns of digital signals in at least one preselected sequence for the generating circuit, for producing in response to the comparing circuit a preestablished pattern of the digital signals to reduce the current in the winding stages upon the predetermined level being exceeded, for monitoring the voltage across the winding stages to monitor the position of the rotatable means when the current is being reduced, and for resuming producing the successive patterns of digital signals in sequence after a predetermined time interval.

Generally, and in yet a further form of the invention, a control system for an electronically commutated motor including a stationary assembly having a plurality of winding stages adapted to be selectively commutated, and rotatable means associated with the stationary assembly in selective magnetic coupling relation with the winding stages, and means for commutating the winding stages by selectively supplying power thereto in response to a pattern of control signals leaving at least one of the winding stages unpowered at any one time while the other winding stages are powered, comprises a circuit coupled to the winding stages for converting the voltages across the winding stages to digital form thereby to digitize the voltages. The circuit for digitizing the voltages is combined with a circuit for producing successive patterns of the control signals in at least one preselected sequence to rotate the rotatable means, for subsequently producing a pattern of the control signals which causes the commutating means to leave all of the winding stages temporarily unpowered, for sensing the digitized voltages while the winding stages are temporarily unpowered and then resuming producing the successive patterns of the control signals in sequence beginning with a pattern of the control signals determined from the sensed digitized voltages.

In general, and in an additional form of the invention, a control system for an electronically commutated motor including a stationary assembly having a plurality of winding stages adapted to be selectively commutated, and rotatable means associated with the stationary assembly in selective magnetic coupling relation with the winding stages, comprises a circuit for cummutating the winding stages by selectively supplying power thereto in response to a pattern of control signals leaving at least one of the winding stages unpowered at any one time while the other winding stages are powered. Another circuit responds to successive patterns of digital signals for generating the successive patterns of the control signals for the commutating circuit. Still another circuit is provided for producing the successive patterns of the digital signals in at least one preselected sequence, and for subsequently producing a different pattern of the digital signals which causes the commutating means to connect all of the winding stages together, thereby braking the motor.

In general, and in a further method form of the invention, a method for controlling an electronically commutated motor including a stationary assembly having a plurality of winding stages adapted to be selectively commutated, and rotatable means associated with the stationary assembly in selective magnetic coupling relation with the winding stages, and means for commutating the winding stages by selectively supplying power thereto in response to a pattern of control signals leaving at least one of the winding stages unpowered at any one time while the other winding stages are powered, comprises the steps of producing successive patterns of the control signals in at least one preselected sequence for commutating the winding stages in a first connection arrangement and producing a pattern of the control signals which causes the commutating means to leave all of the winding stages temporarily unpowered. The winding stages are switched to a second connection arrangement, and the position of the rotating means is sensed while the winding stages are temporarily unpowered. Production of the successive patterns of the control signals in sequence is resumed beginning with a pattern of the control signals determined from the position of the rotating means sensed while the winding stages are temporarily unpowered.

Generally, and in still another method form of the invention, a method for controlling an electronically commutated motor including a stationary assembly having a plurality of winding stages adapted to be selectively commutated, and rotatable means associated with the stationary assembly in selective magnetic coupling relation with the winding stages, and a circuit for commutating the winding stages by selectively supplying power thereto in response to a pattern of control signals leaving at least one of the winding stages unpowered at any one time while the other winding stages are powered, comprises the steps of converting the voltages across the winding stages to digital form thereby to digitize the voltages and producing successive patterns of the control signals in at least one preselected sequence to commutate the winding stages and rotate the rotatable means. A pattern of the control signals is subsequently produced which causes the commutating circuit to leave all of the winding stages temporarily unpowered. The digitized voltages are sensed while the winding stages are temporarily unpowered. A pattern of the control signals is determined from the sensed digitized voltages. Production of the successive patterns of the control signals in sequence is resumed beginning with the pattern so determined.

In general, and in an even further method form of the invention, a method for controlling an electronically commutated motor including a stationary assembly having a plurality of winding stages adapted to be selectively commutated, and rotatable means associated with the stationary assembly in selective magnetic coupling relation with the winding stages, and means for commutating the winding stages by selectively supplying power thereto in response to a pattern of control signals leaving at least one of the winding stages unpowered at any one time while the other winding stages are powered, comprises the steps of generating successive patterns of the control signals for the commutating means in response to successive patterns of digital signals and producing the successive patterns of the digital signals in at least one preselected sequence. A different pattern of the digital signals is produced which causes the commutating means to connect all of the winding stages together, thereby braking the motor.

In general, and in a yet additional form of the invention, a control system for an electronically commutated motor including a stationary assembly having a plurality of winding stages adapted to be selectively commutated, and rotatable means associated with the stationary assembly in selective magnetic coupling relation with the winding stages, and first and second conductors for supplying power, comprises a circuit for commutating the winding stages in response to successive patterns of control signals leaving at least one of the winding stages unpowered at any one time while the other winding stages are powered. The commutating circuit includes sets of electronic devices connected across the supply conductors, each set having a junction point connected to a respective one of the winding stages. Each of the electronic devices is respectively able to be switched by a corresponding one of the control signals in each pattern of control signals. The control system includes a circuit for producing the successive patterns of the control signals in at least one preselected sequence to switch on only one electronic device in each of at least two of the sets of the electronic devices at once and cause a current to flow in the winding stages to rotate the rotatable means, and for subsequently producing a pattern of the control signals to switch off one of the electronic switching devices which was previously switched on so that the commutating means leaves all of the winding stages temporarily unpowered and also provides a current path for the previously-powered winding stages.

Generally, and in a yet further additional form of the invention, a control system for an electronically commutated motor including a stationary assembly having a plurality of winding stages adapted to be selectively commutated, and rotatable means associated with the stationary assembly in selective magnetic coupling relation with the winding stages, and a circuit for commutating the winding stages by selectively supplying power thereto in response to a pattern of control signals leaving at least one of the winding stages unpowered at any one time while the other winding stages are powered, comprises a circuit coupled to the winding stages for simultaneously converting the voltages across the winding stages to digital form thereby to digitize the voltages and a circuit responsive to successive patterns of digital signals for generating successive patterns of the control signals for the commutating circuit. The control system includes a circuit for producing successive patterns of the digital signals in a first preselected sequence, producing a different pattern of the digital signals for causing the commutating circuit to remove power from all of the winding stages, sensing the digitized voltages while the power is so removed, and producing successive patterns of the digital signals in a second preselected sequence to rotate the rotatable means in the reverse direction after a predetermined time period has elapsed subsequent to the last occurrence of a predetermined logic level in any of the digitized voltages.

BRIEF DESCRIPTION OF THE DRAWINGS

FIG. 4 is a schematic diagram of the control signal generator with the microcomputer of FIG. 1;

FIG. 4A is a diagram of current flowing in the motor as a result of commutation in a preselected sequence;

FIG. 5 is a voltage versus time diagram of a waveform of voltage across an unpowered winding stage of the motor during a commutation period;

FIG. 6 is a schematic diagram of the voltage digitizing circuit and of switches for providing commands to the microcomputer of FIG. 1 according to the invention;

FIG. 6A is a voltage versus time diagram of a digitized voltage to which the voltage of FIG. 5 is converted in accordance with the invention;

FIG. 7 is a schematic diagram of the current interrupt and speed controlling circuit of FIG. 1 in accordance with the invention;

FIG. 7A is a voltage versus time diagram of outputs Q and Q-bar of a latch or flipflop in the circuit of FIG. 7 for interrupting the microcomputer and causing the control signal generator of FIG. 1 to generate a pattern of control signals to reduce the current flowing in the winding stages of the motor;

FIG. 8 is part of a flow diagram of operations of the microcomputer of FIG. 1 in accordance with the invention;

FIG. 10 is a flow diagram of operations performed by the microcomputer of FIG. 1 in accordance with the invention in a low speed back emf routine of FIG. 9;

FIG. 11 is a flow diagram of operations performed by the microcomputer of FIG. 1 in accordance with the invention in a reversing routine of FIG. 9;

FIG. 11A is a flow diagram of operations performed by the microcomputer of FIG. 1 in accordance with the invention for braking the motor as during a reversing routine;

FIG. 12 is a flow diagram of operations performed by the microcomputer of FIG. 1 in accordance with the invention upon interruption by output Q-bar of FIG. 7A;

FIG. 13 is a flow diagram of operations performed by the microcomputer of FIG. 1 in accordance with the invention for varying a duty cycle for the circuit of FIG. 7;

FIG. 15 is a flow diagram of operations performed by the microcomputer of FIG. 1 in accordane with the invention in a high speed back emf routine of FIG. 14;

FIG. 17 is a flow diagram of operations performed by the microcomputer of FIG. 1 in accordance with the invention in a relaying routine of FIG. 14;

FIG. 18 shows voltage versus time diagrams of waveforms of the digitized voltages of all of the winding stages when the rotor of the motor is coasting clockwise or counterclockwise as during the relaying routine of FIG. 17.

Corresponding reference characters refer to corresponding parts throughout the several views of the drawings.

The exemplifications set out herein illustrate preferred embodiments of the invention in one form thereof, such exemplifications are not to be construed as limiting the scope of the invention in any manner.

DETAILED DESCRIPTION OF PREFERRED EMBODIMENTS

Figure 1:
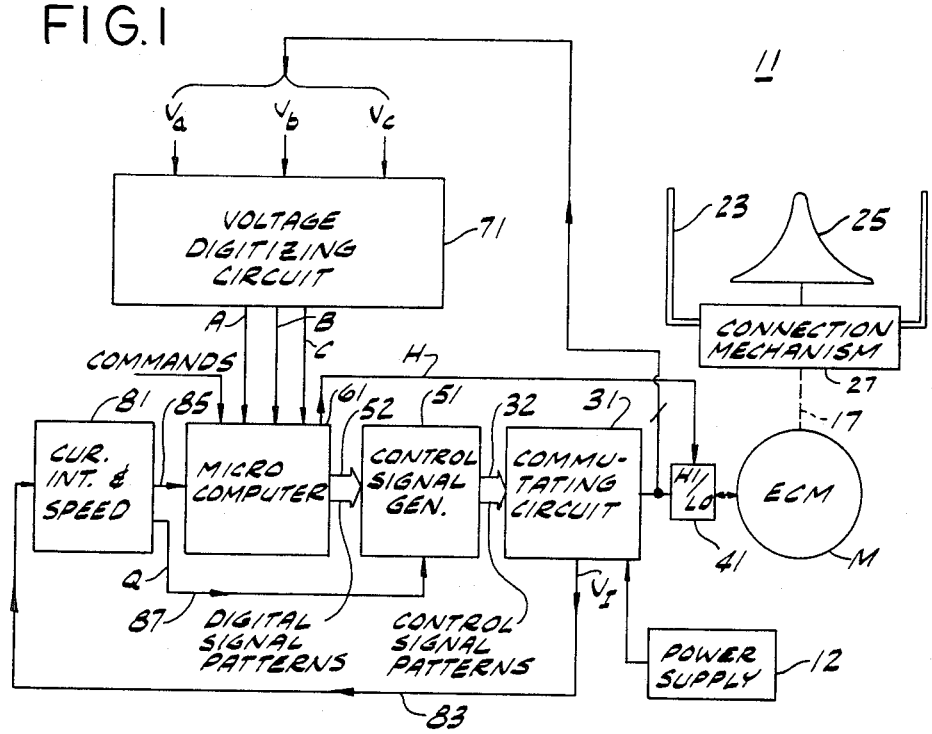
FIG. 1 is a block diagram showing a control system having a high-low speed switching circuit, a commutating circuit, a power supply, a control signal generator, a microcomputer, a voltage digitizing circuit, and a current interrupt and speed controlling circuit with an electronically commutated motor in a laundry machine according to the invention.
Figure 2:
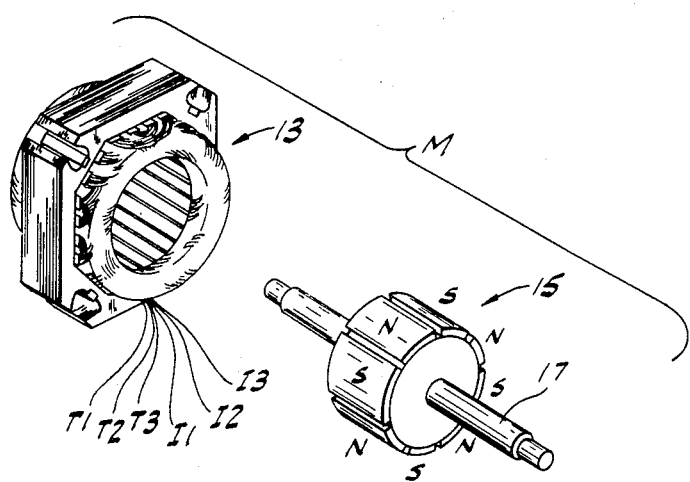
FIG. 2 is an exploded, perspective view of the main elements of an electronically commutated DC motor which is controllable by the control system of FIG. 1.
Figure 3:
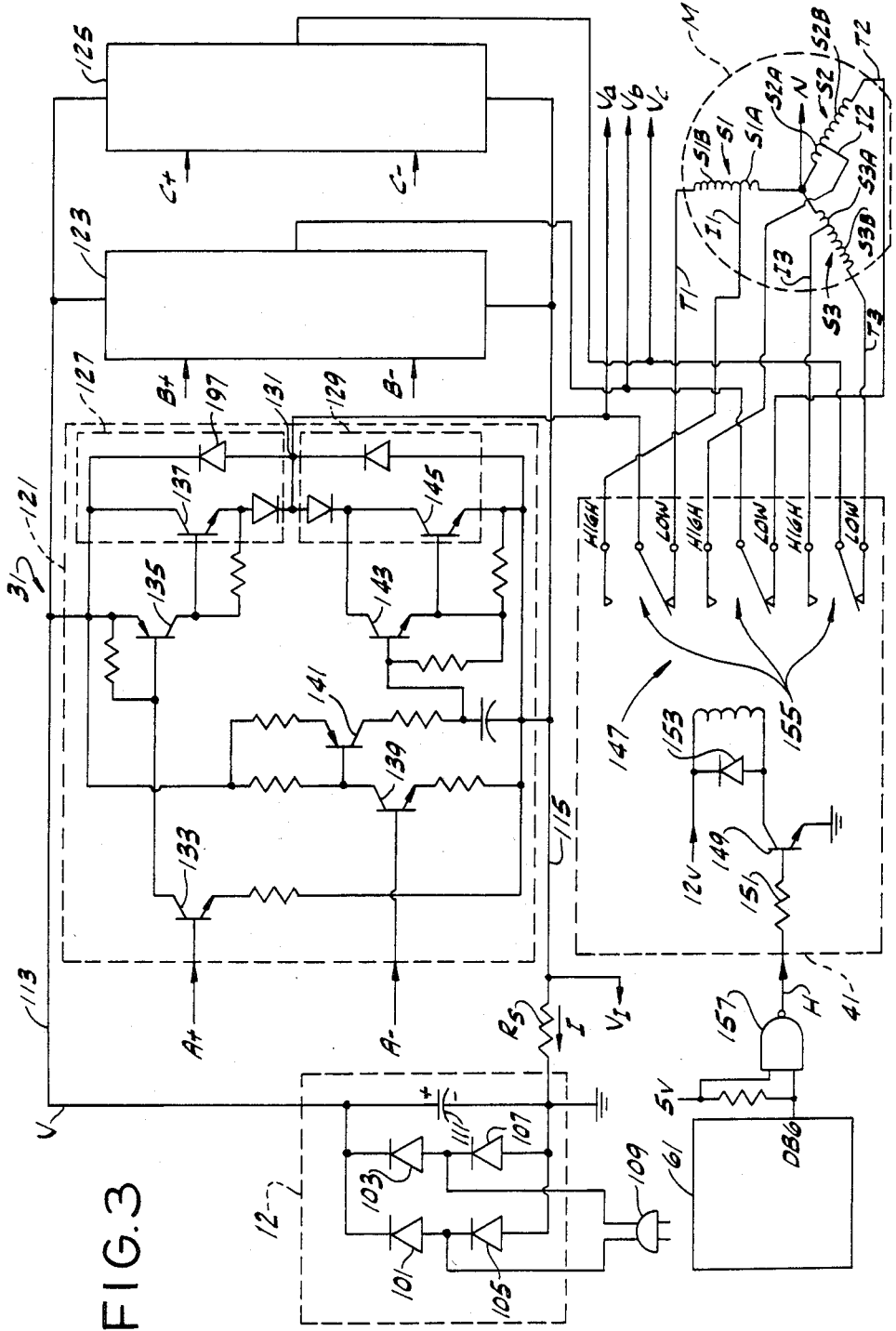
FIG. 3 is a schematic diagram of the high-low speed switching circuit, the commutating circuit, the power supply and the motor of FIG. 1.

Referring now to the drawings, and more particularly to FIG. 1, a laundry apparatus 11 includes an electronically commutated motor (ECM) M adapted to be energized from a DC power supply 12 and having (see FIG. 2) a stationary assembly including a stator 13 and a rotatable assembly including a permanent magnet rotor 15 and a shaft 17. Stator 13 includes a plurality (e.g., three) of winding stages S1, S2 and S3 (FIG. 3). Winding stages S1, S2 and S3 have coil sets or sections S1A and S1B, S2A and S2B, and S3A and S3B respectively. Winding stages S1, S2 and S3 are adapted to be electronically commutated in at least one preselected sequence. Each winding stage has an end terminal T1, T2, and T3, respectively, and an intermediate tap I1, I2, and I3, respectively. The winding stages S1, S2, and S3 are adapted to be electronically commutated at end terminals T1, T2, and T3, so that both coil sets or sections in each winding stage are commutated, for turning the rotor 15 at a low speed. It is noted that sections S1A, S2A, and S3A define tapped sections of the winding stages which are adapted to be electronically commutated at intermediate taps I1, I2, and I3 respectively for turning rotor 15 at a higher speed. When the winding stages S1, S2, and S3 are energized or powered in a temporal sequence, three sets of eight magnetic poles are established that provide a radial magnetic field that moves clockwise or counterclockwise around the bore or stator 13 depending on the preselected sequence or order in which the stages are powered. This moving field intersects with the flux field of the permanent magnet rotor to cause the rotor 15 to rotate relative to the stator 13 in the desired direction to develop a torque which is a direct function of the intensities or strengths of the magnetic fields. If a more detailed description of the construction of electronically commutated motor M is desired, reference may be had to the aforementioned application Ser. No. 367,951 filed Apr. 13, 1982 to John H. Boyd, Jr. which is incorporated herein by reference.

ECM M thus constitutes an electronically commutated motor including a stationary assembly having a plurality of winding stages adapted to be selectively commutated, and rotatable means associated with the stationary assembly in selective magnetic coupling relation with the winding stages. Further, while electronically commutated motor M is illustrated herein for purposes of disclosure, it is contemplated that other such motors of different constructions, having 2, 4, 6, etc. poles and having 2, 3, 4 or more winding stages and/or different winding arrangements may be utilized in one or another form of the invention so as to meet at least some of the objects thereof.

The winding stages of motor M as explained for instance in the aforementioned Alley U.S. Pat. No. 4,250,544 are commutated without brushes by sensing the rotational position of the rotatable assembly or rotor 15 as it rotates within the bore of stator 13 and utilizing electrical signals generated as a function of the rotational position of the rotor to sequentially apply a DC voltage to each of the winding stages in different preselected orders or sequences that determine the direction of the rotation of the rotor. Position sensing may be accomplished by a position detecting circuit responsive to the back emf of the ECM to provide a simulated signal indicative of the rotational position of the ECM rotor to control the timed sequential application of voltage to the winding stages of the motor.

Referring back to FIG. 1, laundry apparatus 11 also has a basket 23 which is rotatable within a tub (not shown) which holds the water for washing the fabrics to be laundered, and a coaxially mounted agitator 25, both of which are rotatable independently or jointly about their common axis. Agitator 25 and basket 23 together comprise means operable generally in a washing mode for agitating water and fabrics to be laundered therein and operable generally in a spin mode for thereafter spinning the fabrics to effect centrifugal displacement of water from the fabrics. However, it is contemplated that such means may also include only a basket which is mounted on a horizontal or inclined axis and there is no separate finned agitator but the basket is operated in an oscillatory mode to agitate the wash water and fabrics to launder them. Upon the commutation of the winding stages, the rotatable assembly of motor M drives the agitating and spinning means and is coupled selectively to the agitator alone during the washing mode operation and to both the basket and the agitator in the spin mode operation through a connection mechanism 27 which suitably comprises a fixed ratio speed reducer, such as a gear box or a pulley arrangement, for instance, or in some applications, the shaft 17 of motor M can be directly coupled to the agitator and the basket. The rotatable assembly of motor M and any such fixed ratio speed reducer constitute means for driving the agitating and spinning means in the washing mode operation and in the spin mode operation thereof upon the commutation of the winding stages.

Commutating circuit 31 is provided with power from power supply 12 and constitutes means for commutating the winding stages by selectively supplying or switching power thereto in response to a pattern of control signals 32 leaving at least one of the winding stages unpowered at any one time while the other winding stages are powered. Commutation circuit 31 also constitutes means for controlling the application of DC voltage to the winding stages to provide a resultant effective voltage thereto.

A high-low speed switching circuit 41 couples communicating circuit 31 to motor M, and constitutes means operable generally for switching the winding stages from a first connection arrangement (connecting each of winding stages S1, S2, S3 as a whole through termnals T1, T2, and T3 to commutating circuit 31) to a second connection arrangement (connecting the coil sections S1A, S2A, S3A of the winding stages S1, S2, and S3 through terminals I1, I2, and I3 to commutating circuit 31). In the present embodiment the first connection arrangement is a low speed connection arrangement and the second connection arrangement is a higher speed connection arrangement. It is to be understood that other connection arrangements involving two or more speeds, or not involving speed considerations at all are contemplated in the practice of the invention for accomplishing the objects thereof. High-low speed switching circuit 41 is responsive to a High on line H for relaying the winding stages from the low speed connection arrangement to the high speed connection arrangement and responsive to a Low on line H for relaying the winding stages from the high speed connection arrangement to the low speed connection arrangement.

Commutating circuit 31 responds to a set of six control signals, collectively designated 32 and individually designated A+, A−, B+, B−, C+, and C−, from a control signal generator 51. Since each of the control signals A+, A−, B+, B−, C+, and C− can be high or low, there are $2^6$ or 64 permutations or patterns of the control signals. Control signal generator 51 constitutes means responsive to successive patterns or digital signals 52 for generating successive patterns of the control signals 32 for the commutating circuit 31.

A microcomputer 61 in FIG. 1 produces successive patterns of the digital signals 52 in at least one preselected sequence, which causes the control signal generator 51 to produce successive patterns of the control signals 32 in the at least one preselected sequence and in turn cause the motor M to be commutated in the at least one preselected sequence by the commutating circuit 31 to make the rotor 15 turn. The direction of rotation which results is clockwise when a first preselected sequence is used, and counterclockwise when a second preselected sequence is used.

In the preferred embodiment disclosed herein, microcomputer 61 is an Intel 8748 microcomputer having 1K bytes of user programmable and erasable read only memory (EPROM), an 8 bit central processing unit (CPU), 27 input/output (I/O) lines, an 8-bit timer counter, reset and interrupt capability, and an on-board oscillator and clock. The instruction set for the 8748 is set forth in MSC-48(R) *Family of Single Chip Microcomputers User's Manual*, Intel Corporation, Santa Clara, Calif., September, 1981, pages 4-5, in addition to other technical information. Since the implementation and use of microcomputers as a general matter is well known to the person skilled in the art, the details of the 8748 are omitted for brevity. The microcomputer 61 is shown as a rectangle in several of the Figures with only those pin designations for the 8748 shown for connections involved in the operations and circuits of any given Figure, all other pins in a given Figure being suppressed for clarity. It is to be understood that the 8748 is but one example of a digital computer which can be utilized in the practice of the invention. In addition, it is contemplated that the functions of the microcomputer illustrated in the drawings can be alternatively implemented in the practice of the invention by any appropriate means, including but not limited to digital or analog circuits of a variety of types whether operating from a stored program, utilizing firmware, or being implemented in hardware, in custom or semicustom integrated circuit form or having discrete components.

A voltage digitizing circuit 71 is coupled to the winding stages and receives their terminal voltages $V_a$, $V_b$, and $V_c$ through high-low speed switching circuit 41 and constitutes means for simultaneously converting the voltages across the winding stages to digital form thereby to digitize the voltages. Digitizing circuit 71 also constitutes means for generating a first logic level when the voltage across a respective winding stage exceeds a predetermined value and a second logic level when the voltage across it falls below the predetermined value, the digital form of the voltage across each respective winding stage comprising the logic levels so generated. Digitizing circuit 71 has outputs A, B, and C which are connected to corresponding inputs of microcomputer 61.

Microcomputer 61 of FIG. 1 constitutes means for producing successive patterns of digital signals in at least one preselected sequence, for selecting the digitized voltage across the at least one unpowered winding stage depending on the digital signal pattern produced, and for producing a following pattern in sequence after at least one predetermined logic level of the selected digitized voltage has occurred. In the preferred embodiment the following pattern in sequence is produced after complementary logic levels of the selected digitized voltage have occurred in a predetermined order depending on the pattern which is being produced. Microcomputer 61 is a digital computer operating under stored program control and having inputs for the digitized voltages on lines A, B, and C. Microcomputer 61 has memory elements for storing data representing at least one preselected sequence of the patterns of the digital signals and for storing data, corresponding to each pattern of the digital signals, identifying the respective input for the digitized voltage for the at least one unpowered winding stage. Microcomputer 61 successively produces one of the patterns of the digital signals, senses only the digitized voltage at the indentified input corresponding to the one pattern and produces the following pattern in sequence after at least one predetermined logic level of the digitized voltage at the identified input has occurred. When the motor M is first being started, there is no back emf to digitize until the rotor 15 begins to rotate. For this reason, microcomputer 61 operates to produce the following pattern in sequence after a predetermined time period if the at least one predetermined logic level of the selected digitized voltage has not occurred during the predetermined time period. Then as soon as the rotor 15 begins to turn, the following pattern is produced in sequence in response to the digitized voltage and the successive patterns are effectively synchronized with the rotor and accelerate the rotor to an operating speed.

Current interrupt and speed controlling circuit 81 compares the current flowing in the other powered winding stages of the electronically commutated motor M with a predetermined level by sensing a voltage $V_I$ proportional to the current on line 83, and upon the level being exceeded, interrupting microcomputer 61 on line 85 and sending a signal Q on line 87 for causing the control signal generator 51 to generate a pattern of control signals 32 to reduce the current.

In FIG. 3 power supply 12 has diodes 101, 103, 105 and 107 connected as a full wave bridge rectifier for 117 volt single phase AC power received at plug 109. Full wave rectified DC is filtered by capacitor 111 and applied as voltage V across first and second conductors 113 and 115 for supplying DC power to commutating circuit 31 and motor M. A voltage drop $V_I$ is developed across shunt resistor $R_S$ proportional to the current from power supply 12 which is flowing in the motor M.

Commutating circuit 31 is composed of three identical switching circuits 121, 123, and 125 which selectively switch the winding stages to supply conductors 113 and 115 leaving at least one of the winding stages unpowered at any one time while the other winding stages are powered. For conciseness only switching circuit 121 is described in further detail.

Switching circuit 121 has a set or pair of series-connected upper and lower electronic devices 127 and 129 connected across the supply conductors 113 and 115. The pair of devices 127 and 129 has a junction point 131 connected through high-low speed switching circuit 41 to winding stage S1 in the connection arrangement selected by high-low speed switching circuit 41.

Switching circuits 123 and 125 are respectively connected to winding stages S2 and S3 similarly.

The switching circuits 121, 123, and 125 each constitute sets of electronic devices connected across supply conductors 113 and 115, each set having at least one junction point connected to a respective one of the winding stages. Each of the electronic devices, e.g., 127 and 129, is able to be switched by a corresponding one of the control signals in each pattern of control signals 32. For instance, when control signal A+ is high, transistors 133 and 135 turn on transistor 137 in electronic device 127. When control signal A− is high, transistors 139, 141, and 143 turn on transistors 145 in electronic device 129. When transistor 137 is on in electronic device 127, and a relay 147 in high-low speed switching circuit 41 is set as shown in FIG. 3, then winding stage S1 terminal T1 is effectively switched to supply conductor 113. When transistor 137 is off in electronic device 127 and transistor 145 is on in electronic device 129, winding stage S1 terminal T1 is switched to supply conductor 115.

It is evident that when a control signal A+, B+, or C+ is High, a corresponding winding stage S1, S2, or S3 is switched to supply conductor 113, and when a control signal A−, B−, or C− is High, a corresponding winding stage S1, S2, or S3 is switched to supply conductor 115.

Relay 147 in High-low speed switching circuit 41 has three-pole-double-throw (3PDT) contacts for electrically substituting sections S1A, S2A, and S3A of the winding stages S1, S2, and S3 in place of the winding stages as a whole. The winding stages are connected together at neutral N. Relay 147 is driven by transistor 149. Transistor 149 is protected by base resistor 151 and freewheeling diode 153. When a High appears on line H, transistor 149 conducts, closing relay 147 and moving relay armature 155 upward from the Low Speed position shown to a High Speed position, which accomplishes the substitution of the high speed winding sections S1A, S2A, S3A in place of the winding stages S1, S2, S3 and thereby selectively electrically energizes at least one of the winding sections S1A, S2A, S3A of each winding stage S1, S2, S3 to effect commutation. When relaying from low to high speed is to occur, microcomputer 61 outputs a Low on line DB6, which is inverted by NAND-gate 157 and fed as the High on line H.

Lines marked for voltages $V_a$, $V_b$, and $V_c$ are connected to relay armature 155 to allow sensing of voltages on terminals T1, T2, T3 or I1, I2, I3 for each winding stage as selected by relay 147. The $V_a$, $V_b$, $V_c$ lines are connected to the voltage digitizing circuit 71 as shown in FIG. 1.

In FIG. 4, control signal generator 51 generates successive patterns of highs and lows for control signals 52 on the lines respectively marked for each control signal A+, A−, B+, B−, C+, and C− which are fed to the correspondingly marked inputs of commutating circuit 31 of FIG. 3. The successive patterns of the control signals are produced in response to successive patterns of digital signals produced by microcomputer 61 on lines 62.

Control signal generator 51 acts in the preferred embodiment as a protective device and switching means for pulse width modulation. If a pair of the control signals having the same letter designation, such as A+ and A−, where both high simultaneously, electronic devices 127 and 129 of FIG. 3 could short the supply conductors 113 and 115. Microcomputer 61 is capable of producing patterns of digital signals at extremely high rates, and an undesired pattern of control signals such as A+,A− high should not be permitted to occur over an extended period of operation. Control signal generator 51 is hardwired logic circuitry which constitutes means for preventing control signal patterns such as A+,A− high from being generated regardless of the patterns of digital signals produced by microcomputer 61.

Control signal generator 51 has three identical protective circuits 161, 163, and 165. For conciseness, only protective circuit 161 is described in detail. Protective circuit 161 has first and second AND-gates 167 and 169 feeding control signals A+ and A− to the sets of electronic devices 127 and 129. AND-gates 167 and 169 have inputs 171 and 173 driven by a respective pair of digital signals through inverting buffers 175 and 176 from port P2 lines 0 and 3 from microcomputer 61. Corresponding AND-gates in protective circuits 163 and 165 respectively feed control signals B+, B− and C+, C− to switching circuits 123 and 125 in FIG. 3. These corresponding AND-gates in protective circuits 163 and 165 have their own inputs driven by digital signal pairs through inverting buffers 177,178 (port P2 lines 2 and 5) and inverting buffers 174,180 (port P2, lines 4 and 1) respectively.

Exclusive-OR gate 183 has inputs connected to the inputs of AND-gates 167 and 169 driven by a pair of the digital signals. Exclusive-OR gate 183 has its output feeding both AND-gates 167 and 169 for disabling them when the pair of digital signals on lines 0 and 3 of port P2 have identical logic levels in the pair. Exclusive-OR gates corresponding to gate 183 in protective circuits 163 and 165 are identically wired so that no pair of the control signals 52 having the same letter designation can become high simultaneously. In this way the contingency of control signals occurring which could short the power supply is prevented, and reliability is enhanced.

Control signal generator 51 thus constitutes means for preventing at least one pattern of control signals 52 from being generated regardless of the patterns of digital signals on lines 62 produced by microcomputer 61.

Microcomputer 61 produces an additional pair of digital signals, which are different in logic level from each other, on lines 7 and 6 of port P2 which respectively feed NAND gates 185 and 187. A disabling input Q on line 87 is provided to both NAND gates 185 and 187 when power is to be removed from the winding stages. In this way NAND-gates 185 and 187 constitute means for disabling in response to disabling signal Q a single one of the NAND-gates 167 and 169 in each of the protective circuits 161, 163, and 165. The NAND-gate 167 or 169 to be disabled in each protective circuit is effectively identified by the additional pair of digital signals on lines 7 and 6.

The control signal patterns during commutation are normally the logical complements of the digital signal patterns on lines 0–5 from port P2. FIG. 4A illustrates currents 190 being caused to flow in motor M in the low speed connection arrangement in a preselected sequence 190.0, 190.1, 190.2, 190.3, 190.4, 190.5 in response to successive patterns of the control signals 52. Terminals T1, T2, and T3 of motor M are selectively switched to "+" supply conductor 113 of FIG. 3 and to "−" supply conductor 115 depending on the direction of desired current flow indicated by the current arrows in FIG. 4A. For instance, the first current 190.0 in the sequence is to flow inside motor M from terminal T1 to terminal T3. Terminal T1 is switched to "+" conductor 113 by A+ high, and terminal T3 is switched to "−" conductor 115 by C− high. Next, current 190.1 is produced by keeping C− high, returning A+ low to disconnect terminal T1, and bringing B+ high to connect terminal T2 to "+" conductor 113. Next, current 190.2 is produced by keeping B+ high, returning C− low, to disconnect terminal T3, and bringing A− high to connect terminal T1 to "−" conductor 115. The sequence is continued to produce currents 190.3, 190.4, and 190.5 and then repeated beginning with current 190.0 again. It is seen that during commutation at least one of the winding stages is unpowered at any one time while the other winding stages are powered by application of the current in sequence through selective switching.

Table I has columns corresponding to each point or current step in the preselected sequence just described above. Currents 190.0-190.5 in FIG. 4A correspond to the columns of control signals shown in Table I in order from left to right and indexed from 0 through 5 therein. The control signals result in clockwise rotation of the rotatable assembly of motor M when applied in the preselected sequence of Table I. Counterclockwise rotation is obtained by applying the control signals in a second preselected sequence shown in Table II which is the reverse of the sequence of Table I. The column entries for the control signals of Table II are seen to be the same when read from right to left as the column entires of Table I read from left to right.

In FIG. 4 the control signals 52 are normally the complement of the digital signals on lines 0-5 of port P2 of the microcomputer 61. Tables I and II summarize the relationship of the digital signals to the control signals in each column. The first eight rows of each Table show the outputs for each digital signal pattern in sequence from each P2 port line from 7 down to zero. It is seen that in lines 5 through zero there are exactly two lines in any one column which are logic zero, or low. For example, in the left-most column in the sequence in Table I, these two lines are lines 1 and 0. By inspection of FIG. 4, lows on lines 1 and 0 are inverted by inverting buffers 175 and 180 and bring control signals A+ and C− high through protective circuits 161 and 165. Table I, left-most column, also shows control signals A+ and C− tabulated at this point in the sequence. Comparison of the rest of the columns of Tables I and II with FIG. 4A demonstrates the preselected sequences of digital signal patterns correlated with control signal patterns for clockwise and counterclockwise rotation.

The digital signal patterns and control signal patterns are here recognized as signifying directives produced by microcomputer 61 and control signal generator 51 for motor M. The directives are not only used for commutation in clockwise and counterclockwise directions but for other operations of motor M.

Figure 4B:
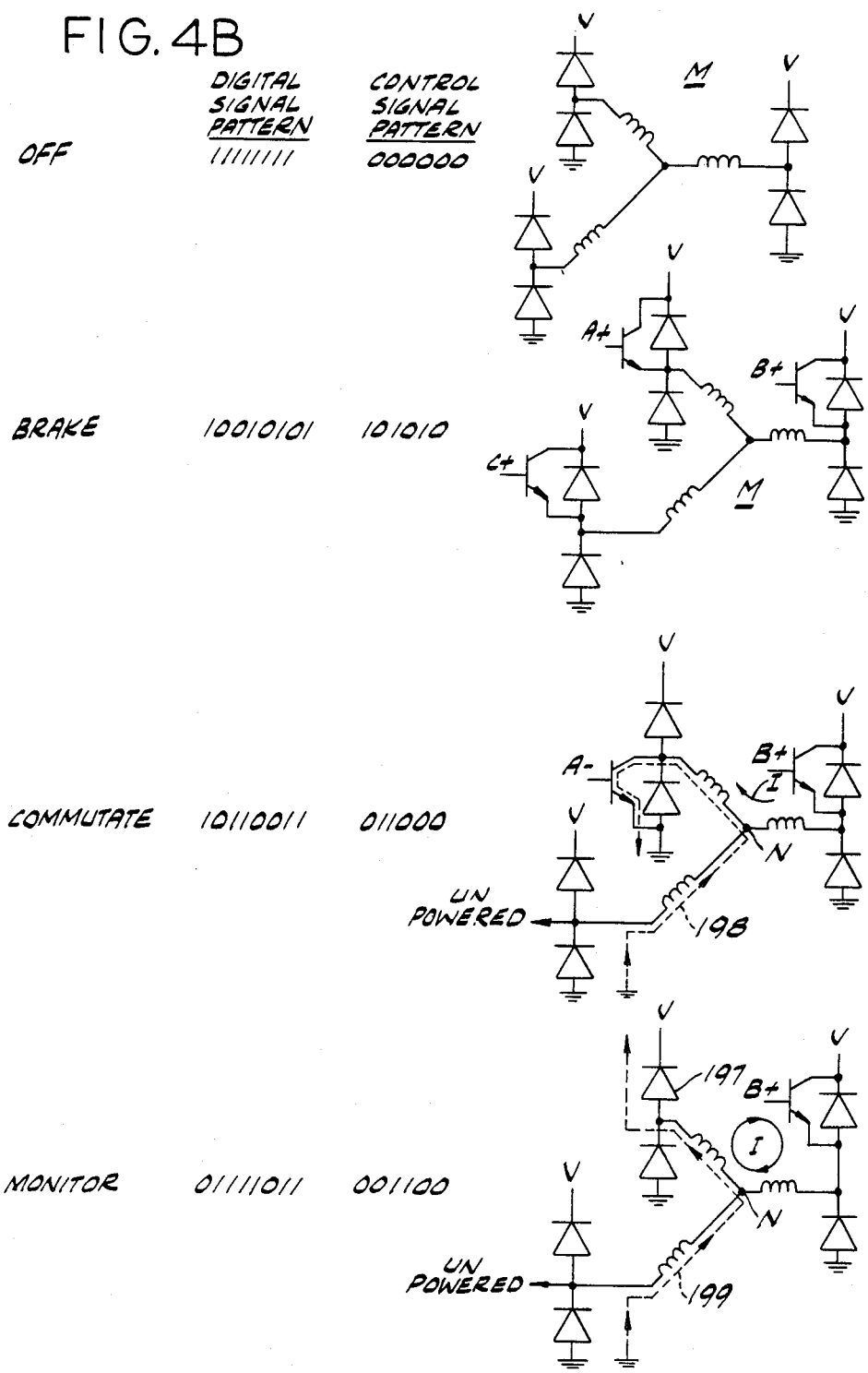
FIG. 4B is four schematic diagrams of circuits effectively resulting in the commutating circuit of FIG. 1 from different digitial signal patterns and corresponding control signal patterns produced in accordance with the invention.

FIG. 4B illustrates interpretations of some of the digital and control signal patterns by showing corresponding equivalent circuits in the electronic devices 127 and 129 of switching circuits 121, 123, and 125 of FIG. 3.

When microcomputer 61 produces all ones on lines 0 through 7, (11111111 binary which is FF hexadecimal), a control signal pattern consisting of all Lows is generated by control signal generator 51. Commutating circuit 31 has transistors 137 and 145 off in each switching circuit 121, 123, and 125 and motor M is turned off.

Only freewheeling diodes, such as diode 197 in electronic device 127 and its counterpart in electronic device 129 of FIG. 3, appear as shown in FIG. 4B in the equivalent circuit.

The motor M is effectively braked when the rotor is spinning, by connecting all of the winding stages together. In FIG. 4B this is accomplished by bringing A+, B+, and C+ high, corresponding to control signals 101010 and digital signals 10010101. The electronic device 127 in FIG. 3 in each of switching circuits 121, 123, and 125 becomes conductive and the winding stages of motor M are all tied to the positive supply conductor or rail 113. Mechanical energy in motor M is rapidly dissipated, braking the rotatable assembly 15 of FIG. 2. It is to be noted that a complementary braking pattern (not shown) brings A−, B−, and C− high when A+, B+, and C+ are low.

As already discussed in connection with Tables I and II, two of the windings in a wye-connected motor are powered at any one time, leaving the third unpowered, by bringing two control signals high in two of the switching circuits 121, 123, and 125 of FIG. 3. In FIG. 4B, for illustration, control signals B+ and A− are brought high, causing current I to flow from voltage V through an upper transistor turned on by control signal B+ through two winding stages of motor M and to ground through a lower transistor turned on by control signal A−. Different "Commutate" patterns are applied in at least one preselected sequence to rotate the rotatable assembly in a predetermined direction.

When the Commutate patterns are applied, at least one of the winding stages is unpowered in sequence (see FIG. 4B) while the other winding stages are powered in sequence. FIG. 5 illustrates the voltage behavior across an unpowered winding stage from a terminal thereof to neutral N during a commutation period when the other winding stages are powered.

Initially a voltage 191 having a high magnitude occurs because of the collapsing field of the unpowered winding resulting from its having been previously powered in the sequence. Field collapse voltage portion 191 dissipates, revealing a ramp-shaped back emf 195 induced in the winding by virtue of the rotation of rotatable assembly 15. Back emf 195 is useful for position sensing of the rotatable assembly 15, while field collapse voltage 191 is not believed to be so useful for position sensing.

The position of the rotor 15 is able to be monitored as it is coasting, by allowing "half" of an electronic switching device to be connected to "half" a winding stage, by turning off one of the two electronic switching devices which would otherwise be both on. Then the proper pair of electronic switching devices is turned on, as dictated by the present rotor position (and not by the position when the power was turned off), and the ECM M continues normal operation.

In FIG. 4B a pattern herein called a "Monitor" pattern is temporarily applied to eliminate the field collapse voltage 191 and reveal the back emf 195 sooner. A single one of the control signals, e.g., B+, is kept high while a previously high control signal, e.g., A− from the Commutate pattern, is brought low. The current I freewheels through the B+ transistor and diode 197 and the voltage at neutral N rises from about half the supply voltage V to essentially the full supply voltage V. The unpowered winding stage in FIG. 4B has a current flowing therein when the field collapse voltage 191 of FIG. 5 is occurring. When the other winding stages are being powered by the commutating circuit 31 in response to a Commutate pattern of control signals B+ and A— as shown, the unpowered winding stage temporarily has current 198 circulating through the system as shown and transferring energy from its magnetic field to the rest of the system at a moderate rate because the voltage at neutral N is about half of the supply voltage V. When a monitor pattern for a fast rate of energy extraction is applied as shown, for example by turning off control signal A— and thereby removing its transistor from the circuit, the current in the unpowered winding stage, now designated 199, must release its energy into the full voltage of the power supply 12 through diode 197, thereby transferring energy away from the unpowered winding stage at a much faster rate. In this way, temporary application of a monitor pattern as shown in FIG. 4B eliminates the field collapse voltage 191 of FIG. 5 and reveals the back emf 195 sooner.

It is also recognized that a monitor pattern for slow rate of energy extraction exists when control signal A— is kept on and control B+ is turned off, thereby removing the B+ transistor and keeping the A— transistor. Then current I freewheels through ground (conductor 115) and the voltage of neutral N is brought near ground potential (not shown in FIG. 4B), resulting in a relatively slow rate of energy extraction for current 198. Since in some of the contemplated applications of the invention, the control signals such as A— or B+, are pulse width modulated as a result of the disabling signal Q of FIG. 4 or by means of microcomputer 61 directly, the rate of energy extraction is of interest and can be chosen, for instance, between fast and slow by the proper selection of the monitor patterns for achieving at least some of the objects of the invention.

It is contemplated that the various digital signal patterns and control signal patterns be applied as directives to an electronically commutated motor M in any sequence or order, so as to accomplish at least some of the objects of the invention.

The voltage behavior (see FIG. 5) across the unpowered winding stage during a commutation period is inverted in polarity compared to the voltage across the winding stage which was unpowered in the next previous commutation period. Accordingly, FIG. 5 shows but one example of voltage behavior across an unpowered winding stage, and it is to be noted that the back emf 195 approaches the zero level from opposite directions in successive commutation periods. In other words, in one commutation period the back emf 195 ramps up as shown, and in the next commutation period the back emf 195 ramps down with inverted polarity compared to FIG. 5.

In FIG. 3, terminal voltages $V_a$, $V_b$, and $V_c$ for the winding stage terminals selected by relay 147 are all available. Microcomputer 61 automatically and correctly selects the voltage for the unpowered winding stage by looking up an identification corresponding to the unpowered winding stage in a table relating the point in the sequence of commutation to the identification of the unpowered winding stage. The relationship, or function, is different for clockwise and counterclockwise rotation.

In a further feature the voltages across the winding stages are simultaneously converted by circuit 71 to digital form thereby to digitize the voltages. As shown in FIG. 6, the digitizing is accomplished with the use of voltage comparators 201, 203, and 205. Comparators 201, 203, and 205 each have noninverting (+) and inverting (—) input terminals for accepting signals to be compared, and when one signal falls below the other at a given comparator, the output of the respective comparator changes state. The noninverting input terminals of the comparators 201, 203, and 205 are respectively coupled by three voltage dividers having resistors 207,209; 211,213; and 215,217 to the the respective winding stages via the lines 206 bearing terminal voltages $V_c$, $V_b$, and $V_a$. The voltage dividers are equal in their voltage division ratio. The inverting input terminals of the comparators are coupled by direct connection to a network of resistors 219, 221, 223, 225 for synthesizing a neutral N' from the voltages available from the voltage dividers having resistors 207,209; 211,213; and 215,217. The resistor network constitutes means for providing a voltage corresponding to the neutral N of the winding stages in FIG. 3. The output terminals C, B, and A of comparators 201, 203, and 205 are respectively coupled to port P1 input lines 2, 0, and 1 of microcomputer 61 and provided with pullup resistors collectively designated 227. It is noted that the neutral N can be directly brought to the circuit of FIG. 5 without use of the resistor network for synthesizing a neutral and that a variety of circuits for digitizing the voltages can be utilized for achieving at least some of the objects of the invention.

Because of the voltage dividers 207,209; 211,213; and 215,217 each comparator 201, 203, and 205 respectively sees at its noninverting input terminal a voltage proportional to a terminal voltage $V_a$, $V_b$, and $V_c$ of a respective winding stage S1, S2, and S3. Each comparator at its inverting input terminal sees the voltage $V_{N'}$, which is proportional with the same constant of proportionality to the voltage $V_N$ of the neutral N. The constant of proportionality is then effectively disregarded in the comparing process. Each of the comparators generates a first logic level (one) when the voltage $V_a$-$V_N$, $V_b$-$V_N$, or $V_c$-$V_N$ across a respective winding stage exceeds a predetermined value of zero (i.e. when the voltage across a respective winding stage is positive) and generates a second logic level when the voltage across it falls below the predetermined value of zero (i.e. when the voltage across a respective winding stage is negative).

Where it is desired to provide a voltage offset such as by adjustment of the value of resistor 219 or by other means, it is to be understood that the predetermined voltage value departs from zero.

The voltage digitizing circuit of FIGS. 1 and 5 thus constitutes means for providing a voltage corresponding to a neutral for the winding stages and further includes a plurality of comparators each having an output and first and second input terminals, the first input terminals being respectively coupled to the respective winding stages, the second input terminals being coupled to the neutral voltage means, the output terminals being respectively coupled to the inputs of the digital computer (microcomputer 61).

The digital form of the voltage across each respective winding stage comprises the logic levels so generated at outputs C, B, and A. FIG. 6A illustrates a digitized voltage at output B corresponding the analog voltage $V_b$-$V_N$ of FIG. 5. The digitized voltage in FIG. 6A begins high during the field collapse voltage 191, goes low when the field collapse voltage 191 ends, and then goes back high as soon as zero crossing 229 occurs. It is to be understood that in the following commutation period, the voltage behavior shown in FIG. 5 is inverted in polarity, so that the digitized voltage corresponding to FIG. 6A for the unpowered winding in the following commutation period is the logical complement of the pulses shown in FIG. 6A. In either event a transition 230 occurs in the digitized voltage of FIG. 6A substantially simultaneous with zero crossing 229 and corresponding to a specific physical position of the rotatable assembly 15 in relation to the poles of motor M. In the preferred embodiment, the zero crossing 229 is used to trigger the beginning of the next commutation period by causing microcomputer 61 to advance in the sequence of commutation and produce a following pattern of control signals.

Referring again to FIG. 5, microprocessor 61 is provided with a set of switches 231.1–231.9 for providing the Commands indicated in FIG. 1. Switches 231.1–231.9 are provided with pullup resistors collectively designated 233 and are respectively connected to lines 3,4,5,6,7 (in Port P1) and lines DB0, DB1, DB2, and DB3. One or more of switches 231.1–231.9 are incorporated in user-operable mechanisms of any familiar type on laundry apparatus 11 which accomplish laundering of different types of fabrics by washing, rinsing, and spinning the fabrics with different temperatures of water and by executing the various operations of the laundry apparatus for different lengths of time. Switches for operations which are relevant to controlling an electronically commutated motor M in laundry apparatus 11 are discussed below.

ON/OFF switch 231.5 is used to signal microprocessor 61 to tell it whether the laundry apparatus is to be on or off. This switch 231.5 is suitably polled every six commutations, or each revolution of the motor. Reception of a logic 0 at line 7 of port P1 indicates the Off condition. Line 7 is polled continuously when line 7 is low. When line 7 goes high, the microcomputer 61 commences operations to run the motor M.

WASH/SPIN switch 231.4 provides a logic level on line 6 of port P1 by which microcomputer 61 determines whether a washing or spinning mode is called for.

CW/CCW rotational direction switch 231.3 provides a logic level on line 5 of port P1 for setting the direction of rotation of motor M in the SPIN mode. Microprocessor 61 utilizes this direction information in determining whether a preselected sequence of digital signal patterns should be produced for clockwise rotation or another preselected sequence should be produced for counterclockwise rotation. In some embodiments the setting of the CW/CCW switch 231.3 is ignored by microcomputer 61 when the WASH/SPIN switch 231.4 is set to WASH.

5/250 REV switch 231.2 provides a logic level on line 4 of port P1. This switch 231.2 is used when microcomputer 61 counts revolutions of the rotatable means 15 by counting successive patterns of digital signals produced. A revolution counter in microcomputer 61 is set to 5 when the switch 231.2 is set to the "5" position, as for setting the number of revolutions of motor M in a washing mode of a center-post-agitator-type laundry apparatus. When an 8:1 speed reducer is used with motor M, a stroke of agitation of less than one revolution results in the laundry apparatus. The revolution counter is illustratively set to 250 by switch 231.2 for setting the number of revolutions to be similarly reduced in a washing mode of tumbler-type laundry apparatus.

HI/LOW SPEED switch 231.1 is connected to line 3 of port P1, and is usable, for instance, to indicate when microcomputer 61 is to issue a signal on line DB6 for controlling High-low speed switching circuit 41 of FIG. 1.

Switches 231.6, 231.7, 231.8 and 231.9 are able to be utilized for other control functions as desired by the skilled worker. For instance, if the SPIN mode is selected on switch 231.4, these switches are suitably used to provide logic levels on lines DB0-DB3 which determine the maximum speed to which the ECM M accelerates. The motor is caused to accelerate or decelerate to the speed selected at a maximum rate preestablished in memory. A value is suitably selected from a table stored in the microcomputer 61 to determine the desired elapsed time between commutations and therefore the maximum speed. Power to the motor is pulse width modulated with adjustable duty cycle to accelerate as fast as possible without exceeding a maximum motor current level to the selected speed level. Microcomputer 61 can also be programmed to execute dynamic braking to zero motor speed when the lines DB0-DB3 are all low.

In further control functions obtainable with the switches 231.6–231.9, microcomputer 61 interprets any one of 16 possible settings of the four switches as instructions for amplitudes and waveshapes of agitation speed profiles (effective voltage to motor M) or torque profiles (current in motor M) when switch 231.4 is in the WASH position.

In FIG. 6, hexadecimal numbers are set off in quotes and marked inside the rectangle symbolizing microcomputer 61 to identify the lines 0–7 of port 1 when microcomputer 61 selects or "masks" the port to read the logic level on a given one of the lines. It is noted that each of the hexadecimal numbers 01,02,04,08,10,20,40,80 in binary notation is all zeros except for a "1" in a bit position corresponding to the number of its respective line. When the hexadecimal number is ANDed with the logic levels of the lines in an accumulator register (not shown) of microcomputer 61, only the logic level, if a one (1), of the line signified by the hexadecimal number remains in the accumulator. When it is desired to mask the port for a multiple number of lines such as lines 0,1, and 2 to determine whether any of the lines is active, the masking number ALL-HI=7 (00000111) is ANDed with the logic levels of the lines in the accumulator.

Referring again to Tables I and II, each of the digital signal patterns and control signal patterns in the sequence is identified by values of an index in the row marked INDEX. Another index row is designated INDEXR to correlate with the flow diagrams discussed below in connection with FIGS. 9, 11, 14, 16, and 19. The INDEXR row has entries which are distinct to each pattern in the sequence and different for Table I and Table II, so that a given pattern is uniquely identified for clockwise and counterclockwise rotation.

In Tables I and II, the hexadecimal value for masking port P1 and thereby selecting the digitized voltage across the at least one unpowered winding stage is tabulated in the row "Digitized Voltage Mask." The mask number depends on, and is a function of, INDEX and therefore also depends on and is a function of the digital signal pattern produced by microcomputer 61. The comparator 201, 203, 205 output designation A, B, or C which is selected is also entered for mnemonic purposes in Tables I and II beneath the hexadecimal mask number.

Microcomputer 61 outputs a pattern of digital signals from a column in Table I when clockwise rotation is selected on switch 231.3 of FIG. 6. The next pattern of digital signals is produced by incrementing INDEX after complementary logic levels are sensed on the masked line from the unpowered winding stage. The complementary logic levels which microcomputer 61 seeks depend on the point its operations have reached in the sequence, so that logic levels are tabulated in the row "Test Bit Order" in Table I as a function of INDEX. For example, assume that INDEX is zero, and microcomputer 61 has just produced the digital signal pattern 01111100 causing control signals A+ and C— to go high. Then microcomputer 61 masks port P1 with "01" to obtain only the B output from the comparators corresponding to winding stage S2. As shown in FIG. 6A, microcomputer 61 senses the digitized voltage for that winding stage in repeated operations indicated by arrows 235.1–235.8. (It is to be understood that the arrows do not necessarily correspond in number and spacing to the actual rate of instances of sensing by microcomputer 61 in any particular embodiment.) During the duration of field collapse voltage 191 in FIG. 5, only logic ones are sensed corresponding to arrows 235.1 and 235.2. Since the test bit order in Table I calls for 0,1 the operations continue looking first for the initial zero. At arrow 235.3, the initial zero is found. Now microcomputer 61 looks for the logic level one in the 0,1 test bit order. It continues looking but senses 0 at times indicated by arrows 235.4, 235.5, 235.6 and 235.7. Then at the time indicated by arrow 235.8, just when the back emf 195 has had its zero crossing 229 and transition 230 has occurred in the digitized voltage, microcomputer 61 senses a logic level 1 matching the second entry in the test bit order. The complementary logic levels 0,1 of the selected digitized voltage B have now occurred in the predetermined order. Microcomputer 61 now advances in the sequence of commutation by incrementing INDEX by 1, produces the digital signal pattern 10111001, masks with mask 02 (comparator output A), and advances in sequence after complementary logic levels in the order 1,0 for the digitized voltage A have occurred, indicating another zero crossing.

In FIG. 7, a source of 5 volts DC is connected to positive voltage supply pin $V_{CC}$ of microcomputer 61, and supply return pin $V_{SS}$ is connected to ground. A crystal 241 with associated capacitors 243 and 245 is connected to pins XRL1 and XRL2. The operations of microcomputer 61 are reset by a circuit connecting input RESET-bar to reset switch 247 and capacitor 249 to ground, and RESET-bar is also connected to $V_{CC}$ through reverse-biased diode 251. Pin EA of the 8748 chip is connected to ground. The connections described in this paragraph are conventional and are not described further.

The current interrupt and speed circuit 81 of FIG. 1 is now described in more detail using FIG. 7. Comparator 261 has its inverting input connected through resistor 263 to voltage $V_I$ from shunt resistor $R_S$ of FIG. 3. The noninverting input of comparator 261 is connected to a voltage divider 265 consisting of resistors 267 and 269 and variable resistor 271 for setting a current interrupt level. Adjusting variable resistor 271 sets a predetermined level. Comparator 261 with its pullup resistor 262 compares the current flowing in the powered winding stages of motor M with the predetermined level fed to the noninverting input of comparator 261. Upon the predetermined level being exceeded by voltage $V_I$, the output of comparator 261 goes low at the PRESET input of a 74LS74 flipflop, or latch, 273, so that output Q of flipflop 273 goes high and output Q-bar (complement of Q) goes low. Output Q-bar going low interrupts microcomputer 61 at low-active interrupt pin INT-bar. Output Q going high causes the control signal generator 51 of FIG. 4 to generate a pattern of control signals to reduce the current in the winding stages by changing the Commutate pattern to a Monitor pattern (see FIG. 4B).

Current interrupt and speed circuit 81, microcomputer 61, and control signal generator 51 together constitute means for producing the successive patterns of the control signals in at least one preselected sequence to switch on only one electronic device in each of at least two of the sets of the electronic devices at once and cause a current to flow in the winding stages to rotate the rotatable means, and for subsequently producing a pattern of the control signals to switch off one of the electronic switching devices which was previously switched on so that the commutating circuit 31 leaves all of the winding stages temporarily unpowered and also provides a current path for the previously-powered winding stages. Current interrupt and speed circuit 81 together with microcomputer 61 constitute means for producing the successive patterns for the digital signals in at least one preselected sequence to switch on only one electronic device in each of at least two of the sets of the electronic devices at once and cause a current to flow in the winding stages to rotate the rotatable means, and for subsequently producing a pattern of the digital signals to switch off one of the electronic switching devices which was previously switched on, the identity of the one device switched off depending on the last pattern produced in the sequence (e.g. as a result of the Rail Disable information in the first two rows of Tables I and II), so that the commutating means leaves all of the winding stages temporarily unpowered and also provides a current path for the previously-powered winding stages.

Control signal generator 51 constitutes means responsive to successive patterns of digital signals for generating the successive patterns of the control signals for the commutating means, the generating means including first and second logic gate means (e.g. 167 and 169) feeding the sets of electronic devices in the commutating means and having inputs driven by respective pairs of digital signals (e.g. inverting buffers 175,176; 177,178; and 179,180) in the digital signal patterns, means for disabling the first and second logic gate means when any of the pairs of digital signals has identical logic levels in the pair (e.g. exclusive-OR gate 183), and means for disabling (e.g. NAND gates 185 and 187) in response to a disabling signal (e.g. Q) a single one of the first and second logic gate means identified by an additional pair of digital signals in the digital signal patterns (e.g. on port P2 lines 7 and 6). Microcomputer 61 constitutes means for producing the successive patterns of the digital signals in at least one preselected sequence to switch on only one electronic device in each of at least two of the sets of the electronic devices at once and cause a current to flow in the winding stages to rotate the rotatable means, and for producing the additional pair of digital signals to have logic levels depending on each pattern in the sequence (e.g. top and bottom disable signals in first two rows of Tables I and II). Current interrupt and speed circuit 81 constitutes means for providing the disabling signal (e.g. Q) in response to an occurrence of a predetermined condition (e.g. excessive current) thereby to switch off one of the electronic devices which was previously switched on.

FIG. 7 illustrates an embodiment adapted for supplying the disabling signal Q by a hardwired circuit comprised in current interrupt and speed circuit 81 which is outboard of microcomputer 61. It is to be understood that Monitor patterns as in FIG. 4B are in alternative embodiments produced by performing operations inside microcomputer 61. In order to accomplish such operations in microcomputer 61, monitor patterns which vary as a function of INDEX are stored in the memory. These monitor patterns are output on lines 62 whenever desired, and they are tabulated for clockwise and counterclockwise rotation respectively in Tables V and VI.

In FIG. 7A, logically complementary waveforms for the Q and Q-bar outputs of flipflop 273 show Q low until the PRESET input of flipflop or latch 273 receives the aforementioned output from comparator 261 or becomes otherwise preset. After a predetermined period of time T1 of nominally 100 microseconds, microcomputer 61 completes an interrupt routine and sends a pulse on line DB7 to input CLR to clear flipflop 273, causing the Q output to go low again, and Q-bar to go high. If and when the motor current rises above the predetermined level again, comparator 261 again presets flipflop 273, protecting motor M from overcurrents. Flipflop 273 has its data (D) input and clock (CLK) inputs grounded. The output of comparator 261 is also connected to the T0 testable input of microcomputer 61 for advantageous flexibility of operations.

In addition to protecting motor M, circuit 81 also provides a means for producing pulses at an adjustable rate, as if the predetermined level were exceeded, when the current is actually less than the predetermined level, so that the speed of the motor in the laundry apparatus 11 is adjustable. With output Q of flipflop 273 low, inverter 275 produces an output High, charging capacitor 277 through resistor 279. The time constant of capacitor 277 with resistor 279 is on the order of one millisecond, for example. The voltage across capacitor 277 is applied through a voltage divider consisting of resistors 281 and 283 to the inverting (−) input of a comparator 285. Comparator 285 has a positive feedback resistor 287 for hysteresis. The noninverting (+) input of comparator 285 is fed with the adjustable speed-related output of a voltage divider consisting of resistor 289 and potentiometer 291 through resistor 293. As capacitor 277 charges, it reaches a voltage greater than that set by potentiometer 291, causing the output of comparator 285 to go low. The low output of comparator 285 is fed to the preset input of flipflop 273, causing output Q to go high and Q-bar to go low, interrupting microcomputer 61. During time T1, the High from output Q is inverted by inverter 275 so that the output of inverter 275 goes low and at least partially discharges capacitor 277. Microcomputer 61 clears flipflop 273 after time T1, causing output Q to go low. Inverter 275 in turn goes high, progressively charging capacitor 277. Then comparator 285 in circuit portion 295 of current interrupt and speed circuit 81 causes flipflop 273 to produce a disabling signal Q high and interrupt microcomputer 61 again when a second time interval T2 has elapsed. Setting potentiometer 291 to a higher voltage position increases the time interval T2.

Increasing time interval T2 increases the speed of the motor because the speed of the motor increases with increasing duty cycle, and the duty cycle is the ratio T2/(T2+T1). It is noted that in the embodiment of FIG. 7, T1 is set inside the microcomputer 61, and T2 is set outside by circuit 295. In other embodiments T1 is set outside microcomputer 61 and T2 is set inside the microcomputer 61. In still other embodiments both T1 and T2 are set inside microcomputer 61. In yet other embodiments both T1 and T2 are set outside microcomputer 61.

TABLE I

DATA FOR CLOCKWISE ROTATION

| P2 Line | Rail Disable | Sequence of Patterns | | | | | |
|---|---|---|---|---|---|---|---|
| DIGITAL SIGNALS | | | | | | | |
| 7 | Top | 0 | 1 | 0 | 1 | 0 | 1 |
| 6 | Btm | 1 | 0 | 1 | 0 | 1 | 0 |
| 5 | | 1 | 1 | 1 | 1 | 0 | 0 |
| 4 | | 1 | 1 | 1 | 0 | 0 | 1 |
| 3 | | 1 | 1 | 0 | 0 | 1 | 1 |
| 2 | | 1 | 0 | 0 | 1 | 1 | 1 |
| 1 | | 0 | 0 | 1 | 1 | 1 | 1 |
| 0 | | 0 | 1 | 1 | 1 | 1 | 0 |
| INDEX: | | 0 | 1 | 2 | 3 | 4 | 5 |
| INDEXR: | | 0 | 1 | 2 | 3 | 4 | 5 |
| CONTROL SIGNALS: | | A+ C− | B+ C− | B+ A− | C+ A− | C+ B− | A+ B− |
| DIGITIZED VOLTAGE MASK: | | 01 (B) | 02 (A) | 04 (C) | 01 (B) | 02 (A) | 04 (C) |
| TEST BIT ORDER: | | 0,1 | 1,0 | 0,1 | 1,0 | 0,1 | 1,0 |

TABLE II

DATA FOR COUNTERCLOCKWISE ROTATION

| P2 Line | Rail Disable | Sequence of Patterns | | | | | |
|---|---|---|---|---|---|---|---|
| DIGITAL SIGNALS | | | | | | | |
| 7 | Top | 0 | 1 | 0 | 1 | 0 | 1 |
| 6 | Btm | 1 | 0 | 1 | 0 | 1 | 0 |
| 5 | | 0 | 0 | 1 | 1 | 1 | 1 |
| 4 | | 1 | 0 | 0 | 1 | 1 | 1 |
| 3 | | 1 | 1 | 0 | 0 | 1 | 1 |
| 2 | | 1 | 1 | 1 | 0 | 0 | 1 |
| 1 | | 1 | 1 | 1 | 1 | 0 | 0 |
| 0 | | 0 | 1 | 1 | 1 | 1 | 0 |
| INDEX: | | 0 | 1 | 2 | 3 | 4 | 5 |
| INDEXR: | | 12 | 13 | 14 | 15 | 16 | 17 |
| CONTROL SIGNALS: | | A+ B− | C+ B− | C+ A− | B+ A− | B+ C− | A+ C− |
| DIGITIZED VOLTAGE MASK: | | 04 (C) | 02 (A) | 01 (B) | 04 (C) | 02 (A) | 01 (B) |
| TEST BIT ORDER: | | 0,1 | 1,0 | 0,1 | 1,0 | 0,1 | 1,0 |

TABLE III

CLOCKWISE ROTOR POSITION SENSING

| P1 | | Digitized Back EMFs | | | | | |
|---|---|---|---|---|---|---|---|
| 0 | B | 0 | 0 | 1 | 1 | 1 | 0 |
| 1 | A | 1 | 1 | 1 | 0 | 0 | 0 |
| 2 | C | 1 | 0 | 0 | 0 | 1 | 1 |
| HEX: | | 6 | 2 | 3 | 1 | 5 | 4 |
| R3: | | −4 | 1 | −2 | 4 | −1 | 2 |
| OFFSET R3: | | −8 | 5 | −6 | 8 | −5 | 6 |
| INDEX: | | 1 | 0 | 5 | 4 | 3 | 2 |
| INDEXR: | | 1 | 0 | 5 | 4 | 3 | 2 |
| DIGITIZED VOLTAGE | ALLHI=07. | Mask for A, B, C at same time. | | | | | |

TABLE III-continued

| CLOCKWISE ROTOR POSITION SENSING | |
|---|---|
| P1 | Digitized Back EMFs |
| MASK: | |

TABLE IV

COUNTERCLOCKWISE ROTOR POSITION SENSING

| P1 | | Digitized Back EMFs | | | | | |
|---|---|---|---|---|---|---|---|
| 0 | B | 1 | 0 | 0 | 0 | 1 | 1 |
| 1 | A | 1 | 1 | 1 | 0 | 0 | 0 |
| 2 | C | 0 | 0 | 1 | 1 | 1 | 0 |
| HEX: | | 3 | 2 | 6 | 4 | 5 | 1 |
| R3: | | −1 | 4 | −2 | 1 | −4 | 2 |
| INDEX: | | 1 | 0 | 5 | 4 | 3 | 2 |
| INDEXR: | | 13 | 12 | 17 | 16 | 15 | 14 |
| DIGITIZED VOLTAGE MASK: | ALLHI=07. | Mask for A, B, C at same time. | | | | | |

TABLE V

MONITOR PATTERNS FOR CLOCKWISE ROTATION

| P2 Line | Rail Disable | Sequence of Patterns | | | | | |
|---|---|---|---|---|---|---|---|
| DIGITAL SIGNALS | | | | | | | |
| 7 | Top | 0 | 1 | 0 | 1 | 0 | 1 |
| 6 | Btm | 1 | 0 | 1 | 0 | 1 | 0 |
| 5 | | 1 | 1 | 1 | 1 | 1 | 0 |
| 4 | | 1 | 1 | 1 | 1 | 0 | 1 |
| 3 | | 1 | 1 | 1 | 0 | 1 | 1 |
| 2 | | 1 | 1 | 0 | 1 | 1 | 1 |
| 1 | | 1 | 0 | 1 | 1 | 1 | 1 |
| 0 | | 0 | 1 | 1 | 1 | 1 | 1 |
| INDEX: | | 0 | 1 | 2 | 3 | 4 | 5 |
| INDEXR: | | 0 | 1 | 2 | 3 | 4 | 5 |
| CONTROL SIGNALS: | | A+ | C− | B+ | A− | C+ | B− |

TABLE VI

MONITOR PATTERNS FOR COUNTERCLOCKWISE ROTATION

| P2 Line | Rail Disable | Sequence of Patterns | | | | | |
|---|---|---|---|---|---|---|---|
| DIGITAL SIGNALS | | | | | | | |
| 7 | Top | 0 | 1 | 0 | 1 | 0 | 1 |
| 6 | Btm | 1 | 0 | 1 | 0 | 1 | 0 |
| 5 | | 1 | 0 | 1 | 1 | 1 | 1 |
| 4 | | 1 | 1 | 0 | 1 | 1 | 1 |
| 3 | | 1 | 1 | 1 | 0 | 1 | 1 |
| 2 | | 1 | 1 | 1 | 1 | 0 | 1 |
| 1 | | 1 | 1 | 1 | 1 | 1 | 0 |
| 0 | | 0 | 1 | 1 | 1 | 1 | 1 |
| INDEX: | | 0 | 1 | 2 | 3 | 4 | 5 |
| INDEXR: | | 12 | 13 | 14 | 15 | 16 | 17 |
| CONTROL SIGNALS: | | A+ | B− | C+ | A− | B+ | C− |

The flow diagrams of FIGS. 8–17 and 19 describe processes, methods, and operations contemplated in some of the embodiments of the invention, regardless of any particular manner of implementation using hardware or software. A listing of an illustrative assembly language program for the Intel 8748 microcomputer as microcomputer 61 is included in the present application as Appendix I. A table correlating the listing of Appendix I with the flow diagrams is included as Appendix II. It is to be understood that the assembly language program is used in microcomputer 61 to make it perform many of the same processes, methods and operations shown in the flow diagrams while differing in order of listing and in some details from the flow diagrams of FIGS. 8–17 and 19. Thus Appendix I further illustrates and discloses some of the variety of implementations possible in the practice of the invention according to the principles thereof.

In FIG. 8, operations commence at START 301 and at step 305 equates are made to set up in memory some or all of the information contained in Tables I through VI of the present specification. More specifically, the information includes the patterns of digital signals for clockwise and counterclockwise rotation, which are designated "Control Driver Pattern For Clockwise Direction" and "Control Pattern For Running Counter Clockwise Direction" in Appendix I. In addition, the information includes identified inputs to the microcomputer 61 in the rows designated "Digitized Voltage Mask" in Tables I and II and the lines designated "Test Pattern For CW/CCW" in Appendix I. Control equates are also made in Appendix I for masking the input lines to port P1 from the switches for On/Off, Wash/Spin, CW/CCW, 5/250 REV, and Hi/Low Speed, for clearing flipflop 273 of FIG. 7, setting certain time values, and for other purposes.

At step 307 and step 309 outputs are turned off and other housekeeping functions are accomplished. These include producing a digital signal pattern "OFF" consisting of all ones from output port P2 on lines 62 of FIG. 4 so that all zeros are generated by control signal generator 51 for turning off the motor M. Flipflop 273 is cleared, High/Low Speed circuit 41 of FIG. 1 is set to Low, and initializing of the microcomputer 61 is performed.

A point 311 in the operations is designated STRTST. STRTST is located at the beginning of operations which determine whether the laundry apparatus is still on and whether the wash or spin mode is to be changed. At step 313 the state of On/Off switch 231.5 is read at port P1, line 7, and at step 315 operations branch back to STRTST until switch 231.5 is turned from the Off position to the On position. When switch 231.5 is on, point 316 designated RUN is reached. Then at step 317 the CW/CCW switch 231.3 is read at port P1, line 5, and the setting as clockwise or counterclockwise is stored. At step 319 the Wash/Spin switch 231.4 is read at port P1, line 6, and the mode commanded by it is stored. At step 321, the mode stored is tested, and if it is "Wash", operations proceed to point 323 and FIG. 9, otherwise to "Spin" point 325 and FIG. 14.

Figure 9:
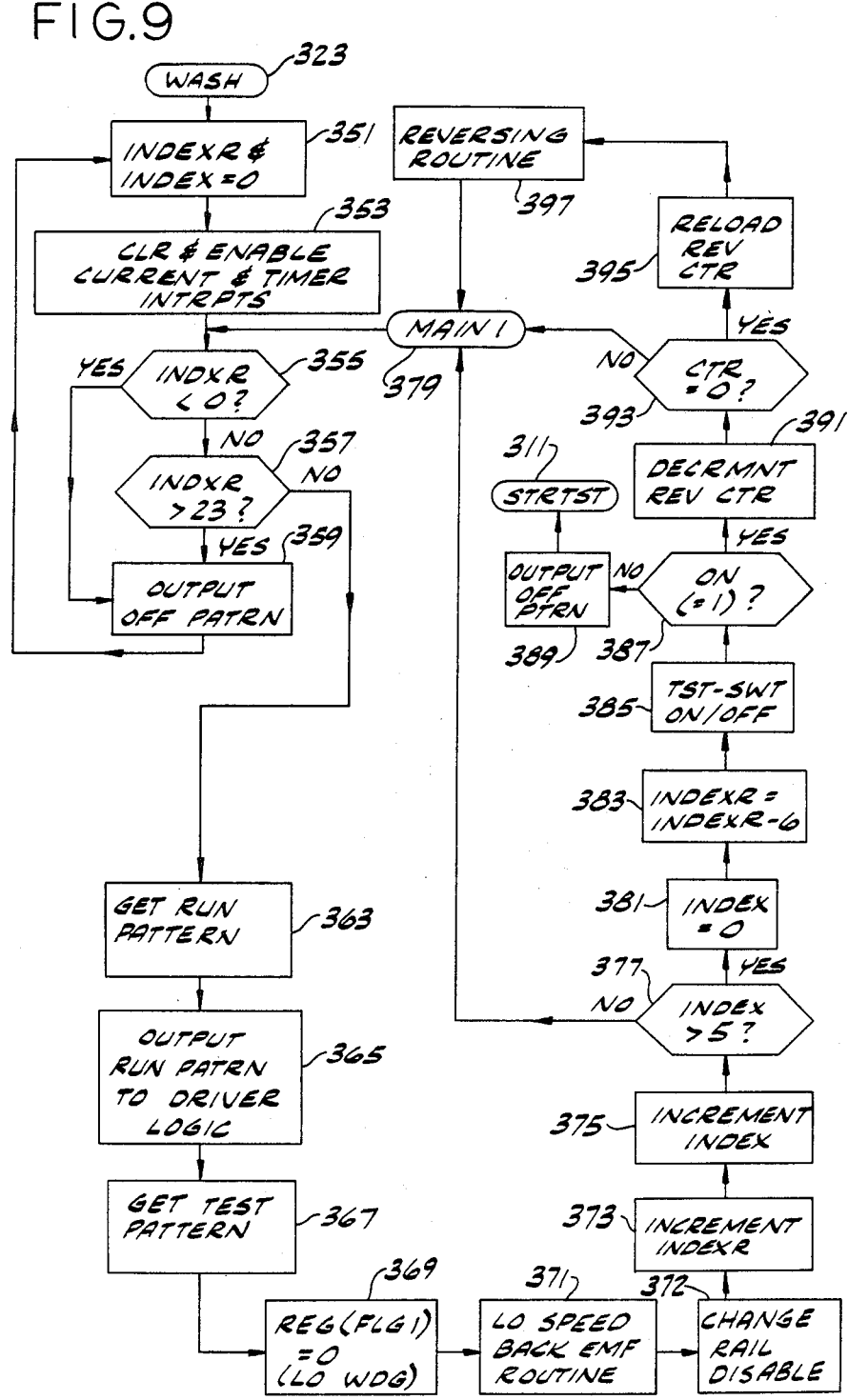
FIG. 9 is an additional part of the flow diagram of operations performed by the microcomputer of FIG. 1 in accordance with the invention in accomplishing a washing mode selected in the operations of FIG. 8.

In FIG. 9, the wash mode is executed beginning at point 323. A predetermined point in the preselected sequence for clockwise rotation (left-most column of Table I) is selected by setting INDEX and INDEXR to zero at step 351. Flipflop 273 is cleared and current and timer interrupts are enabled at step 353. Steps 355, 357, and 359 check INDEXR to assure that it does not have a value clearly indicating some error in the system. If INDEXR is negative or greater than 23, an OFF digital signal pattern (all ones) is produced at step 359, and operations loop back to step 351.

Next at step 363 a digital signal pattern is obtained from memory and stored in the accumulator. For example, the first digital signal pattern so obtained is 01111100 from the leftmost column of Table I. Next at step 365, the digital signal pattern is produced from the accumulator as an output on lines 62 for control signal generator 51 (termed "driver logic" on the flow diagram). In step 367 a test pattern, which is 0,1 or 1,0 is obtained from memory for use in testing the digitized voltage as explained in connection with FIG. 6A. The test pattern to be used is tabulated in Tables I and II in the same column as the digital signal pattern which has just been produced. Equivalently, and as discussed in connection with FIGS. 10 and 15, the test bit order is directly implemented in the coding as a function of whether INDEX is even or odd, and step 367 is omitted. At step 369 a register for a flag FLG1 is set to zero, indicating that the low speed connection arrangement for the winding stages is intended. At step 371 and as more fully discussed in connection with FIG. 10, the digitized voltage of FIG. 6A is tested, and as soon as complementary bits, or logic levels, in the proper test bit order have been sensed, operations proceed to advance in sequence to commutate the winding stages. If complementary bits are not sensed in the predetermined proper test bit order in a predetermined time period, operations proceed to advance in the sequence anyway and force-commutate the motor.

At step 372 the rail disable signals on lines 7 and 6 of port P2 of microcomputer 61 are reversed. "Rail" as used herein means either one of supply conductors 113 and 115. In this way control signal generator 51 is prepared by microcomputer 61 for any pulse width modulation (PWM) which may occur by output Q going high as soon as the back emf routine 371 is complete. As such, microcomputer 61 constitutes means for also selecting the digitized voltage across the at least one unpowered winding stage when digital signal patterns are produced in sequence and changing the logic levels of the additional pair of digital signals (e.g. on lines 7 and 6 of port P2) as soon as at least one predetermined logic level (e.g. of the test bits) of the selected digitized voltage has occurred.

At steps 373 and 375, INDEXR and INDEX are respectively incremented, moving one column to the right, in effect, in Table I. or II. If INDEX has not reached the number 6 at step 377, operations loop back to a point 379 designated MAIN1 and continue with the sequence of steps 355–377, commutating the motor until INDEX reaches 6. When INDEX reaches 6, a branch is made from step 377 to step 381. The value INDEX is essentially treated modulo 6, so that operations cycle through Tables I and II, to commutate the motor as long as desired. INDEX is reset to zero at step 381. At step 383, INDEXR is decreased by 6. The latter operation recognizes that when counterclockwise rotation is being executed in Table II, INDEXR reaches the number 18 when INDEX is 6, so that INDEXR must be cycled back to a permitted number 12 in Table II by subtraction by 6.

At step 385 the On/Off switch 231.5 of FIG. 6 is tested. If the switch has been turned off, a branch is made from step 387 to step 389 whence the pattern OFF (all ones on lines 62) is output to shut the motor off, and operations return to STRTST point 311 in FIG. 8 to poll the switch until it is turned on. Assuming On/Off switch is on when step 387 was first reached, operations proceed to step 391 to decrement a revolution counter which has been originally loaded in step 309 of FIG. 8 with a number 5 (center-post agitator laundry apparatus) or a number 250 (tumbler-type laundry apparatus). In this way microcomputer 61 counts revolutions of rotatable means 15 in step 391 by counting at steps 375, 377, and 381 the successive patterns of digital signals produced. When the revolution counter has been decremented at step 391, a test of its contents at step 393 for the number zero is made to determine whether all of the revolutions in a stroke of agitation have been completed by motor M. If not, operations loop to MAIN1 and continue with step 355 and the subsequent steps to continue commutating motor M in the same direction of rotation. If the revolution counter has reached zero, a branch is made from step 393 to step 395 where the counter is reloaded with the number 5 or 250, depending on the setting of switch 231.2 of FIG. 6. In step 397, operations are performed to prepare for commutation in the opposite direction, as discussed more fully in connection with FIG. 11.

In FIG. 10, low speed back emf routine 371 commences with BEGIN 401. A two-millisecond interrupt timer is started running at step 403. At step 405, the value of INDEX representing the point in the sequence in the Table I or II is checked for being even or odd. If it is even (INDEX=0,2,4) the test bit order is 0,1. The digitized voltage of FIG. 6A is tested at step 407 and the testing is repeated by branching back from step 409 until the first test bit of 0 is found, whence the two-millisecond interrupt timer is cleared at step 411 and step 417 is reached. It is noted that the repeated execution of steps 407 and 409 until the zero (0) is found corresponds to arrows 235.1–235.3 in FIG. 6A. If INDEX is odd (1,3,5), the test bit order utilized is 1,0. The digitized voltage (which is inverted in polarity from that of FIG. 6A) is tested at step 413 and the testing is repeated by branching back from step 415 until the first test bit of 1, this time, is found, whence the two-millisecond interrupt timer is cleared at step 411 and step 417 is reached. If the repeated testing at either step 407 or 413, as the case may be, continues for 2 milliseconds without avail, a timer interrupt occurs and operations proceed to step 417.

An 18-millisecond interrupt timer is started running at step 417. At step 419, the value of INDEX representing the point in the sequence in the Table I or II is checked for being even or odd. If it is even (INDEX=0,2,4) the test bit order is 0,1 as already stated. The digitized voltage of FIG. 6A is tested at step 421 and the testing is repeated by branching back from step 423 until the second test bit of 1 (in 0,1) is found, whence the 18-millisecond interrupt timer is cleared at step 425 and RETURN 427 is reached. It is noted that the repeated execution of steps 421 and 423 until the one (1) is found corresponds to arrows 235.4–235.8 in FIG. 6A. If INDEX is odd (1,3,5), the test bit order utilized is 1,0 as already stated. The digitized voltage (which is inverted in polarity from that of FIG. 6A) is tested at step 429 and the testing is repeated by branching back from step 431 until the second test bit of 0 (zero), this time, is found, whence the 18-millisecond interrupt timer is cleared at step 425 and RETURN 427 is reached. If the repeated testing at either step 421 or 429, as the case may be, continues for a full 18 milliseconds without avail, a timer interrupt occurs and operations proceed to RETURN 427.

FIG. 11 shows the reversing routine 397 of FIG. 9 in greater detail. Operations commence therein at BEGIN 451. INDEX is initialized to zero at step 453. The direction variable DIRECT is tested at step 455. If DIRECT is 0, for clockwise (CW) rotation, step 457 changes it to 1, for counterclockwise (CCW) rotation, and INDEXR is increased by 12 at step 459 in order to enter the range of INDEXR in Table II. If DIRECT is 1 for CCW rotation in step 455, step 461 changes it to 0, for CW rotation, and INDEXR is decreased by 12 at step 463 in order to enter the rane of INDEXR in Table I. Steps 455–463 in effect are operations by which microcomputer 61 changes INDEXR and the direction variable DIRECT which are subsequently used in producing successive patterns of digital signals for achieving the desired direction of rotation of motor M.

Before the motor M is commutated in the opposite direction from that in which it was turning previously, it is caused to stop rotating by operations which commence at MTROFF point 465, and proceed to produce an OFF pattern (all ones on lines 62) at step 467. The motor M, having its power removed, coasts to a stop. However, microcomputer 61 needs to know when the motor has actually stopped. This information is obtained by first loading a counter at step 469 with a predetermined number indicative of a predetermined time period during which there should be no back emf observed when and if the motor has actually stopped. Next at step 471 one or more of the port P1 inputs 0, 1, and 2 is sensed for its digitized voltage. As long as the rotor is coasting, the digitized voltage from each of the winding stages is a succession of highs and lows. If a zero, or low, is sensed, the rotor may still be coasting or it may have stopped, but if a one, or high, is sensed, the rotor must still be coasting. Accordingly, a branch is made from step 473 if a high bit, or logic level of one, is sensed and the counter is reloaded with the predetermined number at step 469 since the rotor must still be coasting. On the other hand, operations proceed from step 473 to step 474 if a low bit, or logic level of zero, is sensed, and the counter is decremented. Since the rotor may still be coasting, however, a branch is made from step 477 back to testing step 471 unless the counter has been decremented to zero. In this way if the rotor is still coasting, a one (1) bit indicating existence of back emf is sensed sooner or later at step 471 and the counter can be reloaded at step 469 as a result of the branch from step 473. Eventually the rotor stops and a sufficient time period elapses without back emf to assure microcomputer 61 that the rotor has stopped. The counter is decremented to zero and operations proceed from step 477 to RETURN 479.

In having the capability to perform the reversing routine of FIG. 11, microcomputer 61 and control signal generator 51 together constitute means for causing the rotatable means to reverse in its direction of rotation by producing a pattern of the control signals for causing the commutating means to remove power from all of the winding stages, for sensing the digitized voltages while the power is so removed, and for producing successive patterns of the control signals in a second preselected sequence to rotate the rotatable means in the reverse direction only after a predetermined time period has elapsed subsequent to the last occurrence of a predetermined logic level in any of the digitized voltages.

FIG. 11A shows a series of operations of microcomputer 61 for braking motor M to stop the rotation more quickly than occurs when motor M is permitted to coast to a stop as in FIG. 11. The operations of FIG. 11A are performed in substitution for the steps 467,469,471,473,475,477 and 479 of FIG. 11 in a reversing routine and performed at any point in the operations of microcomputer 61 where braking is deemed desirable by the skilled worker. Braking operations commence with BEGIN 481 and proceed to produce an OFF pattern 483 (all ones on lines 62) for leaving all of the winding stages of motor M unpowered. Microcomputer 61 waits for a delay period of illustratively 3 milliseconds at step 485 before proceeding to step 487. At step 487 a braking pattern of the digital signals is produced as shown at FIG. 4B in connection with the entry "BRAKE." The braking pattern causes commutating circuit 31 to connect together all of the terminals of the winding stages selected by High-low speed circuit 41. The mechanical energy store in the rotor is rapidly dissipated electrically because the winding stages are in effect shorted together. At step 489 another delay period, this time for 12.5 milliseconds, is executed by microcomputer 61. Another OFF pattern is produced at step 491, followed by another 3 millisecond delay by the microcomputer 61 at step 493, and braking operations are completed at RETURN 495.

In having the capability to perform the steps described in connection with FIG. 11A, microcomputer 61 and control signal generator 51, as pattern producing and digitized voltage sensing means, constitute means for also producing a pattern of the control signals which causes the commutating circuit 1 to switch all of the winding stages to one of the supply conductors 113 or 115, thereby braking the motor M.

An interrupt low at the INT-bar pin of microcomputer 61 can occur at any time during the washing mode or spin mode operations of laundry apparatus 11. FIG. 12 illustrates a sequence of operations which occurs upon interrupt. Interrupt operations commence at BEGIN 501. Optional step 507 is described later in connection with FIG. 13. The high-low speed flag FLG1 is checked at step 513. If the flag is a zero (low speed winding selection), an internal timer (not shown) in microcomputer 61 is loaded with a number corresponding to the predetermined time period T1 (FIG. 7A) of 100 microseconds in step 515, and if the flag is a one (high speed winding selection), the timer is loaded for a predetermined time period T1 of 50 microseconds at step 517 to take account of the higher motor speeds. Next at steps 519 and 521 the timer is decremented until it reaches zero thereby to execute a delay for the time period T1 and indicating that time period T1 has elapsed. An optional step 523 is discussed below in connection with FIG. 13. At step 525 microcomputer 61 transmits a pulse on the line DB7 of FIG. 7 to clear the latch or flipflop 273 whence interrupt operations are completed at RETURN 527.

In FIG. 7A the duty cycle of pulse width modulation (PWM) for motor M is controlled by causing the Q and Q-bar outputs of latch 273 to change state between time periods T1 and T2 as shown. FIG. 7 reflects a hardware approach for setting T2 by means of circuit portion 295, and the microcomputer 61 sets T1 in the interrupt routine of FIG. 12.

In FIG. 13 a software approach is suggested for controlling the time period T2 when the motor M is powered. The circuit portion 295 of FIG. 7 is deleted in a now-described alternative embodiment. An otherwise unused output line such as DB5 (not shown) is connected to the PRESET input of latch 273. Variable duty cycle instructions corresponding to the operations called for in FIG. 13 are inserted between steps 315 and 317 of FIG. 8 at the point designated RUN. At step 531 input information corresponding to the desired duty cycle is read in to microcomputer 61 as from switches 231.6, 231.7, 231.8, and 231.9 at pins DB0–DB3 of FIG. 6. This duty cycle information is a 4 bit binary code when pins DB0–DB3 are used for input, so that 16 values of duty cycle D1 are selectable. Given a predetermined time period T1 value, there corresponds a particular value of T2 which solves the duty cycle equation $$D1 = T2/(T2+T1) \qquad (1)$$

The duty cycle equation (1) is solved for time period T2 for time-on with result:

$$T2 = T1(D1/(-D1)) \qquad (2)$$

Values of T2 are stored in a table in memory corresponding to the values of desired duty cycle D1 which can be read in in step 531. When one of the values D1 is read in, the corresponding value of T2, or time-on, is fetched from the table in step 533. At step 535 the interrupt process is enabled so that microcomputer 61 can be interrupted by excessive current sensed by comparator 261 of FIG. 7. Then at step 537 a timer is loaded with a number corresponding to the time-on T2 and set running. The timer (not shown) is an internal timer in microcomputer 61 which is for present purposes called a duty interrupt timer. Microcomputer 61 executes the operations of FIG. 8 and of the washing and spin modes selected, but is interrupted when the duty interrupt timer times out at the end of time period T2, beginning the interrupt routine of FIG. 12.

The FIG. 12 interrupt routine now is described with the optional steps 507 and 523 included. At step 507 interrupt pin INT-bar is masked to avoid interaction with latch 273, and latch 273 of FIG. 7 is set by transmitting a zero or Low from microcomputer 61 to its PRESET input. The Q output of latch 273 goes high, leaving motor M unpowered through control signal generator 51 and commutating circuit 31. The interrupt operations proceed in steps 513-521 so that predetermined time period T1 elapses. At step 523, the duty interrupt timer in microcomputer 61 is reloaded with a value corresponding to time period T2 and set running again. Latch 273 is cleared at step 525, bringing its Q output low and powering the motor M again. Also at step 525 interrupt pin INT-bar is enabled so that any overcurrent interrupt caused by comparator 261 can be sensed.

Figure 14:
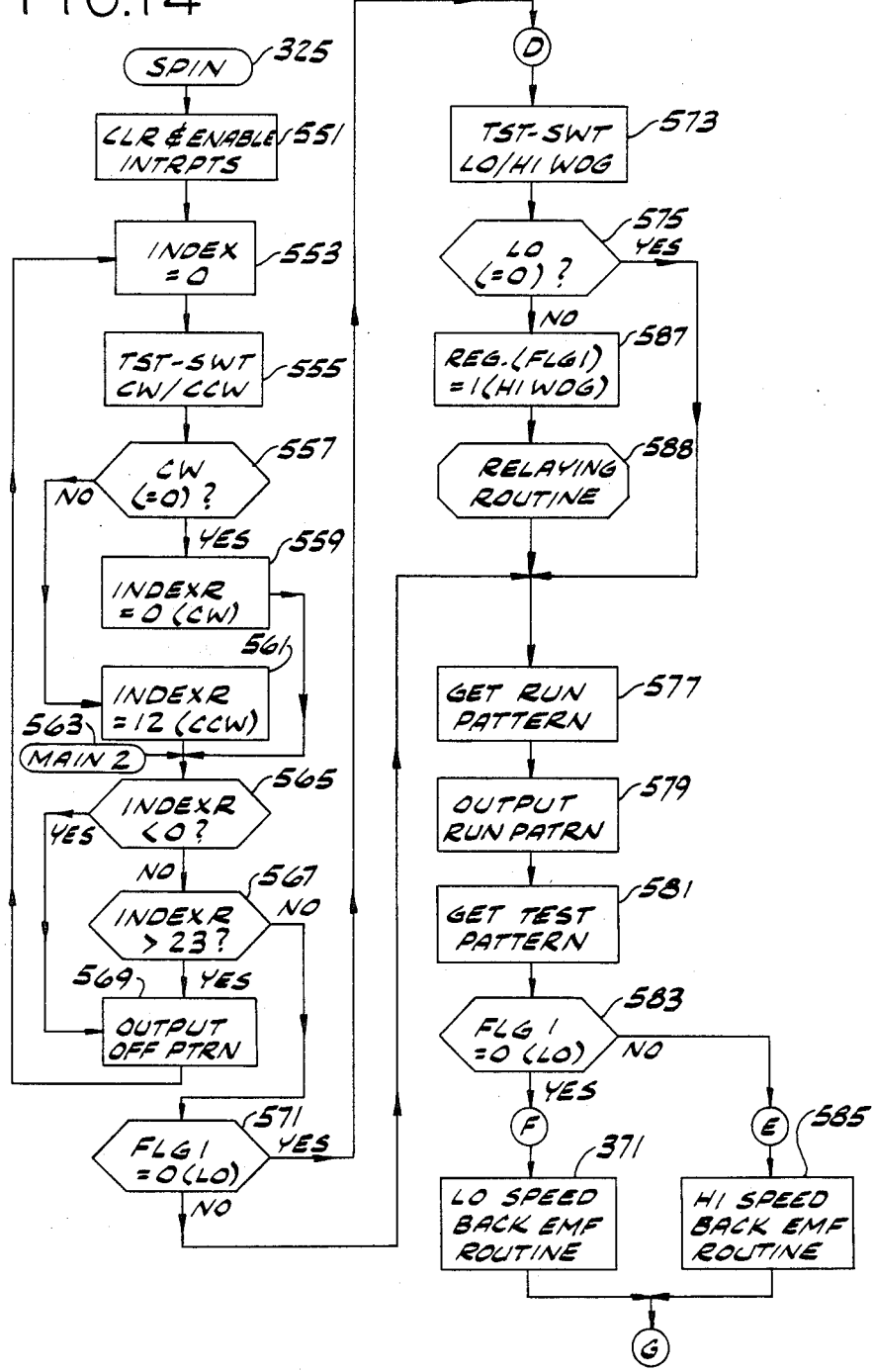
FIG. 14 is a flow diagram of operations performed by the microcomputer of FIG. 1 in accordance with the invention in accomplishing a spin mode selected in the operations of FIG. 8.

The spin mode of laundry apparatus 11 has operations shown in FIG. 14 which commence at point 325. Microcomputer 61 clears latch 273 and enables interrupts in step 551. The value of INDEX is set to zero (0) for purposes of Tables I and II in step 553. The direction in which the motor M is to turn during the spin mode is determined from the setting of switch 231.3 (CW/CCW in FIG. 6) in step 555. If switch 231.3 is set to CW, operations proceed from step 557 to step 559 and the preselected sequence defined in Table I is selected by setting INDEXR to zero in step 559. If switch 231.3 is set to CCW, operations proceed from step 557 to step 561 and the preselected sequence defined in Table II is selected by setting INDEXR to 12 in step 561. Operations of microcomputer 61 reach point 563 designated MAIN2 when either step 561 or step 559 has been completed.

Steps 565, 567, and 569 check INDEXR to assure that it does not have a value clearly indicating some error in the system. If INDEXR is negative or greater than 23, an OFF digital signal pattern (all ones) is produced at step 569, and operations loop back to step 553.

When operations reach step 571, the high-low speed winding flag FLG1 is tested to determine which selection is being made by high-low speed circuit 41. Assume that the selection is initially low and the spin mode is just beginning. FLG1 is zero, indicating low speed winding, and operations pass through point D to step 573 where HI/LOW Speed switch 231.1 is tested. In the present embodiment, switch 231.1 can be initially set in the LOW speed position and the motor M is brought up to a steady speed. Then switch 231.1 is changed to the HI speed position for commanding microcomputer 61 to cause relaying by High-low speed switching circuit 41 and causing motor M is accelerate to a higher speed. The operations of microcomputer 61 in responding to switch 231.1 are described in greater detail next.

When switch 231.1 is set to LOW, indicating that the motor M is to be in the low speed connection arrangement for the time being, a branch is made at step 575 to step 577. At step 577 a digital signal pattern is obtained from memory and stored in the accumulator. For example, the first digital signal pattern so obtained is 01111100 from the leftmost column of Table I when CW/CCW switch 231.3 is in the CW position. Next at step 579, the digital signal pattern is produced from the accumulator as an output on lines 62 (termed "output run patrn" on the flow diagram) for control signal generator 51. In step 581 a test pattern, which is 0,1 or 1,0 is obtained from memory for use in testing the digitized voltage as explained in connection with FIG. 6A. The test pattern to be used is tabulated in Tables I and II in the same column as the digital signal pattern which has just been produced. Equivalently, and as discussed in connection with FIGS. 10 and 15, the test bit order is directly implemented in the coding as a function of whether INDEX is even or odd, and step 581 is omitted. At step 583, depending on whether FLG1 is set for Low (0) or High (1) speed, a branch is made through point F to low speed back emf routine 371 or through point E to high speed back emf routine 585. In each of back emf routines 371 and 585 and as more fully discussed in connection with FIGS. 10 and 15, the digitized voltage of FIG. 6A is tested for complementary bits, or logic levels, in the proper test bit order whence point G is reached.

When motor M is running at low speed, flag FLG1 has been set to zero. Assume that it is desired to accelerate motor M to a higher speed so that switch 231.1 is physically changed to HI. (It is also contemplated that the change from low to high can be alternatively accomplished in software.) FLG1 is still set to zero and in FIG. 14 operations pass through pont D to step 573. Now when switch 231.1 is tested at step 573, a branch is made from step 575 to step 587 where flag FLG1 is set to one for High Winding Tap. Then a relaying routine at step 588 is executed for actually relaying from the low speed to the high speed winding connections to motor M and for determining the proper point in the sequence for resuming commutation when the relaying is completed. Relaying routine 588 is described in greater detail in connection with FIG. 17. When operations at steps 573, 575, 587, and 588 have been completed, motor M is commutated and accelerated, and steps 573, 575, 587, and 588 are bypassed by a NO branch from step 571 to step 577 subsequently during high speed rotation. Steps 577, 579, and 581 are performed. At step 583 flag FLG1 is now set for High speed and operations pass through point E to high speed back emf routine 585.

In FIG. 15 high speed back emf routine 585 is similar to low speed back emf routine 371 of FIG. 10 except in being adapted for the shorter time intervals encountered at higher rotor speeds. Operations commence at BEGIN 589 and a one-millisecond interrupt timer is started at step 590. Step 591 unifies the operations performed in steps 405 and 419 of FIG. 10. At step 591, the value of INDEX representing the point in the sequence in the Table I or II is checked for being even or odd. If it is even (INDEX=0,2,4) the test bit order is 0,1. The digitized voltage of FIG. 6A is tested at step 593 and the testing is repeated by branching back from step 595 until the first test bit of 0 is found. The digitized voltage of FIG. 6A is again tested at step 597 and the testing is repeated by branching back from step 599 until the second test bit of 1 is found. Then the one-millisecond interrupt timer is cleared at step 601 and RETURN 603 is reached. it is noted that the repeated execution of steps 593 and 595 until the zero (0) is found corresponds to arrows 235.1–235.3 in FIG. 6A, and repeated execution of steps 597 and 599 until the one (1) is found corresponds to arrows 235.4–235.8. If INDEX is odd (1,3,5), the test bit order utilized is 1,0. The digitized voltage (which is inverted in polarity from that of FIG. 6A) is tested at step 605 and the testing is repeated by branching back from step 607 until the first test bit of 1, this time, is found. Then the digitized voltage is tested at step 609 and the testing is repeated by branching back from step 611 until the second test bit of 0, this time, is found, whence the one-millisecond interrupt timer is cleared at step 601 and RETURN 603 is reached. If the repeated testing at steps 593–599 or 605–611, as the case may be, continues for a full one millisecond without avail, a timer interrupt occurs and operations proceed to RETURN 603.

Figure 16:
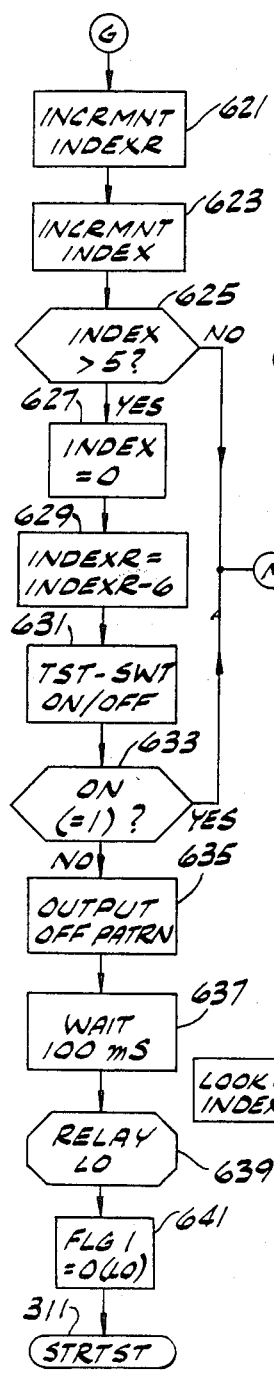
FIG. 16 is a flow diagram of operations performed by the microcomputer of FIG. 1 in accordance with the invention in advancing in a sequence of commutation and turning off the motor on command.

FIG. 16 shows more operations of microcomputer 61 in the spin mode continuing from point G from FIG. 14. The operations advance in sequence of commutation beginning at step 621. At steps 621 and 623, INDEXR and INDEX are respectively incremented, moving one column to the right, in effect, in Table I or II. If INDEX has not reached the number 6, operations branch from step 625 to the point 563 designated MAIN2 in FIG. 14 and continue with the sequence of steps from MAIN2 to point G, commutating the motor until INDEX reaches 6. When INDEX reaches 6, a branch is made from step 625 to step 627. The value INDEX is essentially treated modulo 6, so that operations cycle through Table I or II, depending on rotation direction, to commutate motor M as long as desired in the spin mode. INDEX is reset to zero at step 627. At step 629, INDEXR is decreased by 6. The latter operation recognizes that when rotation is being executed in either Table I or II, INDEXR reaches the number 6 or 18 when INDEX is 6, so that INDEXR must be cycled back to a permitted number 0 or 12 in Table I or II by subtraction by 6.

At step 631 the On/Off switch 231.5 of FIG. 6 is tested. If the switch is still set to "On," operations pass from step 633 back to FIG. 14 point MAIN2 so that commutation continues. If the switch has been turned off, a branch is made from step 633 to step 635 whence the pattern OFF (all ones on lines 62) is output to shut the motor off. At step 637 a loop or counting operation is provided so that microcomputer 61 waits 100 milliseconds or for any other desired time interval. In step 639 microcomputer 61 issues a High on line DB6 (FIG. 3) producing a Low on line H from NAND gate 157, and causing relay 147 in high-low speed circuit 41 to switch back to a low speed connection arrangement. The high-low speed flag FLG1 is reset to zero (low speed) at step 641, and operation pass to STRTST point 311 of FIG. 8, there to poll On/Off switch 231.5 until it is turned on.

In FIG. 17 the relaying routine of step 588 of FIG. 14 is shown in greater detail. Operations commence with BEGIN 651 and proceed to produce the OFF pattern (all ones on lines 62) at step 653 to turn off the motor M. At step 655 microcomputer 61 issues a Low on line DB6 (FIG. 3) producing a High on line H from NAND gate 157, and cusing relay 147 in high-low speed circuit 41 to switch from the low speed connection arrangement to a high speed connection arrangement. Microcomputer 61 waits for ten milliseconds as by any suitable routine, such as counting from a preset number down to zero, in step 657 in order to permit the relay 147 armature 155 to come to rest in the high speed position. However, during this waiting period, the rotor 15 of motor M has, or may have, rotated a through a significant angle for commutation purposes. Accordingly, at step 659 a routine is executed for determining the value of INDEX from the sensed digitized voltages on comparator outputs A, B, and C of FIG. 6 when the winding stages are temporarily unpowered, and resuming producing patterns of digital signals on lines 62 beginning with the pattern of digital signals (and thus a corresponding set of control signals from control signal generator 51) identified by the value of INDEX so determined. After step 659 RETURN 661 is reached.

Step 659 of FIG. 17 recognizes that when motor M is unpowered and the rotor is coasting, all of the winding stages are producing back emfs. As shown in FIG. 6, the back emfs are digitized by comparators 201, 203, and 205. The digitized back emfs for three wye-connected winding stages S1, S2, and S3 are illustrated in FIG. 18 and tabulated in Tables III and IV for clockwise and counterclockwise rotation respectively.

In FIG. 18 and in the first three rows of Tables III and IV, the logic levels of the digitized voltages on input lines 0, 1, and 2 of microcomputer 61 are shown when rotor 15 is coasting. Each of the six columns shows the logic levels of the digitized back emfs present at any given time. As the rotor turns, the logic levels of a given column are replaced by the logic levels in the column next to the right. When the right-most column is reached, the logic levels begin again in the left-most column, cycling through the columns as before. FIG. 18 shows superimposed on the logic zeros and ones a waveshape of the digitized back emfs on the input lines 0, 1, and 2. The digitized back emfs at any one time and their changes to other values at other times bear sufficient information to permit sensing the position of the turning rotor 15 and to identify the proper point in sequence for beginning commutation of such turning rotor and for resuming commutation whenever commutation is interrupted or discontinued. Accordingly, the index-determining operations of step 659 as described in further detail in FIG. 19 are used in relaying routine 588 in the preferred embodiment, and are used in other embodiments of the invention whenever it is desired to begin commutation in sequence.

Figure 19:
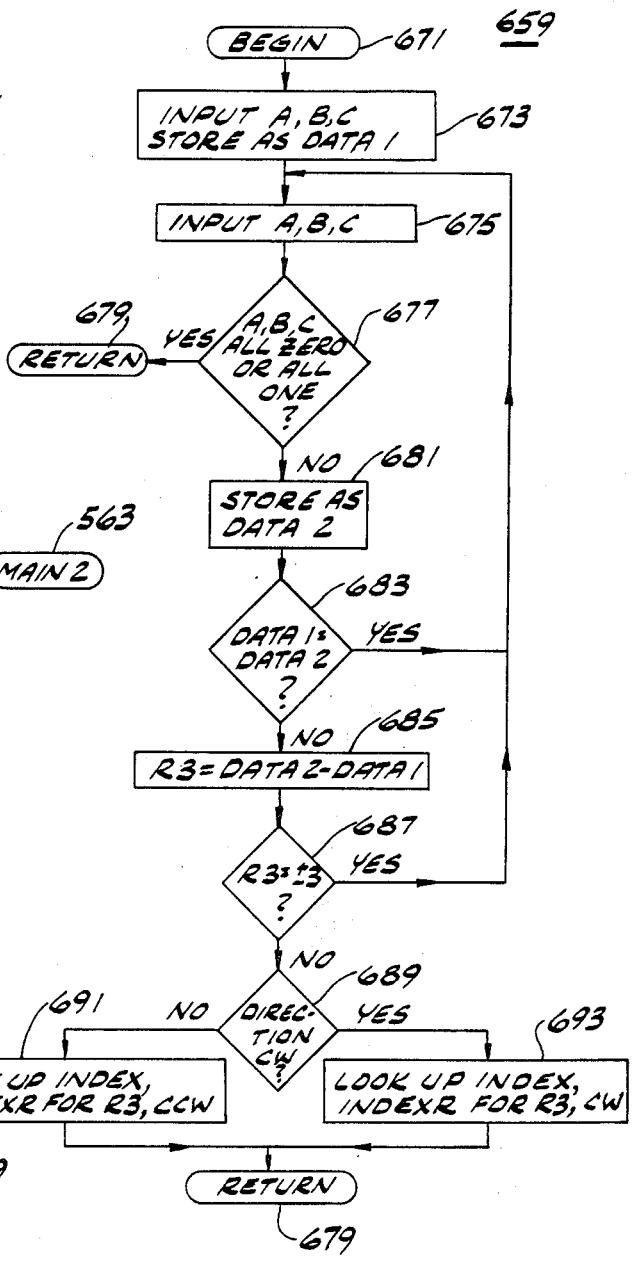
FIG. 19 is a flow diagram of operations performed by the microcomputer of FIG. 1 in accordance with the invention for determining a proper point in sequence to begin or resume commutation when the rotor of the motor is turning, as in the relaying routine of FIG. 17.

In FIG. 19 operations commence with BEGIN 671, and microcomputer 61 inputs all the lines 0,1, and 2 of port P1 at once by masking with ALLHI=07 (binary 00000111). As a result their resides in microcomputer 61 a three bit binary number having binary digits corresponding to each of the digitized voltages on the three lines. This binary number is designated DATA1 and stored in step 673. Then at step 675, microcomputer 61 inputs all the lines 0,1, and 2 of port P1 again in search of digitized voltages corresponding to an adjacent column of digitized voltages in FIG. 18. In order to avoid error, if the latest set of digitized voltages is all zeros (decimal zero (0)) or all ones (decimal seven (7)), then the index determining routine is aborted by passing to RETURN 679. The reason for this is that as shown in FIG. 18, the digitized voltages are never all high at the same time when the rotor is coasting. Also, the digitized voltages are all zero only when the rotor has stopped.

If the digitized voltages are not 0 or 7 as just discussed, then operations proceed from step 677 to step 681 where the digitized voltages just obtained in step 675 are stored and designated DATA2. In step 683, DATA1 is compared with DATA2. If they are the same number, (i.e. DATA1−DATA2=0) the rotor has not turned sufficiently to move to the adjacent rightward column in FIG. 18 and in the Table III or IV corresponding to the direction of rotation. When DATA1=DATA2 a branch is made back to step 675 to input another set, or instance, of digitized voltages until an instance of digitized voltages is found at step 675 which is different from DATA1. At step 685, the difference DATA2−DATA1 is computed. Step 687 checks the value of the difference, which from inspection of differences between the hexadecimal equivalents of the digitized voltages (tabulated in row HEX of Tables III and IV) should not be equal to 3 or −3 if the data is unaffected by noise. If the difference is equal to the unpermitted numbers 3 or −3, a branch is made from step 687 to step 675, until a value of DATA2 is found which passes the test of step 687.

When step 689 is reached, microcomputer 61 has stored values of DATA1 and DATA2 which are in adjacent columns of one of the Tables III or IV. Each Table III or IV lists values of R3, which is the difference DATA2−DATA1, in the column corresponding to the digitized back emfs in DATA1. Beneath a value of difference R3 in each of column of Table III or IV are values of INDEX and INDEXR. The values of INDEX and INDEXR are precisely the values for identifying the proper Table I or II and the proper column therein containing the digital signal pattern which microcomputer 61 can and does then produce to resume commutation of the winding stages at the proper point in sequence. (Beneath the tabulated value of R3 in Table III is an entry designated "Offset R3" which is a number calculated in the program listing of Appendix I for microcomputer table lookup purposes.)

At step 689 microcomputer 61 determines which direction the rotor 15 has been made to turn in. When switch 231.4 is in the spin mode, the direction is given by the setting of switch 231.3 as CW or CCW. When switch 231.4 is in the wash mode, the direction is given by the value of the variable DIRECT of FIG. 11. In either mode the direction can also be obtained from INDEXR. If INDEXR is in the range 0–5, the direction is clockwise, and if INDEXR is in the range 12–17 the direction is counterclockwise.

If the direction determined is counterclockwise, a branch is made from step 689 to step 691 for table lookup in a table in microcomputer 61 having the information found in Table IV in rows R3 and INDEX. When INDEX is found, INDEXR is reset by adding 12 to INDEX. If the direction determined is clockwise, a branch is made from step 689 to step 693 for table lookup in a table in microcomputer 61 having the information found in Table III in rows R3 and INDEX.

INDEXR is reset as equal to INDEX when the direction is clockwise. After step 691 or step 693 is executed, RETURN 679 is reached.

The operations of FIG. 19 can be described more generally as follows. Microcomputer 61 identifies successive patterns of the control signals and of the digital signals of Tables I and II by values of an index designated INDEX. A value of the index is determined from the sensed digitized voltages when the winding stages are temporarily unpowered. Microcomputer 61 resumes producing successive patterns of the digital signals which causes control signal generator 51 to generate successive patterns of the control signals in sequence beginning with a pattern of the digital signals and control signals determined from the sensed digitized voltages. The lookup table information stored in microcomputer 61 is a function, i.e. a predetermined correspondence between members of two sets of numbers. The sets of numbers involved here are values of INDEX on the one hand and values of the differences R3. Equivalently, Tables III and IV can be regarded as tabulating INDEX as a function of digitized back emf itself. It is also to be understood that there are a multitude of equivalent ways made known by the disclosure made herein, of setting up a function relating the digitized back emf information to some variable such as INDEX which can be used to determine the proper point for beginning in sequence when commutation begins again. When the successive patterns of digital signals and control signals are identified by values of an index, the index is advantageously determined as a function of a number represented by the sensed digitized voltages when the winding stages are temporarily unpowered, and microcomputer 61 resumes producing patterns beginning with the pattern of the control signals identified by the value of the index so determined. The index is determined as a first function of a number represented by the sensed digitized voltages when the winding stages are temporarily unpowered and the preselected sequence is for clockwise rotation of the rotatable means 15 and determined as a second function of the number so represented when the preselected sequence is for counterclockwise rotation, and microcomputer 61 resumes producing patterns beginning with the pattern of the control signals identified by the value of the index so determined. The value of the index is also determined as a function of the difference of first and second numbers represented by different instances of the sensed digitized voltages, and microcomputer 61 begins with the pattern of the control signals identified by the value of the index so determined. The value of the index is determined as a function of the difference of first and second numbers represented by different instances of the sensed digitized voltages unless one of the numbers is in a set of predetermined numbers, such as 0 and 7, and microcomputer 61 begins with the pattern of the control signals identified by the value of the index so determined. A difference of first and second numbers represented by different instances of the sensed digitized voltages is claulated and a value of the index is determined as a function of the difference unless the difference is in a set of predetermined numbers, such as 0, +3, and −3, and microcomputer 61 begins with the pattern of the control signals identified by the value of the index so determined. Microcomputer 61 in this way prevents sensed digitized voltages representing a number in a predetermined set, such as 0 and 7, from being used to determine the beginning pattern of control signals. Microcomputer 61 in FIG. 19 repetitively senses the digitized voltages while the winding stages are temporarily unpowered and determines the beginning pattern of the control signals as soon as a change occurs in any one of the sensed digitized voltages.

In some applications of the invention involving current interrupt as in FIG. 7, the time period T1 when the motor M is unpowered can be long enough to make index-determination as in FIG. 19 advisable. In such circumstances, the index-determining operations of FIG. 19 are inserted in the interrupt routine of FIG. 12 immediately following step 521 so as to update INDEX and INDEXR. When the control system of FIG. 1 constitutes means for comparing the current flowing the other powered winding stages of the electronically commutated motor M with a predetermined level, and upon the level being exceeded, interrupting the digital computer and also causing the control signal generator 51 to generate a pattern of control signals to discontinue the supply of power to the winding stages, the digital computer comprising means for also monitoring the position of the rotatable means 15 when the winding stages are thus unpowered and resuming producing patterns of the digital signals after a predetermined time interval beginning with a pattern then corresponding to the position of the rotatable means.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

APPENDIX I

```
ISIS-II MCS-48/UPI-41 MACRO-ASSEMBLER, V4.0                    PAGE  1
10 MHZ VERSION PROGRAM: MAIN & SPEED CONTROL

LOC  OBJ           LINE        SOURCE STATEMENT

1   $TITLE    ('10 MHZ VERSION PROGRAM: MAIN & SPEED CONTROL')
                     2   $DEBUG
                     3
                     4
                     5
                     6   ;***************************************************************
                     7   ;*                                                             *
                     8   ;* COPY RIGHT 1982 GENERAL ELECTRIC COMPANY-APPLIANCE MOTOR DEPT*
                     9   ;*                    ALL RIGHT RESERVED                       *
                    10   ;*                                                             *
                    11   ;***************************************************************
                    12
                    13
                    14
                    15
                    16
                    17
                    18
                    19
                    20
                    21
                    22              ;PORT ASSIGNMENT
                    23
                    24              PORT2
                    25   P20:       ;A+ DRIVER
                    26   P21:       ;C- DRIVER
                    27   P22:       ;B+ DRIVER
                    28   P23:       ;A- DRIVER
                    29   P24:       ;C+ DRIVER
                    30   P25:       ;B- DRIVER
                    31   P26:       ;BOTTOM RAIL DISABLE
                    32   P27:       ;TOP RAIL DISABLE
```

| | | | | |
|---|---|---|---|---|
| 33 | | PORT1 | | |
| 34 | | P10: | PHASE B COMPARATOR | |
| 35 | | P11: | PHASE A COMPARATOR | |
| 36 | | P12: | PHASE C COMPARATOR | |
| 37 | | P13: | HI/LOW SPEED SWITCH I/P | |
| 38 | | P14: | 5/250 REVOLUTION | |
| 39 | | P15: | CW/CCW | |
| 40 | | P16: | SPIN/WASH | |
| 41 | | P17: | ON/OFF | |
| 42 | | | | |
| 43 | | IB0: | SPARE SW | |
| 44 | | IB1: | SPARE SW | |
| 45 | | IB2: | SPARE SW | |
| 46 | | IB3: | SPARE SW | |
| 47 | | IB4: | NC | |
| 48 | | IB5: | NC | |
| 49 | | IB6: | RELAY DRIVER | |
| 50 | | IB7: | CLEAR F/F | |
| 51 | | | | |
| 52 | | TEST PORT | | |
| 53 | | T0: | CURRENT SENSING COMPARATOR | |
| 54 | | T1: | NC | |
| 55 | | | | |
| 56 | | INT: | FLIP FLOP QBAR Q/F | |
| 57 | | | | |
| 58 | | ; CONTROL DRIVER PATTERN FOR CLOCKWISE DIRECTION | | |
| 59 027C | PATTRN | EQU | 01111100B | ;MON A+ |
| 60 027D | PATRN1 | EQU | 10111001B | ;MON C- |
| 61 027E | PATRN2 | EQU | 01110011B | ;MON B+ |
| 62 027F | PATRN3 | EQU | 10100111B | ;MON A- |
| 63 0280 | PATRN4 | EQU | 01001111B | ;MON C+ |
| 64 0281 | PATRN5 | EQU | 10011110B | ;MON B- |
| 65 | | | | |
| 66 | | ; CONTROL PATTERN FOR RUNNING COUNTER CLOCKWISE DIRECTION | | |
| 67 0282 | CCWPAT | EQU | 01011110B | ;MON A+ |
| 68 0283 | CCWPT1 | EQU | 10001111B | ;MON B- |
| 69 0284 | CCWPT2 | EQU | 01100111B | ;MON C+ |
| 70 0285 | CCWPT3 | EQU | 10110011B | ;MON A- |

```
         73  CCWFT4    EQU    01111001B
         74  CCWFT5    EQU    10111100B
         75  ;
         76  ;              CW MONITOR PATTERNS
         77  ;
0077E    78  MONITR    EQU    01111110B
00BEH    79  MONIT1    EQU    10111101B
0060H    80  MONIT2    EQU    01110111B        ;MON E+
007EH    81  MONIT3    EQU    10111110B       ;MON G-
0076H    82  MONIT4    EQU    01111110B
00BDH    83  MONIT5    EQU    10111101B
         84  ;
         85  ;              CCW MONITOR PATTERNS
         86  ;
007EH    87  CCWMON    EQU    01111110B
00BDH    88  CCWMC1    EQU    10111101B
006EH    89  CCWMO2    EQU    01101111B
007EH    90  CCWMO3    EQU    10111110B
00BDH    91  CCWMO4    EQU    01111110B
         92  CCWMO5    EQU    10111101B
         93  ;
         94  ;              TEST PATTERN FOR CW/CCW
         95  ;
0001H    96  TESTCW    EQU    01H
0002H    97  TESTC1    EQU    02H
0004H    98  TESTC2    EQU    04H
0001H    99  TESTC3    EQU    01H
0002H   100  TESTC4    EQU    02H
0004H   101  TESTC5    EQU    04H
        102  ;
0004H   103  TESTCC    EQU    04H
0002H   104  TESTW1    EQU    02H
0001H   105  TESTW2    EQU    01H
0004H   106  TESTW3    EQU    04H
0002H   107  TESTW4    EQU    02H
0001H   108  TESTW5    EQU    01H
        109  ;
        110  ;              CONTROL EQUATES
        111  ;
```

```
0280   112  ONMASK   EQU   80H      ;ON/OFF SW MASKING
0240   113  AGMASK   EQU   40H      ;AGITATE/SPIN SWITCH
0220   114  DIRMSK   EQU   20H      ;CW/CCW SW MASK
0010   115  REVMSK   EQU   10H      ;REVOLUTION MASK
0240   116  RLYOFF   EQU   40H      ;TURN RELAY OFF
FFFF   117  RLYON    EQU   NOT RLYOFF
0008   118  SPEEDS   EQU   08H      ;HI/LOW SPEED SW MASK
007F   119  FFPRST   EQU   7FH      ;F/F CLEAR
0080   120  FFRST    EQU   80H      ;F/F RESET
002A   121  MCNBIT   EQU   2AH      ;MONITOR PATTERN MASK
0014   122  MCNTIM   EQU   20       ;MONITOR DELAY TIME, 5 US PER STEP
FFC2   123  DLY3M    EQU   -62      ;3 MS TIMER VALUE
FF06   124  DLY12M   EQU   -250     ;12 MS TIMER VALUE
0064   125  DLY2S    EQU   100      ;2 SEC DELAY COUNTER VALUE
0023   126  DLY15M   EQU   23H      ;1.5 MS DELAY COUNTER VALUE
0027   127  ALLHI    EQU   27H      ;MASK FOR COMPARATOR O/P
0003   128  DIFF3    EQU   03H      ;DIFFERENCE 3
00FD   129  DIFFD    EQU   0FDH     ;DIFFERENCE -3
004B   130  OFFSET   EQU   04BH     ;TABLE OFFSET VALUE
000C   131  CWTABL   EQU   12       ;CW PATTERN OFFSET VALUE
0048   132  DBPTIM   EQU   04BH     ;DEBOUNCE TIME IN MAIN ROUTINE
0023   133  LOWTIM   EQU   23H      ;DEBOUNCE TIME IN RETURN-TO-MAIN
00FC   134  NOT4     EQU   0FCH     ;2'S COMPLEMENT 4
00FA   135  NOTSIX   EQU   0FAH     ;2'S COMPLEMENT 6
       136  ;
0000   137  ZERO     EQU   0
0001   138  ONE      EQU   1
0002   139  TWO      EQU   2
0003   140  THREE    EQU   3
0004   141  FOUR     EQU   4
0005   142  FIVE     EQU   5
0006   143  SIX      EQU   6
       144  ;
       145  ;          MEMORY EQUATES
       146  ;
0032   147  DIRECT   EQU   32       ;DIRECTION REGISTER
0033   148  REVCTR   EQU   33       ;REVOLUTION COUNTER 2
0034   149  REVCT1   EQU   34       ;REVOLUTION COUNTER 1
0035   150  DATA1    EQU   35       ;DATA REGISTER
0036   151  DATA2    EQU   36       ;DATA REGISTER
       152  ;
       153  ;
```

```
0000                        ORG     000H
0000 0409           154             JMP     INITIZ
     00             155             NOP
     00             156     ;
0002 2446           157             JMP     EXTINT
0004 00             158             NOP
0005 00             159             NOP
0006 00             160             NOP
0007 2454           161             JMP     TIMINT
                    162     ;
0009 8AFF           163     INITIZ: ORL     P2,#0FFH        ;TURN OFF MOTOR
000B 23FF           164             MOV     A,#0FFH         ;SET BUS FOR INPUT PORT
000D 02             165             OUTL    BUS,A
000E 5E7F           166             ANI     BUS,#0FFPRST    ;CLEAR F/F, QBAR=B
0010 E5FE           167             CRL     F1,#0FFH        ;SET FORT1 FCR-INPUT
0012 8E80           168             ORL     BUS,#FFRST      ;RESET F/F, CLR=B, QBAR=B
0014 8840           169             ORL     BUS,#RLYOFF     ;TURN OFF RELAY
0016 54C7           170             CALL    RLY20           ;MAKE SURE RELAY IS OFF
                    171     ;
0018 E5             172             CLR     F0              ;CLEAR HI SPEED FLAGS
0019 A5             173             CLR     F1              ;CLEAR TIMER OVERFLOW FLAG
                    174     ;
001A BE3F           175             MOV     R0,#3FH
001C 27             176             CLR     A
001D A0             177     CIRRAM: MOV     @R0,A
001E E81D           178             DJNZ    R0,CIRRAM       ;CLEAR RAMS
                    179     ;
0020 E4AC           180             CALL    LCLREV          ;LOAD REVOLUTION COUNTER
                    181     ;
0022 09             182     STRTST: IN      A,P1
0023 5380           183             ANL     A,#CNMASK
0025 C622           184             JNZ     STRTST
0027 54C7           185             CALL    RLY20           ;DEBOUNCE CHECK ON/OFF SWITCH
0029 09             186             IN      A,P1
002A 5380           187             ANL     A,#CNMASK
002C C622           188             JNZ     STRTST
                    189     ;
002E FC20           190     RUN:    MOV     R1,#DIRECT
0030 09             191             IN      A,P1
0031 5320           192             ANL     A,#DIRMSK       ;LOCK CW/CCW SW SETTING
```

```
0033 C63A          JNZ    SPIN0        ;JUMP IF SW ON CCW
0035 FF01   SPIN0: MOV    R6,#13       ;SW ON CW
0037 11            INC    GR1          ;SET ON CW DIRECTION
0038 0431          JMP    SPIN2
;
003A FF01   SPIN1: MOV    R6,#1        ;SW ON CCW
003C FF01          MOV    GR1,#00H     ;SET ON CCW DIRECTION
003E FF01          MOV    R7,#1        ;LOAD INDEX = 1
0040 B880   SPIN2: ORI    FUS,#FFRST   ;RESET F/F
0042 BE03          MOV    R0,#3        ;LOAD NO. OF DEBOUNCE TIMES
0044 2412          JMP    MAIN
;
0046 FD0B  EXTINT: MOV    R5,#11
0048 FL4B  EXTDLY: IJNZ   R5,EXTDLY    ;DELAY 36 US
;
004A 15            DIS    I            ;DISABLE CUR. INTRP
;
004E 5EFF          ANL    FUS,#FFPRST  ;CLEAR F/F
                                       ;FIRI, C/P SAME PATTERN
004D-8880          ORL    FUS,#FFRST   ;RESET F/F
;
004F 1652          JTF    EXTTIM       ;RESET TIMER FLAG & JUMP
0051 93            RETR
;
0052 35    EXTTIM: DIS    TCNTI        ;RESET PENDING INTRP FLAG
0053 25            IN     TCNTI
;
0054 E5    TIMINT: CPI    R1           ;FLAG TIMER TIME OUT
0055 93            RETR
;
0100          ORG    100H
;
0100 01    TESTCW: LB     TESTC1       ;TEST BIT-MASKS CORRESPONDING
0101 02           LB     TESTC2       ;TC PATTERNS ON PAGE 3
0102 04           LB     TESTC3       ;MASK  YIELDS
0103 01           LB     TESTC4       ;  01         INPUT (P4) BIT 1
0104 02           LB     TESTC5       ;  02             "      BIT 2
0105 04           LB     TESTC5       ;  04             "      BIT 3
;
010C          ORG    10CH
```

```
233            LB     TESTCC
234            LB     TESTW1
235            LB     TESTW2
236            LB     TESTW3
237            LB     TESTW4
238            LB     TESTW5
239     ;
240     ;
241 0112 A5     MAIN:  CLR    F1              ;CLEAR TIMER OVERFLOW FLAG
242 0113 23C2          MOV    A,#IIY3M        ;LOAD DELAY 3 MS
243 0115 62            MOV    T,A
244 0116 25            EN     TCNTI           ;ENABLE TIMER INTRP
245 0117 55            STRT   T               ;START 2MS TIMER
246     ;
247 0118 FE            MOV    A,R6            ;EQV LDA @PATTRN(INDEXR)
248 0119 E3            MOVP3  A,@A
249 011A 3A            OUTL   P2,A            ;OUTPUT-BIT-PATTERN
250     ;
251 011B FE     CHECK: MOV    A,R6            ;CHECK INDEXR FOR EVEN/ODD
252 011C 5301          ANL    A,#01H
253 011E 1246          JB2    CHTST           ;JUMP IF ODD
254     ;
255 0120 FE            MOV    A,R6
256 0121 A3            MOVP   A,@A
257 0122 AA            MOV    R2,A            ;GET TEST PATTERN
258     ;
259 0123 25     EVTST1: EN    I               ;HI SPEED WINDING
260 0124 762C          JF1    IOALT1          ;JUMP IF TIMER TIME OUT
261 0126 09            IN     A,P1
262 0127 5223          JB4    EVTST1          ;JUMP IF HARDWARE INTRP
263 0129 5A            ANL    A,R2            ;TEST FOR '0' FIRST
264 012A 9E23          JNZ    EVTST1          ;(NOT '0', RESET COUNTER)
265     ;
266 012C 35     IOALT1: DIS    TCNTI          ;DISABLE TIMER INTRP
267 012D 15            DIS    I               ;DISABLE CURRENT INTRP
268 012E A5            CLR    F1
269 012F BC06          MOV    R4,#6
270 0131 2306          MOV    A,#LIY12M       ;LOAD 72.44 MS TIMER
271 0133 62            MOV    T,A
272 0134 25            EN     TCNTI
273 0135 55            STRT   T
```

```
                        ;ENABLE CUR. INTRP
274 ;
275   EVTST3: IN    I
276           JF1   R4DEC2
277   EVTST5: IN    A,F1         ;AND THEN TEST FOR '1'
278           JB4   EVTST3
279           ANI   A,R2
280           JZ    EVTST3        ;(NOT '1', RESET COUNTER)
281           JMP   NEXT          ;ALL TEST MET, GO ON
282 ;
283   R4DEC2: CLR   F1
284           DJNZ  R4,EVTST5     ;JUMP IF TIMER TIMES OUT
285           JMP   NEXT
286 ;
287   CDDTST: MOV   A,R6          ;EQV TO LDA @TEST(INDEXR)
288           MOVP  A,@A
289           MOV   R2,A          ;ODD- GET TEST BITS AND...
290 ;
291   CDTST1: IN    I             ;BI SPEED WINDING
292           JF1   IOALT2        ;JUMP-IF-TIMER-TIME OUT
293           IN    A,F1
294           JB4   CDTST1
295           ANL   A,R2          ;TEST FCR '1' FIRST
296           JZ    CDTST1        ;(NOT '1', RESET COUNTER)
297 ;
298   IOALT2: DIS   I
299           DIS   I
300           CLR   F1
301           MOV   R4,#6
302           MOV   A,#11Y12M     ;LOAD 72.44 MS TIMER
303           MOV   T,A
304           IN    A,TCNTI
305           STRT  T
306 ;
307   ODTST3: IN    I             ;BI-SPEED WINDING
308           JF1   R4DEC4
309   ODTST5: IN    A,F1
310           JB4   CDTST3
311           ANL   A,R2          ;TEST FCR '0'
312           JNZ   CDTST3        ;(NCT '0', RESET COUNTER)
313           JMP   NEXT
```

```
0167 AE        314 ;
0168 FC5F      315  RADEC4: CLR    F1
              316          DJNZ   F4,CITSTE
              317 ;
016A 35        318  NEXT:   DIS    TCNTI           ;DISABLE TIMER INTERRUPT
016B 65        319          STOP   TCNT            ;STOP TIMER
016C 05        320          EN     I               ;RESET F/F IF POSSIBLE
              321 ;
016D 0A        322          IN     A,P2
016E F3C0      323          XRL    A,#11000000B    ;CHANGE THE RAIL DISABLE IF
0170 3A        324          OUTL   P2,A            ; ZERO CROSSING
              325 ;
0171 1E        326          INC    R6              ;NEXT STATE, INCREMENT INDEXR
0172 1F        327          INC    R7              ;INCREMENT INDEX
              328 ;
0173 23FA      329          MOV    A,#NOTSIX       ;IS IT LAST PATTERN?
0175 6F        330          ADD    A,R7
0176 F265      331          JB7    BIDLY1          ;NO, SO DELAY
              332 ;
0178 FF00      333  NEXT1:  MOV    R7,#00H         ;CLEAR INDEX
              334 ;
017A 23FA      335          MOV    A,#NOTSIX       ;SUBTRACT 6 FROM INDEXR
017C 6E        336          ADD    A,R6
017D AE        337          MOV    R6,A
              338 ;
017E 09        339          IN     A,P1
017F 5380      340          ANL    A,#ONMASK       ;CHECK ON/OFF SW SETTING
0181 C691      341          JZ     BICHK           ;JUMP IF SW IS SET ON
0183 4425      342          JMP    MTROFF          ;SW OFF, THEN SHUT OFF MOTOR
              343 ;
0185 BB04      344  HIDLY1: MOV    R3,#4           ;DELAY 21 US
0187 05        345  DLYCH1: EN     I               ;ENABLE CURRENT INTRP
0188 EE87      346          DJNZ   R3,DLYCH1
018A 2412      347          JMP    MAIN
              348 ;
018C BB02      349  BIDLY2: MOV    R3,#2           ;DELAY 5 US
018E 05        350          EN     I               ;ENABLE CURRENT INTRP
018F 2412      351          JMP    MAIN
              352 ;
0191 F68C      353  BICHK:  JF0    BILLY2
```

```
0193 C9              354           IN    A,P1
0194 5340            355           ANL   A,#AGMASK
0196 96F0            356           JNZ   SPIN              ;JUMP IF WASH/SPIN-SW ON -SPIN
                     357   ;
0198 F521            358           MOV   R1,#REVCTR        ;SW SET CN WASH MOIE
019A 11              359           INC   R1                ;INCREMENT REVCLUTICN
019B F1              360           MOV   A,@R1
019C 96AC            361           JNZ   LOWDLY            ;IF NOT ZERC THEN DELAY
019E F1C6            362           MOV   @R1,#=250         ;LOAL REVCTR WITH =250
01A0 19              363           INC   R1
01A1 11              364           INC   R1
01A2 F1              365           MOV   A,@R1
01A3 C6BC            366           JZ    WASH              ;JUMP IF REV. COUNT ZERO
01A5 FB02            367           MOV   R3,#2             ;DELAY 15 US
01A7 C5              368   DLYCH3: EN    I
01A8 EEA7            369           DJNZ  R3,DLYCH3
01AA 2412            370           JMP   MAIN
                     371   ;
01AC FB04            372   LOWDLY: MOV   R3,#4             ;DELAY 27 US
01AE 24A7            373           JMP   DLYCH3
                     374   ;
01B0 C9              375   SPIN:   IN    A,P1
01B1 5308            376           ANL   A,#SPEEDS         ;CHECK SPEED SW
01B3 96AC            377           JNZ   LOWDLY            ;JUMP IF SW IS NCT PUSH
01B5 E8AC            378           DJNZ  R0,LOWDLY         ;DECUNCE CHECK SPEED SW
                     379   ;
01B7 95              380           CPL   F0                ;SET HI SPEED WINING FLAG
                     381   ;
01B8 EAFF            382           CRL   F2,#CFFH          ;SHUT OFF THE MOTOR
01BA 4445            383           JMP   RELAY
                     384   ;
01BC E4AC            385   WASH:   CALL  LODREV
01BE 441E            386           JMP   WASH1
                     387   ;
0201                 388           ORG   201H
                     389   ;
0201 04              390           DB    FOUR              ;CW + 1
0202 02              391           DB    TWO               ;CW + 2
0203 06              392           DB    SIX               ;MONITCR
0204 00              393           DB    ZIRO              ;CW + 4
                     394   ;
```

```
0205                    ORG    205H
                    ;
0205  00              DB     ZERO         ;CCW + 1
0206  02              DB     TWO          ;CCW + 2
0207  06              DB     SIX          ;MONITOR
0208  04              DB     FOUR         ;CCW + 4
                    ;
0209  5AFF  MTROFF: CPL    F2,#0FFH     ;IF '1'-SHUT MOTOR OFF AND
                    ;
020B  ID04          MOV    R5,#4
020D  05    WAIT1:  IN     A,P1
020E  5307          ANL    A,#00000111B
0210  9607          JNZ    WAIT1        ;WAIT UNTIL NO BACK EMF
0212  542D          CALL   DLY20        ;20-MS-DEBOUNCE CHECK
0214  F40D          DJNZ   R5,WAIT1
                    ;
0216  BD32  WAIT2:  MOV    R5,#50       ;DELAY 2-SECOND
0218  54C7          CALL   DLY20
021A  EC18          DJNZ   R5,WAIT2
021C  0425          JMP    INITIZ       ;START FROM INITIALIZATION
                    ;
021E  FE    WASH1:  MOV    A,R6         ;USE INDEXR TO CUTPUT
021F  0306          ADD    A,#06H       ;MONITOR PATTERN
0221  F3            MOVP3  A,@A
0222  3A            OUTL   P2,A
                    ;
0223  FC14  MONDLY: DJNZ   R4,MONTIM
0225  FC25          DJNZ   R4,MONDLY    ;DISCHARGED DELAY
                    ;
0227  23FF          MOV    A,#0FFH
0229  3A            OUTL   P2,A         ;SHUT OFF MOTOR
                    ;
022A  BB06          MOV    R3,#06H
022C  5409          CALL   DLY500       ;DELAY 3.0 MS
                    ;
022E  23D5  BRAKE:  MOV    A,#10010101B ;TURN ON THE BOTTOM RAIL
0230  3A            OUTL   P2,A         ;BRAKE THE MOTOR
                    ;
0231  BB19          MOV    R3,#25
0233  5409          CALL   DLY500       ;DELAY 12.5 MS
```

| | | | | |
|---|---|---|---|---|
| 0235 23FF | 425 | | MOV | A,#0FFH | ;SHUT MOTOR OFF |
| 0237 3A | 426 | | OUTL | P2,A | |
| | 427 | ; | | | |
| | 428 | ; | | | |
| 0238 FD06 | 435 | | MOV | R3,#06H | ;DELAY 3.0 MS |
| 023A 54C9 | 436 | | CALL | DLY500 | |
| | 440 | | | | |
| | 441 | ; | | | |
| 023C F520 | 442 | | MOV | R1,#DIRECT | ;CHECK ROTATION DIRECTION |
| 023E F1 | 443 | | MOV | A,@R1 | |
| 023F 1243 | 444 | | JB0 | AGITAT | ;CHANGE TO CCW |
| 0241 0435 | 445 | | JMP | SPIN2 | |
| | 446 | ; | | | |
| 0243 043A | 447 | AGITAT: | JMP | SPIN1 | ;CHANGE TO CW |
| | 448 | ; | | | |
| 0245 5EFF | 449 | RELAY: | ANL | PUS,#RLYCN | ;TURN ON RELAY |
| | 450 | ; | | | |
| 0247 FB14 | 451 | | MOV | R3,#20 | ;DELAY 10 MS |
| 0249 54C9 | 452 | | CALL | DLY500 | |
| | 453 | ; | | | |
| 024E F523 | 454 | TRACK: | MOV | R1,#DATA1 | ;DETECTING EDGE TRANSITION |
| 024D 09 | 455 | | IN | A,P1 | |
| 024E 5327 | 456 | | ANL | A,#ALLBI | |
| 0250 A1 | 457 | | MOV | @R1,A | ;STORE THE 1ST BIT PATTERN |
| | 458 | ; | | | |
| 0251 19 | 459 | SAME: | INC | R1 | |
| 0252 FC23 | 460 | SAME2: | MOV | R4,#LOWTIM | |
| 0254 09 | 461 | SAME1: | IN | A,P1 | |
| 0255 5327 | 462 | | ANI | A,#ALLBI | |
| 0257 C664 | 463 | | JZ | RETURN | ;JUMP IF ALL ZERO |
| 0259 A1 | 464 | | MOV | @R1,A | |
| 025A D327 | 465 | | XRI | A,#ALLBI | |
| 025C C664 | 466 | | JZ | RETURN | ;JUMP IF ALL HIGH |
| 025E F1 | 467 | | MOV | A,@R1 | |
| 025F C9 | 468 | | DEC | R1 | |
| 0260 D1 | 469 | | XRL | A,@R1 | ;CHECK DATA1 = DATA2? |
| 0261 C651 | 470 | | JZ | SAME | ;JUMP IF SAME |
| | 471 | ; | | | |
| 0263 F1 | 472 | DIFFR: | MOV | A,@R1 | ;NO, THEY ARE DIFFERENT |
| 0264 37 | 473 | | CPL | A | |
| 0265 19 | 474 | | INC | R1 | |

```
0266 E1           475         ADD   A,@R1         ;DATA2 - DATA1 = (R3)
0267 0301         476         ADD   A,#01H
0269 AB           477         MOV   R3,A
                  478  ;
026A D303         479         XRL   A,#DIFF2
026C C652         480         JZ    SAME2         ;JUMP IF DIFFR = 3
026E FB           481         MOV   A,R3
026F D3FD         482         XRL   A,#DIFFD
0271 C652         483         JZ    SAME2         ;JUMP IF DIFFR = -3
                  484  ;                          ;CHECK ROTATION DIRECTION
0273 F520         485         MOV   R1,#DIRECT
0275 F1           486         MOV   A,@R1
0276 1286         487         JB0   REVERS        ;JUMP IF CW
0278 F688         488  FORWAR: JF0  REVER1        ;JUMP IF HI SPEED WINDING
027A FB           489  FCRWR1: MOV  A,R3          ;CCW DIRECTION, GET CW INDEXR
027B D3FD         490         XRL   A,#DIFFD      ;IS (R3) CONTAINS +/-3?
027D C6E1         491         JZ    NEGAT         ;(R3) IS + THEN
027F 0304         492         ADD   A,#OFFSET     ;(R3) PLUS OFFSET VAL 4
0281 4489         493         JMP   DIFFR1
                  494  ;
0281 23FC         495  NEGAT:  MOV  A,#NOT4       ;(R3) IS NEGATIVE THEN
0283 6B           496         ADD   A,R3          ;(R3) MINUS OFFSET VALUE 4
0284 4489         497         JMP   DIFFR1
                  498  ;
0286 E67A         499  REVERS: JF0  FORWR1        ;JUMP IF BI SPEED WINDING
0288 FB           500  REVER1: MOV  A,R3          ;CW DIRECTION, GET CCW INDEXR
0289 A3           501  DIFFR1: MOVP A,@A         ;DO CURRENT-PAGE-TABLE-LOOK-UP
028A AE           502         MOV   R6,A          ;STORE INTO INDEXR REGISTER
                  503  ;
028B F656         504         JF0   RETU2         ;JUMP IF HI SPEED
                  504  ;
028D F524         505         MOV   R1,#DATA2
028F F1           506         MOV   A,@R1
0290 C9           507         DEC   R1
0291 A1           508         MOV   @R1,A
0292 4451         509         JMP   SAME
                  510  ;
0294 EC54         511  RETURN: DJNZ R4,SAME1
0296 FE           512  RETU2:  MOV  A,R6
0297 AF           513         MOV   R7,A          ;LET INDEX = INDEXR
                  514  ;
0298 F520         515         MOV   R1,#DIRECT    ;CHECK THE DIRECTION
```

```
029F  F1                    MOV    A,GR1
02A0  12A6                  JB0    CCWDIR
02A2  ;
029D  F6AA       CWDIR:     JF0    CCWDIR1      ;JUMP IF HI SPEED WINDING
02CF  11                    INC    GR1          ;CHANGE TO CW DIRECTION
02A0  F6         CWDIR1:    MOV    A,R6
02A1  0230                  ADD    A,#CWTAB1    ;ADD CW PATTERN OFFSET VALUE
02A3  AE                    MOV    R6,A         ;INTO INDEXR
02A4  2412                  JMP    MAIN
                 ;
02A6  F6A0       CCWDIR:    JF0    CWDIR1       ;JUMP IF HI SPEED WINDING
02A8  B100                  MOV    GR1,#00B     ;CHANGE TO CCW-DIRECTION
02AA  2412                  JMP    MAIN
                 ;
02AC  80         IODREV:    MOVX   A,GR0        ;FOLLOW THE 250/5-SWITCH
02AD  00                    NOP                 ;RELOAD REVOLUTION COUNTER
02AE  06                    INS    A,BUS
                            CUTL                ;
02B0  02                    JB5    FIVE         ;LOAD-THE-BUS-F/F
02E0  B9BA       REV250:    MOV    R1,#REVCTR   ;LOAD 250 REV COUNTER
02E2  B921                  MOV    GR1,#-250
02E4  B106                  INC    R1
02E6  19                    MOV    GR1,#-4
02E7  B1FC                  MOV    GR1,#-4
02E8  83                    RET
                 ;
02EA  B921       REV5:      MOV    R1,#REVCTR   ;LOAD 5 REV COUNTER
02EC  B1EC                  MOV    GR1,#-20
02EE  19                    INC    R1
02EF  B1FF                  MOV    GR1,#-1
02C1  83                    RET
                 ;
02C2  BD03       DLY250:    MOV    R5,#3
02C4  BDC4       DLYAGN:    MOV    R5,DLYAGN
02C6  83                    RET
                 ;
02C7  BD2E       DLY20:     MOV    R3,#40       ;20 MS DELAY LOOP
02C9  BCA6       DLY500:    MOV    R4,#166      ;500 US-DELAY-LOOP
02CB  FCCE       DELAY2:    DJNZ   R4,DELAY2    ;5/1.67 US DELAY
02CD  BDC9                  DJNZ   R4,DELAY2
02CF  E3                    DJNZ   R3,DLY500
                            RET
                 ;
```

```
02F8            ;
02F9            ORG     5FEB
02FE 01         DB      ONE       ;CCW - 4
02FF 00         DB      SIX       ;MONITOR
02FA 05         DB      FIVE      ;CCW - 2
02FB 03         DB      THREE     ;CCW - 1
02FC            ;
02FC 03         DB      THREE     ;CW - 4
02FD 06         DB      SIX       ;MONITOR
02FE 05         DB      FIVE      ;CW - 2
02FF 01         DB      ONE       ;CW - 1
02FF            ;
02FF            ;
0300            ORG     300H
0300            ;
0300 7C         DB      PATTRN    ;RUN CLOCKWISE BIT PATTERN
0301 F5         DB      PATRN1
0302 73         DB      PATRN2
0303 A7         DB      PATRN3
0304 4E         DB      PATRN4
0305 6E         DB      PATRN5
0307            ;
0308 9E         DB      MONITR    ;MONITOR-CW-PATTERN
0309 F1         DB      MONIT1
030A 7E         DB      MONIT2
030B E7         DB      MONIT3
030C A6         DB      MONIT4
030D E6         DB      MONIT5
030E            ;
030F 5E         DB      CCWPAT    ;RUN COUNTER CLOCKWISE PATTERN
0310 EE         DB      CCWPT1
0311 E7         DB      CCWPT2
0312 F3         DB      CCWPT3
0313 75         DB      CCWPT4
0314 EC         DB      CCWPT5
0315            ;
0316 7E         DB      CCWMCN    ;MONITOR CCW PATTERN
0317 6E         DB      CCWMC1
0318 EF         DB      CCWMC2
0319 F7         DB      CCWMC3
031A 7E         DB      CCWMC4
```

APPENDIX II

GLOSSARY OF CORRESPONDING SYMBOLS IN FLOWCHARTS AND APPENDIX I

| Flowcharts | Appendix I | Comment |
|---|---|---|
| INDEX | R7 | Place in commutation sequence |
| INDEXR | R6 | Clockwise: 0-5, CCW: 12-17 |
| FLAG1 | F0 | Hi/Low Speed flag, Low=0, Hi=1 |
| FIG. 8 | Lines 1-203 | Initialization |
| Step 321 | Lines 354-370 | Check Wash/Spin switch and jump accordingly |
| MAIN1,MAIN2 | MAIN | Entry point for routine for driving motor in a selected direction |
| FIG. 11 | Lines 385,386 416-447 | Reversing routine |
| Output Off | MTROFF | Motor shutoff |
| Pattern | Lines 402-414 | routine |
| FIG. 12 | EXTINT Lines 205-221 | External Interrupt Routine |
| FIGS. 10,15 | CHECK Lines 250-316 | Low and High Speed Back EMF Routines |
| FIGS. 16 8,9 (rt.) | NEXT Lines 318-373 | Advance in Commutation Sequence, Change Rail Disable |
| FIG. 14 (D) | SPIN Lines 375-384 Jump to RELAY | Automatically shift relay from Low to High Speed on spin mode |
| Relay | RELAY | Relay change routine |
| FIGS. 17,19 | Lines 449-528 | tracks rotor back emf |
| FIG. 11A | BRAKE Lines 424-439 | Braking pattern |

What is claimed is:

1. A control system for an electronically commutated motor including a stationary assembly having a plurality of winding stages adapted to be selectively commutated, and rotatable means associated with the stationary assembly in selective magnetic coupling relation with the winding stages, and means for commutating the winding stages by selectively supplying power thereto in response to a pattern of control signals leaving at least one of the winding stages unpowered at any one time while the other winding stages are powered, the control system comprising:

means coupled to the winding stages for simultaneously converting the voltages across the winding stages to digital form thereby to digitize the voltages;

means for producing successive patterns of digital signals in at least one preselected sequence, for selecting the digitized voltage across the at least one unpowered winding stage depending on the digital signal pattern produced, and for producing a following pattern in sequence after at least one predetermined logic level of the selected digitized voltage has occurred; and means responsive to the successive patterns of the digital signals for generating the successive patterns of the control signals for the commutating means.

2. The control system as set forth in claim 1 wherein said converting means comprises means for generating a first logic level when the voltage across a respective winding stage exceeds a predetermined value and a second logic level when the voltage across it falls below the predetermined value, the digital form of the voltage across each respective winding stage comprising the logic levels so generated.

3. The control system as set forth in claim 1 wherein said control signal generating means comprises means for also preventing at least one pattern of control signals from being generated regardless of the patterns of digital signals produced by said producing and selecting means.

4. The control system as set forth in claim 1 wherein said producing and selecting means comprises means for producing each pattern in the sequence after complementary logic levels of the selected digitized voltage have occurred in a predetermined order.

5. The control system as set forth in claim 1 wherein said producing and selecting means comprises means for also producing the following pattern in sequence after a predetermined time period if the at least one predetermined logic level of the selected digitized voltage has not occurred during the predetermined time period.

6. The control system as set forth in claim 1 further comprising means for comparing the current flowing in the other powered winding stages of the electronically commutated motor with a predetermined level and upon the level being exceeded, causing said control signal generating means to generate a pattern of control signals to reduce the current.

7. A method for controlling a system having an electronically commutated motor including a stationary assembly having a plurality of winding stages adapted to be selectively commutated, and rotatable means associated with the stationary assembly in selective magnetic coupling relation with the winding stages, and means for commutating the winding stages by selectively supplying power thereto in response to a pattern of control signals leaving at least one of the winding stages unpowered at any one time while the other winding stages are powered, the method comprising the steps of:
   digitizing the voltages across the winding stages;
   generating successive patterns of the control signals for the commutating means in response to successive patterns of digital signals;
   prestoring data representing at least one preselected sequence of the patterns of the digital signals and prestoring data, corresponding to each pattern of the digital signals, identifying the respective digitized voltage for the at least one unpowered winding stage;
   successively producing one of the patterns of the digital signals and sensing only the identified digitized voltage corresponding to the one pattern; and
   producing the following pattern in sequence after at least one predetermined logic level of the identified digitized voltage has occurred.

8. The method as set forth in claim 7 further comprising the step of preventing at least one pattern of control signals from being generated in the generating step regardless of the patterns of digital signals produced in the producing steps.

9. The method as set forth in claim 7 wherein the step of producing the following pattern is performed after complementary logic levels of the identified digitized voltage have occurred in a predetermined order.

10. The method as set forth in claim 7 wherein the step of producing the following pattern in sequence is performed after a predetermined time period if the at least one predetermined logic level of the selected digitized voltage has not occurred during the predetermined time period.

11. The method as set forth in claim 7 further comprising the steps of comparing the current flowing in the other powered winding stages of the electronically commutated motor with a predetermined level and, upon the predetermined level being exceeded, generating a pattern of control signals to reduce the current.

12. The method as set forth in claim 11 further comprising the step of enabling motor operation to resume after a predetermined time interval upon the generation of the current-reducing pattern of control signals.

13. The method as set forth in claim 11 further comprising the step of periodically producing the current reducing pattern of control signals at an adjustable rate when the predetermined level is not exceeded.

14. A method for controlling a system having an electronically commutated motor including a stationary assembly having a plurality of winding stages adapted to be selectively commutated, and rotatable means associated with the stationary assembly in selective magnetic coupling relation with the winding stages, first and second conductors for supplying power, and means for commutating the winding stages and producing a current in the winding stages by selectively switching the winding stages to the supply conductors in response to a pattern of control signals, the method comprising the steps of:
   producing successive patterns of digital signals in at least one preselected sequence;
   generating patterns of the control signals for the commutating means in response to the successive patterns of the digital signals;
   comparing the current in the winding stages of the electronically commutated motor with a predetermined level; and
   producing a preestablished pattern of the digital signals for a predetermined period of time to reduce the current in the winding stages, whenever the predetermined level is exceeded and periodically producing the current reducing pattern of the digital signals at an adjustable rate when the predetermined level is not exceeded.

15. The method as set forth in claim 14 wherein the commutating means comprises sets of electronic devices connected across the first and second supply conductors, each set having at least one junction point connected to a respective one of the winding stages, each of the electronic devices respectively being able to be switched by a corresponding one of the control signals in each pattern of control signals, the method further comprising the steps of prestoring data identifying one of the first and second conductors corresponding to each pattern of the digital signals in the sequence and disabling switching by the electronic devices to the identified conductor corresponding to the pattern of the digital signals which is being produced just prior to producing the preestablished current reducing pattern.

16. The method as set forth in claim 14 further comprising the step of preventing at least one pattern of control signals from being generated in the generating step regardless of the patterns of the digital signals produced.

17. A control system for an electronically commutated motor including a stationary assembly having a plurality of winding stages adapted to be selectively commutated, and rotatable means associated with the stationary assembly in selective magnetic coupling relation with the winding stages, first and second conductors for supplying power, and means for commutating the winding stages and producing a current in the winding stages by selectively switching the winding stages to the supply conductors in response to a pattern of control signals, the control circuit comprising:

means for generating patterns of the control signals for the commutating means in response to successive patterns of digital signals;

means for comparing the current in the winding stages of the electronically commutated motor with a predetermined level; and means for producing the successive patterns of digital signals in at least one preselected sequence for said generating means, for producing in response to said comparing means a preestablished pattern of the digital signals to reduce the current in the winding stages upon the predetermined level being exceeded, for monitoring the voltage across the winding stages to monitor the position of the rotatable means when the current is being reduced, and for resuming producing the successive patterns of digital signals in sequence after a predetermined time interval.

18. The control circuit as set forth in claim 17 wherein the commutating means comprises sets of electronic devices connected across the first and second supply conductors, each set having at least one junction point connected to a respective one of the winding stages, each of the electronic devices respectively being able to be switched by a corresponding one of the control signals in each pattern of control signals, and the producing means comprises means for also prestoring data identifying one of the first and second conductors corresponding to each pattern of the digital signals in the sequence and disabling switching by said electronic devices to the identified conductor corresponding to the pattern of the digital signals which is being produced just prior to producing the preestablished current reducing pattern.

19. The control circuit as set forth in claim 17 wherein said generating means comprises means for also preventing at least one pattern of control signals from being generated regardless of the patterns of the digital signals.

20. The control circuit as set forth in claim 17 wherein said comparing means comprises means for also causing said control signal generating means to generate a pattern of control signals to reduce the current in the winding stages upon the predetermined level being exceeded.

21. The control circuit as set forth in claim 17 wherein said comparing means comprises means for also producing pulses at an adjustable rate when the current is less than the predetermined level, so that the speed of the motor is adjustable.

22. A control system for an electronically commutated motor including a stationary assembly having a plurality of winding stages adapted to be selectively commutated, and rotatable means associated with the stationary assembly in selective magnetic coupling relation with the winding stages, and means for commutating the winding stages by selectively supplying power thereto in response to a pattern of control signals leaving at least one of the winding stages unpowered at any one time while the other winding stages are powered, the control system comprising:

means coupled to the winding stages for converting the voltages across the winding stages to digital form thereby to digitize the voltages; and means for producing successive patterns of the control signals in at least one preselected sequence to rotate the rotatable means, for subsequently producing a pattern of the control signals which causes the commutating means to leave all of the winding stages temporarily unpowered, for sensing the digitized voltages while the winding stages are temporarily unpowered and then resuming producing the successive patterns of the control signals in sequence beginning with a pattern of the control signals determined from the sensed digitized voltages.

23. The control system as set forth in claim 22 wherein said producing and sensing means comprises:

means responsive to successive patterns of digital signals for generating successive patterns of the control signals for the commutating means; and digital circuit means for producing successive patterns of the digital signals in at least one preselected sequence, for sensing the digitized voltages while the winding stages are temporarily unpowered and then resuming producing the successive patterns of the digital signals in sequence beginning with a digital signal pattern determined from the sensed digitized voltages.

24. The control system as set forth in claim 23 wherein said control signal generating means comprises means for also preventing at least one pattern of control signals from being generated regardless of the patterns of digital signals produced by said digital circuit means.

25. The control system as set forth in claim 23 wherein said digital circuit means comprises means for also selecting the digitized voltage across the at least one unpowered winding stage depending on each of the successive patterns produced, and for producing a following pattern in sequence after complementary logic levels of the selected digitized voltage have occurred in a predetermined order.

26. The control system as set forth in claim 23 wherein said digital circuit means comprises means for also selecting the digitized voltage across the at least one unpowered winding stage depending on each of the successive patterns produced, and for producing a following pattern in sequence after at least one predetermined logic level of the selected digitized voltage has occurred and for producing the following pattern in sequence after a predetermined time period if the at least one predetermined logic level of the selected digitized voltage has not occurred during the predetermined time period.

27. The control system as set forth in claim 23 further comprising means for comparing the current flowing in the other powered winding stages of the electronically commutated motor with a predetermined level and, upon the level being exceeded, causing said control signal generating means to generate any pattern of control signals which causes the commutating means to reduce the current in the winding stages.

28. The control system as set forth in claim 27 wherein said current comparing means comprises means for electrical comparison of the current with a voltage corresponding to the predetermined level and latch means fed by said electrical comparison means, said latch means having at least one output coupled to said control signal generating means and to said digital circuit means.

29. The control system as set forth in claim 28 further comprising means for supplying a series of pulses at an adjustable rate to said latch means.

30. The control system as set forth in claim 28 wherein said digital circuit means has a line coupled to said latch means to clear said latch means.

31. The control system as set forth in claim 22 wherein said converting means comprises means for generating a first logic level when the voltage across a respective winding stage exceeds a predetermined value and a second logic level when the voltage across it falls below the predetermined value, the digital form of the voltage across each winding stage comprising the logic levels so generated.

32. The control system as set forth in claim 22 further comprising means operable generally for switching the winding stages from one connection arrangement to at least another connection arrangement thereof.

33. The control system as set forth in claim 32 wherein said producing and sensing means comprises means for also producing a signal to effect the operation of said switching means when all of the winding stages are caused to be temporarily unpowered.

34. The control system as set forth in claim 32 wherein one of the connection arrangements is a low speed connection arrangement and at least another connection arrangement is a higher speed connection arrangement.

35. The control system as set forth in claim 22 wherein said producing means comprises means for also identifying the successive patterns of the control signals by values of an index, determining a value of the index from the sensed digitized voltages when the winding stages are temporarily unpowered, and beginning with the pattern of the control signals identified by the value of the index so determined.

36. The control system as set forth in claim 22 wherein said producing means comprises means for also identifying the successive patterns of the control signals by values of an index, determining a value of the index as a function of a number represented by the sensed digitized voltages when the winding stages are temporarily unpowered, and beginning with the pattern of the control signals identified by the value of the index so determined.

37. The control system as set forth in claim 22 wherein said producing means comprises means for also identifying the successive patterns of the control signals by values of an index, determining a value of the index as a first function of a number represented by the sensed digitized voltages when the winding stages are temporarily unpowered and the preselected sequence is for clockwise rotation of the rotatable means and determining the value of the index as a second function of the number so represented when the preselected sequence is for counterclockwise rotation, and beginning with the pattern of the control signals identified by the value of the index so determined.

38. The control system as set forth in claim 22 wherein said producing means comprises means for also identifying the successive patterns of the control signals by values of an index, determining a value of the index as a function of the difference of first and second numbers represented by different instances of the sensed digitized voltages, and beginning with the pattern of the control signals identified by the value of the index so determined.

39. The control system as set forth in claim 22 wherein said producing means comprises means for also identifying the successive patterns of the control signals by values of an index, determining a value of the index as a function of the difference of first and second numbers represented by different instances of the sensed digitized voltages unless one of the numbers is in a set of predetermined numbers, and beginning with the pattern of the control signals identified by the value of the index so determined.

40. The control system as set forth in claim 39 wherein the set of predetermined numbers includes 0 and 7.

41. The control system as set forth in claim 22 wherein said producing means comprises means for also identifying the successive patterns of the control signals by values of an index, for calculating a difference of first and second numbers represented by different instances of the sensed digitized voltages, for determining a value of the index as a function of the difference unless the difference is in a set of predetermined numbers, and beginning with the pattern of the control signals identified by the value of the index so determined.

42. The control system as set forth in claim 41 wherein the set of predetermined numbers includes 0, +3 and −3.

43. The control system as set forth in claim 22 wherein said producing means comprises means for also preventing sensed digitized voltages repesenting a number in a predetermined set from being used to determine the beginning pattern of the control signals.

44. The control system as set forth in claim 22 wherein said producing means comprises means for also repetitively sensing the digitized voltages while the winding stages are temporarily unpowered and determining the beginning pattern of the control signals as soon as a change occurs in any one of the sensed digitized voltages.

45. A control system for an electronically commutated motor including a stationary assembly having a plurality of winding stages adapted to be selectively commutated, and rotatable means associated with the stationary assembly in selective magnetic coupling relation with the winding stages, the control system comprising:

means for commutating the winding stages by selectively supplying power thereto in response to a pattern of control signals leaving at least one of the winding stages unpowered at any one time while the other winding stages are powered;

means responsive to successive patterns of digital signals for generating successive patterns of the control signals for said commutating means; and means for producing the successive patterns of the digital signals in at least one preselected sequence, and for subsequently producing a different pattern of the digital signals which causes said commutating means to connect all of the winding stages together, thereby braking the motor.

46. The control system as set forth in claim 45 further comprising means coupled to the winding stages for converting the voltages across the winding stages to digital form thereby to digitize the voltages; said producing means comprising means for also selecting the digitized voltage across the at least one unpowered winding stage depending on the digital signal pattern produced, and for producing a following pattern in sequence after at least one predetermined logic level of the selected digitized voltage has occurred.

47. The control system as set forth in claim 46 wherein said converting means comprises means for generating a first logic level when the voltage across a respective winding stage exceeds a predetermined value and a second logic level when the voltage across it falls below the predetermined value, the digital form of the voltage across each respective winding stage comprising the logic levels so generated.

48. The control system as set forth in claim 46 wherein said selecting and producing means comprises means for producing the following pattern after complementary logic levels of the selected digitized voltage have occurred in a predetermined order.

49. The control system as set forth in claim 46 wherein said selecting and producing means comprises means for also producing the following pattern in sequence after a predetermined time period if the at least one predetermined logic level of the selected digitized voltage has not occurred during the predetermined time period.

50. The control system as set forth in claim 45 wherein said control signal generating means comprises means for also preventing at least one pattern of control signals from being generated regardless of the patterns of digital signals produced by said producing means.

51. The control system as set forth in claim 45 further comprising means for comparing the current flowing in the other powered winding stages of the electronically commutated motor with a predetermined level and upon the level being exceeded, causing said control signal generating means to generate a pattern of control signals to reduce the current.

52. The control system as set forth in claim 45 wherein each of the winding stages includes winding sections adapted to be commutated, and said control system further comprises means operable generally for connecting said control signal generating means to a selected section of each winding stage.

53. The control system as set forth in claim 52 wherein said producing means comprises means for also producing a signal for the connecting means to effect the selection of the section of each winding stage to be commutated.

54. The control system as set forth in claim 45 further comprising means coupled to the winding stages for converting the voltages across the winding stages to digital form thereby to digitize the voltages, said producing means comprising means for also producing a pattern of the digital signals which causes said commutating means to leave all of the winding stages temporarily unpowered, for sensing the digitized voltages while the winding stages are temporarily unpowered and then resuming producing the successive patterns of the control signals in sequence beginning with a pattern of the control signals determined from the sensed digitized voltages.

55. A method for controlling an electronically commutated motor including a stationary assembly having a plurality of winding stages adapted to be selectively commutated, and rotatable means associated with the stationary assembly in selective magnetic coupling relation with the winding stages, and means for commutating the winding stages by selectively supplying power thereto in response to a pattern of control signals leaving at least one of the winding stages unpowered at any one time while the other winding stages are powered, the method comprising the steps of:
producing successive patterns of the control signals in at least one preselected sequence of commutating the winding stages in a first connection arrangement;
producing a pattern of the control signals which causes the commutating means to leave all of the winding stages temporarily unpowered;
switching the winding stages to a second connection arrangement;
sensing the position of the rotating means from the winding stages while they are temporarily unpowered; and
resuming producing the successive patterns of the control signals in sequence beginning with a pattern of the control signals determined from the position of the rotating means sensed while the winding stages are temporarily unpowered.

56. The method as set forth in claim 55 wherein one of the first and second connection arrangements is a low speed connection arrangement and the other of the first and second connection arrangements is a higher speed connection arrangement.

57. The method as set forth in claim 55 wherein the position sensing step comprises converting the voltages across the winding stages to digital form and storing the digital form of the voltages as soon as a change occurs in the digital form of the voltages.

58. The method as set forth in claim 57 wherein the determining step comprises the steps of identifying the successive patterns of the control signals by values of an index, determining a value of the index as a first function of a number represented by the sensed digitized voltages when the winding stages are temporarily unpowered and the preselected sequence is for clockwise rotation of the rotatable means and determining the value of the index as a second function of the number so represented when the preselected sequence is for counterclockwise rotation.

59. The method as set forth in claim 57 wherein the determining step comprises the steps of identifying the successive patterns of the control signals by values of an index and determining a value of the index as a function of the difference of first and second numbers represented by different instances of the sensed digitized voltages.

60. The method as set forth in claim 57 wherein the determining step comprises the steps of repeating the position sensing step while the winding stages are temporarily unpowered and determining the beginning pattern of the control signals as soon as a change occurs in any one of the sensed digitized voltages.

61. A method for controlling an electronically commutated motor including a stationary assembly having a plurality of winding stages adapted to be selectively commutated, and rotatable means associated with the stationary assembly in selective magnetic coupling relation with the winding stages, and means for commutating the winding stages by selectively supplying power thereto in response to a pattern of control signals leaving at least one of the winding stages unpowered at any one time while the other winding stages are powered, the method comprising the steps of:
converting the voltages across the winding stages to digital form thereby to digitize the voltages;
producing successive patterns of the control signals in at least one preselected sequence to commutate the winding stages and rotate the rotatable means;
subsequently producing a pattern of the control signals which causes the commutating means to leave all of the winding stages temporarily unpowered;
sensing the digitized voltages while the winding stages are temporarily unpowered;

determining a pattern of the control signals from the sensed digitized voltages; and resuming producing the successive patterns of the control signals in sequence beginning with the pattern so determined.

62. The method as set forth in claim 61 further comprising the steps of:

selecting the digitized voltage across the at least one unpowered winding stage depending on each control signal pattern produced in sequence; and producing a following pattern in sequence after complementary logic levels of the selected digitized voltage have occurred in a predetermined order.

63. The method as set forth in claim 62 wherein the step of producing the following pattern in sequence is performed after a predetermined time period if the complementary logic levels of the selected digitized voltage have not occurred in the predetermined order during the predetermined time period.

64. The method as set forth in claim 61 wherein the converting step comprises generating with respect to each of the winding stages a first logic level when the voltage across a respective winding stage exceeds a predetermined value and a second logic level when the voltage across it falls below the predetermined value, the digital form of the voltage across each respective winding stage comprising the logic levels so generated.

65. The method as set forth in claim 61 wherein the determining step comprises the steps of identifying the successive patterns of the control signals by values of an index and determining a value of the index from the sensed digitized voltages when the winding stages are temporarily unpowered.

66. The method as set forth in claim 61 wherein the determining step comprises the steps of identifying the successive patterns of the control signals by values of an index and determining a value of the index as a function of a number represented by the sensed digitized voltages when the winding stages are temporarily unpowered.

67. The method as set forth in claim 61 wherein the determining step comprises the steps of identifying the successive patterns of the control signals by values of an index, determining a value of the index as a first function of a number represented by the sensed digitized voltages when the winding stages are temporarily unpowered and the preselected sequence is for clockwise rotation of the rotatable means and determining the value of the index as a second function of the number so represented when the preselected sequence is for counterclockwise rotation.

68. The method as set forth in claim 61 wherein the determining step comprises the steps of identifying the successive patterns of the control signals by values of an index and determining a value of the index as a function of the difference of first and second numbers represented by different instances of the sensed digitized voltages.

69. The method as set forth in claim 68 wherein the set of predetermined numbers includes 0 and 7.

70. The method as set forth in claim 61 wherein the determining step comprises the steps of identifying the successive patterns of the control signals by values of an index and determining a value of the index as a function of the difference of first and second numbers represented by different instances of the sensed digitized voltages unless one of the numbers is in a set of predetermined numbers.

71. The method as set forth in claim 61 wherein the determining step comprises the steps of identifying the successive patterns of the control signals by values of an index, calculating a difference of first and second numbers represented by different instances of the sensed digitized voltages, and determining a value of the index as a function of the difference unless the difference is in a set of predetermined numbers.

72. The method as set forth in claim 71 wherein the set of predetermined numbers includes 0, +3 and −3.

73. The method as set forth in claim 61 wherein the determining step comprises the step of preventing sensed digitized voltages representing a number in a predetermined set from being used to determine the beginning pattern of the control signals.

74. The method as set forth in claim 61 wherein the determining step comprises the steps of repeating the sensing of the digitized voltages while the winding stages are temporarily unpowered and determining the beginning pattern of the control signals as soon as a change occurs in any one of the sensed digitized voltages.

75. A method for controlling an electronically commutated motor including a stationary assembly having a plurality of winding stages adapted to be selectively commutated, and rotatable means associated with the stationary assembly in selective magnetic coupling relation with the winding stages, and means for commutating the winding stages by selectively supplying power thereto in response to a pattern of control signals leaving at least one of the winding stages unpowered at any one time while the other winding stages are powered, the method comprising the steps of:

generating successive patterns of the control signals for the commutating means in response to successive patterns of digital signals;

producing the successive patterns of the digital signals in at least one preselected sequence; and producing a different pattern of the digital signals which causes the commutating means to connect all of the winding stages together, thereby braking the motor.

76. The method as set forth in claim 75 further comprising the steps of:

converting the voltages across the winding stages to digital form thereby to digitize the voltages;

selecting the digitized voltage across the at least one unpowered winding stage depending on the digital signal pattern produced; and producing a following pattern in sequence after at least one predetermined logic level of the selected digitized voltage has occurred.

77. The method as set forth in claim 76 wherein the converting step comprises generating a first logic level when the voltage across a respective winding stage exceeds a predetermined value and a second logic level when the voltage across it falls below the predetermined value, the digital form of the voltage across each respective winding stage comprising the logic levels so generated.

78. The method as set forth in claim 76 wherein the last named producing steps comprises producing the following pattern in sequence after complementary logic levels of the selected digitized voltage have occurred in a predetermined order.

79. The method as set forth in claim 76 wherein the step of producing the following pattern in sequence is performed after a predetermined time period if the at least one predetermined logic level of the selected digitized voltage has not occurred during the predetermined time period.

80. The method as set forth in claim 75 wherein the method further comprises the step of preventing at least one pattern of the control signals from being generated regardless of the patterns of the digital signals produced.

81. The method as set forth in claim 75 further comprising the steps of comparing the current flowing in the other powered winding stages of the electronically commutated motor with a predetermined level and upon the level being exceeded, causing a pattern of the control signals to be generated to reduce the current.

82. The method as set forth in claim 75 wherein each of the winding stages includes winding sections adapted to be commutated, and the method further comprises electrically energizing a selected one of the winding sections of each winding stage to effect commutation.

83. A control system for an electronically commutated motor including a stationary assembly having a plurality of winding stages adapted to be selectively commutated, and rotatable means associated with the stationary assembly in selective magnetic coupling relation with the winding stages, and first and second conductors for supplying power, the control system comprising:
   means for commutating the winding stages in response to successive patterns of control signals leaving at least one of the winding stages unpowered at any one time while the other winding stages are powered, said commutating means including sets of electronic devices connected across the supply conductors, each set having a junction point connected to a respective one of the winding stages, each of said electronic devices respectively being able to be switched by a corresponding one of the control signals in each pattern of control signals; and
   means for producing the successive patterns of the control signals in at least one preselected sequence to switch on only one electronic device in each of at least two of the sets of said electronic devices at once and cause a current to flow in the winding stages to rotate the rotatable means, and for subsequently producing a pattern of the control signals to switch off one of said electronic switching devices which was previously switched on so that said commutating means leaves all of the winding stages temporarily unpowered and also provides a current path for the previously-powered winding stages, said control signal producing means comprising means responsive to successive patterns of digital signals for generating the successive patterns of the control signals for said commutating means, said generating means including first and second logic gate means feeding said sets of electronic devices in said commutating means and having inputs driven by respective pairs of digital signals in the digital signal patterns, means for disabling said first and second logic gate means when any of the pairs of digital signals has identical logic levels in the pair, and means for disabling in response to a disabling signal a single one of said first and second logic gate means identified by an additional pair of digital signals in the digital signal patterns.

84. The control system as set forth in claim 83 wherein the control signal producing means further comprises:
   means for producing the successive patterns of the digital signals in at least one preselected sequence to switch on only one electronic device in each of at least two of the sets of said electronic devices at once and cause a current to flow in the winding stages to rotate the rotatable means, and for subsequently producing a pattern of the digital signals to switch off one of said electronic switching devices which was previously switched on, the identity of said one device switched off depending on the last pattern produced in the sequence, so that said commutating means leaves all of the winding stages temporarily unpowered and also provides a current path for the previously-powered winding stages.

85. The control system as set forth in claim 83 wherein said control signal producing means further comprises:
   means for producing the successive patterns of the digital signals in at least one preselected sequence to switch on only one electronic device in each of at least two of said sets of said electronic devices at once and cause a current to flow in the winding stages to rotate the rotatable means, and for producing the additional pair of digital signals to have logic levels depending on each pattern in the sequence; and
   means for providing the disabling signal in response to an occurrence of a predetermined condition thereby to switch off one of said electronic devices which was previously switched on.

86. The control system as set forth in claim 85 further comprising means coupled to the winding stages for converting the voltages across the winding stages to digital form thereby to digitize the voltages, said digital signal producing means comprising means for also selecting the digitized voltage across the at least one unpowered winding stage when digital signal patterns are produced in sequence and changing the logic levels of the additional pair of digital signals as soon as at least one predetermined logic level of the selected digitized voltage has occurred.

87. The control system as set forth in claim 83 further comprising means coupled to the winding stages for converting the voltages across the winding stages to digital form thereby to digitize the voltages, said control signal producing means further comprising means for also sensing the digitized voltages while the winding stages are temporarily unpowered and then resuming producing the successive patterns of the control signals beginning with a pattern of the control signals determined from the sensed digitized voltages.

88. A control system for an electronically commutated motor including a stationary assembly having a plurality of winding stages adapted to be selectively commutated, and rotatable means associated with the stationary assembly in selective magnetic coupling relation with the winding stages, and means for commutating the winding stages by selectively supplying power thereto in response to a pattern of control signals leaving at least one of the winding stages unpowered at any one time while the other winding stages are powered, the control system comprising:
   means coupled to the winding stages for simultaneously converting the voltages across the winding stages to digital form thereby to digitize the voltages;

means responsive to successive patterns of digital signals for generating successive patterns of the control signals for the commutating means; and means for producing successive patterns of the digital signals in a first preselected sequence, producing a different pattern of the digital signals for causing the commutating means to remove power from all of the winding stages, sensing the digitized voltages while the power is so removed, and producing successive patterns of the digital signals in a second preselected sequence to rotate the rotatable means in the reverse direction after a predetermined time period has elapsed subsequent to the last occurrence of a predetermined logic level in any of the digitized voltages.

89. Laundry apparatus comprising:

means operable generally in a laundering mode for agitating fluid and fabrics to be laundered therein and operable generally in a spin mode for thereafter spinning the fabrics to effect centrifugal displacement of fluid from the fabrics;

an electronically commutated motor including a stationary assembly having a plurality of winding stages adapted to be selectively commutated, and rotatable means associated with said stationary assembly in selective magnetic coupling relation with said winding stages for driving said agitating and spinning means in the laundering mode operation and in the spin mode operation thereof upon the commutation of said winding stages;

first and second conductors for supplying power;

means for commutating said winding stages by selectively switching said winding stages to said supply conductors in response to a pattern of control signals, leaving at least one of said winding stages unpowered at any one time while the other said winding stages are powered;

means coupled to said winding stages for simultaneously converting voltages across said winding stages to digital form thereby to digitize the voltages;

means for producing successive patterns of digital signals in at least one preselected sequence, for selecting the digitized voltage across said at least one unpowered winding stage depending on the digital signal pattern produced, and for producing a following pattern in sequence after at least one predetermined logic level of the selected digitized voltage has occurred; and means responsive to the successive patterns of the digital signals for generating the successive patterns of the control signals for said commutating means.

90. Laundry apparatus comprising:

means operable generally in a laundering mode for agitating fluid and fabrics to be laundered therein and operable generally in a spin mode for thereafter spinning the fabrics to effect centrifugal displacement of fluid from the fabrics;

an electronically commutated motor including a stationary assembly having a plurality of winding stages adapted to be selectively commutated, and rotatable means associated with said stationary assembly in selective magnetic coupling relation with said winding stages for driving said agitating and spinning means in the laundering mode operation and in the spin mode operation thereof upon the commutation of said winding stages;

first and second conductors for supplying power;

means for commutating said winding stages and producing a current in said winding stages by selectively switching said winding stages to said supply conductors in response to a pattern of control signals;

means for producing successive patterns of digital signals in at least one preselected sequence;

means for generating patterns of the control signals for said commutating means in response to the successive patterns of the digital signals; and means for comparing the current in said winding stages of said electronically commutated motor with an electrical level representative of a predetermined current, said pattern producing means including means for also producing a preestablished pattern of the digital signals for a predetermined period of time to reduce the current in said winding stages whenever the predetermined level is exceeded, and periodically producing the current reducing pattern of the digital signals at an adjustable rate when the predetermined level is not exceeded.

91. Laundry apparatus comprising:

means operable generally in a laundering mode for agitating fluid and fabrics to be laundered therein and operable generally in a spin mode for thereafter spinning the fabrics to effect centrifugal displacement of fluid from the fabrics;

an electronically commutated motor including a stationary assembly having a plurality of winding stages adapted to be selectively commutated, and rotatable means associated with said stationary assembly in selective magnetic coupling relation with said winding stages for driving said agitating and spinning means in the laundering mode operation and in the spin mode operation thereof upon the commutation of said winding stages;

first and second conductors for supplying power;

means for commutating said winding stages and producing a current in said winding stages by selectively switching said winding stages to said supply conductors in response to a pattern of control signals;

means for generating patterns of the control signals for said commutation means in response to successive patterns of digital signals;

means for comparing the current in said winding stages of said electronically commutated motor with a predetermined level; and means for producing the successive patterns of digital signals in at least one preselected sequence for said generating means, for producing in response to said comparing means a preestablished pattern of the digital signals to reduce the current in said winding stages upon the predetermined level being exceeded, for monitoring voltages across said winding stages to monitor the position of said rotatable means when the current is being reduced, and for resuming producing the successive patterns of digital signals in sequence after a predetermined time interval.

92. Laundry apparatus comprising:

means operable generally in a laundering mode for agitating fluid and fabrics to be laundered therein and operable generally in a spin mode for thereafter spinning the fabrics to effect centrifugal displacement of fluid from the fabrics;

an electronically commutated motor including a stationary assembly having a plurality of winding stages adapted to be selectively commutated, and rotatable means associated with said stationary assembly in selective magnetic coupling relation with said winding stages for driving said agitating and spinning means in the laundering mode operation and in the spin mode operation thereof upon the commutation of said winding stages;

first and second conductors for supplying power;

means for commutating said winding stages by selectively switching said winding stages to said supply conductors in response to a pattern of control signals, leaving at least one of said winding stages unpowered at any one time while the other said winding stages are powered;

means coupled to said winding stages for converting voltages across said winding stages to digital form thereby to digitize the voltages; and means for producing successive patterns of the control signals in at least one preselected sequence to rotate said rotatable means, for subsequently producing a pattern of the control signals which causes said commutating means to leave all of said winding stages temporarily unpowered, for sensing the digitized voltages while said winding stages are temporarily unpowered and then resuming producing the successive patterns of the control signals in sequence beginning with a pattern of the control signals determined from the sensed digitized voltages.

93. Laundry apparatus comprising:

means operable generally in a laundering mode for agitating fluid and fabrics to be laundered therein and operable generally in a spin mode for thereafter spinning the fabrics to effect centrifugal displacement of fluid from the fabrics;

an electronically commutated motor including a stationary assembly having a plurality of winding stages adapted to be selectively commutated, and rotatable means associated with said stationary assembly in selective magnetic coupling relation with said winding stages for driving said agitating and spinning means in the laundering mode operation and in the spin mode operation thereof upon the commutation of said winding stages;

first and second conductors for supplying power;

means for commutating said winding stages by selectively switching said winding stages to said supply conductors in response to a pattern of control signals, leaving at least one of said winding stages unpowered at any one time while the other said winding stages are powered;

means responsive to successive patterns of digital signals for generating successive patterns of the control signals for said commutating means; and means for producing the successive patterns of the digital signals in at least one preselected sequence, and for subsequently producing a different pattern of the digital signals which causes said commutating means to connect all of said winding stages together, thereby braking said motor.

94. Laundry apparatus comprising:

means operable generally in a laundering mode for agitating fluid and fabrics to be laundered therein and operable generally in a spin mode for thereafter spinning the fabrics to effect centrifugal displacement of fluid from the fabrics;

an electronically commutated motor including a stationary assembly having a plurality of winding stages adapted to be selectively commutated, and rotatable means associated with said stationary assembly in selective magnetic coupling relation with said winding stages for driving said agitating and spinning means in the laundering mode operation and in the spin mode operation thereof upon the commutation of said winding stages;

first and second conductors for supplying power;

means for commutating said winding stages by selectively switching said winding stages to said supply conductors in response to successive patterns of control signals, leaving at least one of said winding stages unpowered at any one time while the other said winding stages are powered, said commutating means including sets of electronic devices connected across said supply conductors, each set having a junction point connected to a respective one of said winding stages, each of said electronic devices respectively being able to be switched by a corresponding one of the control signals in each pattern of control signals; and means for producing the successive patterns of the control signals in at least one preselected sequence to switch on only one electronic device in each of at least two of said sets of said electronic devices at once and cause a current to flow in said winding stages to rotate said rotatable means, and for subsequently producing a pattern of the control signals to switch off one of said electronic switching devices which was previously switched on so that said commutating means leaves all of said winding stages temporarily unpowered and also provides a current path for the previously-powered winding stages.

95. Laundry apparatus comprising:

means operable generally in a laundering mode for agitating fluid and fabrics to be laundered therein and operable generally in a spin mode for thereafter spinning the fabrics to effect centrifugal displacement of fluid from the fabrics;

an electronically commutated motor including a stationary assembly having a plurality of winding stages adapted to be selectively commutated, and rotatable means associated with said stationary assembly in selective magnetic coupling relation with said winding stages for driving said agitating and spinning means in the laundering mode operation and in the spin mode operation thereof upon the commutation of said winding stages;

first and second conductors for supplying power;

means for commutating said winding stages by selectively switching said winding stages to said supply conductors in response to a pattern of control signals, leaving at least one of said winding stages unpowered at any one time while the other said winding stages are powered;

means coupled to said winding stages for simultaneously converting voltages across said winding stages to digital form thereby to digitize the voltages;

means responsive to successive patterns of digital signals for generating successive patterns of the control signals for said commutating means; and means for producing successive patterns of the digital signals in a first preselected sequence, producing a different pattern of the digital signals for causing said commutating means to remove power from all of said winding stages, sensing the digitized voltages while the power is so removed, and producing successive patterns of the digital signals in a second preselected sequence to rotate said rotatable means in the reverse direction after a predetermined time period has elapsed subsequent to the last occurrence of a predetermined logic level in any of the digitized voltages.

96. Laundry apparatus comprising:

means operable generally in a laundering mode for agitating fluid and fabrics to be laundered therein and operable generally in a spin mode for thereafter spinning the fabrics to effect centrifugal displacement of fluid from the fabrics;

an electronically commutated motor including a stationary assembly having a plurality of winding stages adapted to be selectively commutated, and rotatable means associated with said stationary assembly in selective magnetic coupling relation with said winding stages for driving said agitating and spinning means in the laundering mode operation and in the spin mode operation thereof upon the commutation of said winding stages;

first and second conductors for supplying power;

means for commutating said winding stages by selectively switching said winding stages to said supply conductors in response to a pattern of control signals, leaving at least one of said winding stages unpowered at any one time while the other said winding stages are powered;

means coupled to said winding stages for digitizing the voltages across said winding stages;

means responsive to successive patterns of digital signals for generating successive patterns of the control signals for said commutating means; and a digital computer operating under stored program control, said computer having inputs for the digitized voltages, said computer having memory elements for storing data representing at least one preselected sequence of the patterns of the digital signals and for storing data, corresponding to each pattern of the digital signals, identifying the respective input for the digitized voltage for said at least one unpowered winding stage, said computer successively producing one of the patterns of the digital signals, sensing only the digitized voltage at the identified input corresponding to the one pattern and producing the following pattern in sequence as soon as complementary logic levels of the digitized voltage at the identified input have occurred in a predetermined order if they so occur within a predetermined time period and otherwise producing the following pattern in sequence after the predetermined time period.

97. Laundry apparatus comprising:

means operable generally in a laundering mode for agitating fluid and fabrics to be laundered therein and operable generally in a spin mode for thereafter spinning the fabrics to effect centrifugal displacement of fluid from the fabrics;

an electronically commutated motor including a stationary assembly having a plurality of winding stages adapted to be selectively commutated, and rotatable means associated with said stationary assembly in selective magnetic coupling relation with said winding stages for driving said agitating and spinning means in the laundering mode operation and in the spin mode operation thereof upon the commutation of said winding stages;

first and second conductors for supplying power;

means for commutating said winding stages by selectively switching said winding stages to said supply conductors in response to a pattern of control signals, leaving at least one of said winding stages unpowered at any one time while the other said winding stages are powered, said commutating means including sets of electronic devices connected across said supply conductors, each set having a junction point connected to a respective one of said winding stages, each of said electronic devices respectively being able to be switched by a corresponding one of the control signals in each pattern of control signals;

means coupled to said winding stages for digitizing voltages across said winding stages;

means responsive to successive patterns of digital signals for generating successive patterns of the control signals for said commutating means, including first and second logic gate means feeding said commutating means and having inputs driven by respective pairs of digital signals in the digital signal patterns, means for disabling said first and second logic gate means when any of the pairs of digital signals has identical logic levels in the pair, and means for disabling one of said first and second logic gate means in response to a signal to cause the current in said other powered winding stages to be reduced;

a digital computer operating under stored program control, said computer having inputs for the digitized voltages, said computer having memory elements for storing data representing at least one preselected sequence of the patterns of the digital signals and for storing data, corresponding to each pattern of the digital signals, identifying the respective input for the digitized voltage for said at least one unpowered winding stage, said computer successively producing one of the patterns of the digital signals, sensing only the digitized voltage at the identified input corresponding to the one pattern and producing the following pattern in sequence after at least one predetermined logic level of the digitized voltage at the identified input has occurred; and means for comparing currents flowing in said winding stages of said electronically commutated motor with an electrical level representative of a predetermined current, and upon the level being exceeded, interrupting said digital computer and supplying the signal to said disabling means, said digital computer also having memory locations for storing data identifying one of said first and second conductors corresponding to each pattern of the digital signals, said digital computer including means for causing said disabling means to disable switching by said electronic devices to said one identified conductor corresponding to the pattern of the digital signals which is being produced when the interrupting occurs.

98. Laundry apparatus comprising:

means operable generally in a laundering mode for agitating fluid and fabrics to be laundered therein and operable generally in a spin mode for thereafter spinning the fabrics to effect centrifugal displacement of fluid from the fabrics;

an electronically commutated motor including a stationary assembly having a plurality of winding stages adapted to be selectively commutated, and rotatable means associated with said stationary assembly in selective magnetic coupling relation with said winding stages for driving said agitating and spinning means in the laundering operation and in the spin mode operation thereof upon the commutation of said winding stages;

first and second conductors for supplying power;

means for commutating said winding stages by selectively switching said winding stages to said supply conductors in response to a pattern of control signals;

means coupled to said winding stages for converting voltages across said winding stages to digital form thereby to digitize the voltages;

means for selecting the laundering mode and the spin mode;

means operable generally for switching said winding stages from a first connection arrangement to a second connection arrangement, wherein one of the first and second connection arrangements is a low speed connection arrangement and the other of the first and second connection arrangements is a higher speed connection arrangement; and means coupled to said selecting means for producing successive patterns of the control signals in at least one preselected sequence to rotate said rotatable means, for also counting revolutions of said rotatable means in the laundering mode by counting the successive patterns of control signals produced and, when the counting reaches a predetermined value, causing said rotatable means to reverse by also producing a pattern of the control signals which causes said commutating means to switch all of said winding stages to one of said supply conductors and then producing the patterns of control signals in a second preselected sequence, and for subsequently producing in the spin mode a pattern of the control signals which causes said commutating means to leave all of said winding stages temporarily unpowered during switching of said winding stages from the first connection arrangement to the second connection arrangement, for sensing the digitized voltages while said winding stages are temporarily unpowered and then resuming producing the successive patterns of the control signals in sequence beginning with a pattern of the control signals determined from the second digitized voltages.

99. Laundry apparatus comprising:

means operable generally in a laundering mode for agitating fluid and fabrics to be laundered therein and operable generally in a spin mode for thereafter spinning the fabrics to effect centrifugal displacement of fluid from the fabrics;

an electronically commutated motor including a stationary assembly having a plurality of winding stages adapted to be selectively commutated, and rotatable means associated with said stationary assembly in selective magnetic coupling relation with said winding stages for driving said agitating and spinning means in the laundering mode operation and in the spin mode operation thereof upon the commutation of said winding stages;

first and second conductors for supplying power;

means for commutating said winding stages by selectively switching said winding stages to said supply conductors in response to a pattern of control signals;

means coupled to said winding stages for converting voltages across said winding stages to digital form thereby to digitize the voltages;

means for selecting the laundering mode and the spin mode;

means operable generally for switching said winding stages from a first connection arrangement to a second connection arrangement, wherein one of the first and second connection arrangements is a low speed connection arrangement and the other of the first and second conection arrangements is a higher speed connection arrangement; and means coupled to said selecting means for producing successive patterns of the control signals in at least one preselected sequence to rotate said rotatable means, for also counting revolutions of said rotatable means in the laundering mode by counting the successive patterns of control signals produced and, when the counting reaches a predetermined value, producing a pattern of the control signals for causing said commutating means to remove power from all of said winding stages, sensing the digitized voltages while the power is so removed, and producing successive patterns of the control signals in a second preselected sequence to rotate said rotatable means in the reverse direction only after a predetermined time period has elapsed subsequent to the last occurrence of a predetermined logic level in any of the digitized voltages, and for subsequently producing in the spin mode a pattern of the control signals which causes said commutating means to leave all of said winding stages temporarily unpowered during switching of said winding stages from the first connection arrangement to the second connection arrangement, for sensing the digitized voltages while said winding stages are temporarily unpowered and then resuming producing the successive patterns of the control signals in sequence beginning with a pattern of the control signals determined from the sensed digitized voltages.

100. Laundry apparatus comprising:

means operable generally in a laundering mode for agitating fluid and fabrics to be laundered therein and operable generally in a spin mode for thereafter spinning the fabrics to effect centrifugal displacement of fluid from the fabrics;

an electronically commutated motor including a stationary assembly having a plurality of winding stages adapted to be selectively commutated, and rotatable means associated with said stationary assembly in selective magnetic coupling relation with said winding stages for driving said agitating and spinning means in the laundering mode operation and in the spin mode operation thereof upon the commutation of said winding stages;

first and second conductors for supplying power;

means for commutating said winding stages by selectively switching said winding stages to said supply conductors in response to a pattern of control signals;

means coupled to said winding stages for converting voltages across said winding stages to digital form thereby to digitize the voltages;

means operable generally for switching said winding stages from a first connection arrangement to a second connection arrangement; and means for producing successive patterns of the control signals in at least one preselected sequence to rotate said rotatable means, the successive patterns of the control signals being identified by values of an index, for subsequently producing a pattern of the control signals which causes said commutating means to leave all of said winding stages temporarily unpowered during switching of said winding stages from the first connection arrangement to the second connection arrangement, for repetitively sensing the digitized voltages while said winding stages are temporarily unpowered, determining a value of the index as a function of the difference of first and second numbers represented by different instances of the sensed digitized voltages as soon as a change occurs in any one of the sensed digitized voltages, and then resuming producing the successive patterns of the control signals in sequence beginning with a pattern of the control signals identified by the value of the index so determined.

101. Laundry apparatus comprising:

means operable generally in a laundering mode for agitating fluid and fabrics to be laundered therein and operable generally in a spin mode for thereafter spinning the fabrics to effect centrifugal displacement of fluid from the fabrics;

an electronically commutated motor including a stationary assembly having a plurality of winding stages adapted to be selectively commutated, and rotatable means associated with said stationary assembly in selective magnetic coupling relation with said winding stages for driving said agitating and spinning means in the laundering mode operation and in the spin mode operation thereof upon the commutation of said winding stages;

first and second conductors for supplying power;

means for commutating said winding stages by selectively switching said winding stages to said supply conductors in response to a pattern of control signals, leaving at least one of said winding stages unpowered at any one time while the other said winding stages are powered;

means coupled to said winding stages for converting voltages across said winding stages to digital form thereby to digitize the voltages, said converting means including means for generating a first logic level when the voltage across a respective winding stage exceeds a predetermined value and a second logic level when the voltage across it falls below the predetermined value, the digital form of the voltage across each winding stage comprising the logic levels so generated;

means operable generally for switching said winding stages from a first connection arrangement to a second connection arrangement; and means for producing successive patterns of the control signals in at least one preselected sequence to rotate said rotatable means, selecting the digitized voltage across the at least one unpowered winding stage depending on each of the successive patterns produced, producing a following pattern in sequence after complementary logic levels of the selected digitized voltage have occurred in a predetermined order if they so occur within a predetermined time period and otherwise producing the following pattern in sequence after the predetermined time period, and subsequently producing a pattern of the control signals which causes said commutating means to leave all of said winding stages temporarily unpowered during switching of said winding stages from the first connection arrangement to the second connection arrangement, sensing the digitized voltages while said winding stages are temporarily unpowered and then resuming producing the successive patterns of the control signals in sequence beginning with a pattern of the control signals determined from the sensed digitized voltages.

* * * * *